March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 1

INVENTOR
W. R. YOUNG, JR.
BY
William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 2

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 3

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 4

INVENTOR
W. R. YOUNG, JR.
BY
William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 5

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 6

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 7

INVENTOR
W. R. YOUNG, JR.
BY William F. Simpson
ATTORNEY

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 9

INVENTOR
W. R. YOUNG, JR.
BY William F. Simpson
ATTORNEY

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 11

INVENTOR
W. R. YOUNG, JR.
BY
William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 12

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 13

INVENTOR
W. R. YOUNG, JR.
BY
William F. Simpson.
ATTORNEY

INVENTOR
W. R. YOUNG, JR.
BY William F. Simpson
ATTORNEY

INVENTOR
W. R. YOUNG, JR.
BY William F. Simpson
ATTORNEY

AUTOMATIC TELEPHONE TRAFFIC RECORDER EMPLOYING MAGNETIC TAPE

Filed Sept. 10, 1954 24 Sheets-Sheet 16

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 17

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 18

INVENTOR
W. R. YOUNG, JR.
BY William F. Simpson.
ATTORNEY

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 20

INVENTOR
W. R. YOUNG, JR.
BY William F. Simpson
ATTORNEY

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 22

INVENTOR
W. R. YOUNG, JR.
BY William F. Simpson
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 23

INVENTOR
W. R. YOUNG, JR.
BY William F. Simpson.
ATTORNEY

March 21, 1961 W. R. YOUNG, JR 2,976,365

AUTOMATIC TELEPHONE TRAFFIC RECORDER EMPLOYING MAGNETIC TAPE

Filed Sept. 10, 1954 24 Sheets-Sheet 24

INVENTOR
W. R. YOUNG, JR.
BY William F. Simpson
ATTORNEY

United States Patent Office 2,976,365

Patented Mar. 21, 1961

2,976,365

AUTOMATIC TELEPHONE TRAFFIC RECORDER EMPLOYING MAGNETIC TAPE

William R. Young, Jr., Summit, N.J., assignor to Bell Telephone Laboratories, Incorporated, New York, N.Y., a corporation of New York Filed Sept. 10, 1954, Ser. No. 455,154

28 Claims. (Cl. 179—8)

This invention relates to methods, circuits and apparatus of an automatic telephone traffic sampler and recorder for automatically sampling and recording telephone traffic in an automatic telephone switching system.

In both manual and automatic telephone switching systems it is desirable to determine the busy and idle conditions of various circuits, lines, trunks, etc., as well as busy or idle conditions of different ones of different groups of switching devices, in order that the various telephone calls may be handled most expeditiously. Such information is usually required to determine how many different trunk circuits, line circuits or switching devices need be provided to handle a given number of calls or volume of traffic and it is desirable to check such traffic conditions from time to time to determine the change in the traffic depending upon seasonal, growth and other factors affecting the telephone traffic.

One object of the present invention is to provide an automatic traffic sampler and recorder which will automatically and at periodic or predetermined times determine the traffic conditions within an automatic telephone switching system and record the data representing said traffic.

This data may then later be analyzed to determine whether or not sufficient equipment has been provided and whether or not an excess of equipment has been provided to adequately handle the calling rates encountered in the particular switching system or central office.

In accordance with an exemplary embodiment of this invention means are provided for periodically determining and recording on a magnetic tape the busy or idle condition of each of a plurality of subscribers' lines as well as the busy or idle condition of each of a plurality of trunk circuits, switching devices or interconnecting communication paths within the switching system. In addition, means are provided for determining and recording on a magnetic tape which ones of a plurality of subscribers' lines are interconnected with predetermined ones or predetermined groups of trunk circuits, switching devices or interconnecting paths.

In automatic telephone switching systems, it is also desirable to determine the holding time of various switching devices, paths, trunk circuits and the like. In other words, it is desirable to determine how long such circuits are employed in each call. It is also desirable to determine the time required for each of the various circuits to perform its function in establishing a call where this function is different from the holding time of such a circuit.

An object of the present invention is to provide means for automatically determining and recording on a magnetic tape the time required for switching devices to operate and perform a specified function in establishing a call or communication path. In accordance with an exemplary embodiment of this invention, means are provided for determining and recording on a magnetic tape the time required to connect dial tone to a subscriber's line after a subscriber initiates a call by picking up his telephone instrument.

Recording the condition of each of a plurality of line circuits, paths, switching devices and the like at frequent intervals of time requires a large capacity storage means so that it is desirable to code the information to be recorded so that the minimum of storage tape or other means is required.

An object of this invention therefore is to represent the busy or idle condition and other traffic information of each of a plurality of different circuits by means of coded groups of indicia.

In accordance with an exemplary embodiment of this invention the traffic conditions in an automatic telephone switching system is determined at predetermined instants of time; are recorded on three tracks on a magnetic tape. The magnetic condition of each of the tracks may be left in its virgin or neutral condition or it may be saturated in either a positive or negative direction. The signals to be recorded are substantially simultaneously applied to three recording devices which may record in a transverse line across the tape or in any other desired pattern and the various conditions applied to these three recording devices or heads are coded so as to permit the indication of a large number of different items to be recorded in a single transverse line or pattern across the tape. Means are also provided for recording different conditions of certain circuits or devices in two adjacent positions along the tape, i.e., in two successive lines or patterns across the tape in order to permit the recording of individual items of a still larger group of items in the tape.

In recording certain types of information it is desired to record the information as fast as is reasonably possible so that a complete picture of the traffic conditions at a given time may be rapidly obtained. Other types of information wherein the time required to perform certain functions is determined, the operation requires at least as long as the time of the function being timed. It is accordingly desirable to provide means for moving the recording medium or tape at least two different rates, one relatively fast or high speed during the determining of the conditions at a given instant of time at the switching center and at a slower rate where longer periods of time are required to determine the time of operation of a particular device.

In accordance with an exemplary embodiment of the present invention means are provided for moving the recording medium at different speeds. When the busy and idle conditions of a plurality of line circuits, trunks and switching devices are determined the tape is moved at a relatively faster speed so that the condition of these line trunk and circuits and devices may be readily obtained and recorded in a very short period of time. However, when it is desired to determine the time required for a particular device to operate or function means are provided for moving the recording medium or tape at a slower speed.

An object of this invention is to coordinate the operation of the record tape advancing mechanism with the other circuits and apparatus of the traffic sampling and recording system so that the tape will be advancing at a substantially constant speed in contact with the recording head or device at all times when recording signals are supplied to the recording head or device.

A feature of this invention relates to an improved scanning arrangement for determining the busy and idle conditions of each of a plurality of subscribers' lines at a predetermined instant of time. The scanning arrangement comprises a plurality of diode gates controlled by potentials derived from electronic circuits and devices. No mechanically moving parts are required to sample or determine the busy or idle condition of each of a plurality of lines, trunks or switching circuits or devices.

Furthermore, the scanning arrangement is arranged to automatically apply a superaudible frequency to each of the lines or trunks or other devices scanned, when desired, when such line or trunk or device becomes busy and to automatically remove the application of said superaudible frequency when said line is connected to a test circuit so that the presence of the same or another superaudible frequency may be determined without interference from the frequency applied to the line or device through the scanning network or matrix. The connection of a line to a predetermined trunk or groups of trunks is determined by applying superaudible frequencies to the trunks or line circuits in question and then determining which of these frequencies are present on the line when it is sampled by means of the gate or matrix circuit. The condition of the sleeve as well as the superaudible frequency or frequencies obtained from the line in question are detected and coded and employed to control the recording of magnetic conditions or spots in tracks on a magnetic tape.

Another object of this invention is to arrange scanning circuits so as to attenuate transmission of superaudible tones to its output when it is idle or when it scans idle lines and to transmit such tones to its output circuit without substantial attenuation when busy lines, circuits or apparatus are scanned.

A feature of this invention provides interlocking means whereby during the recording of signals or magnetic conditions on the tape either by the sampling and scanning arrangement or by the arrangement for recording the time required for a specific piece of apparatus or circuit to function the other of these two sampling and recording control portions are prevented from functioning. Thus during the time the plurality of lines are being scanned for busy conditions and other interconnecting conditions, the apparatus for recording the time required for a circuit to perform its function is prevented from recording signals on the tape. Similarly when this apparatus is recording signals on the tape the scanning apparatus cannot be set into operation.

Another object of this invention is to provide a program control circuit which will initiate the operation of both types of sampling and recording during specified intervals during the day. Thus the program circuit may initiate the operation of the scanning and recording apparatus for as many or as few sessions as may be required or desired. For example, the scanning and recording apparatus may be operated for a period during the morning and another period during the afternoon. When desired the afternoon period may be delayed until evening or three periods may be provided, a morning period, afternoon period and an evening period. When desired, other or more periods may be provided. For example, the sampling and recording equipment in accordance with this invention may be set into operation during two or more periods in the morning, two or more periods in the afternoon or two or more periods in the evening or at all of said different periods of times and also at other different periods when desired.

Another object of this invention relates to control circuits and means for two similar switching diode matrices, wherein control potentials are derived from the establishing of a path through one of the matrices for controlling the establishing of a corresponding and related path through the other of the switching matrices.

Another object of this invention relates to control circuits and means for controlling a switching diode matrix wherein control potentials are derived from the establishing of a path through said matrix for locking in or maintaining the established path through said matrix and locking out or preventing the establishing of other possible paths through said matrix.

Another feature of this invention provides indexing or identification marks or symbols on the tape preceding the recording of the results of each of the scanning operations or cycles so as to indicate whether this scanning took place during the morning or afternoon or other periods of time.

In making traffic studies in automatic telephone switching systems in addition to knowing the lines and other equipment which may be busy at a different instant of time and also in addition to knowing the time required to perform certain functions, it is desirable to know or be able to trace certain of the connections. Thus it is desired to know when a line is connected to another line of the same switching center. In other words, it is desirable to determine what percentage of traffic is intraoffice traffic and what percentage is interoffice traffic. Furthermore, it is desirable to know the calling rate on certain trunks to various offices, to operators and other types of trunks.

An object of this invention is to provide means for supplying superaudible tones to numerous circuits, trunks or other communication apparatus and then observe or detect these tones when they occur on the subscribers' lines or other trunk circuits being scanned by the sampling and scanning equipment. In this manner the actual interconnections between the subscribers' lines and various of the other communication paths extending to trunk circuits or other subscribers' lines or equipment employed in the central office are determined and recorded.

The foregoing and other objects and features of the invention may be more readily determined from the following description with reference to the attached drawing in which.

Figure 3:
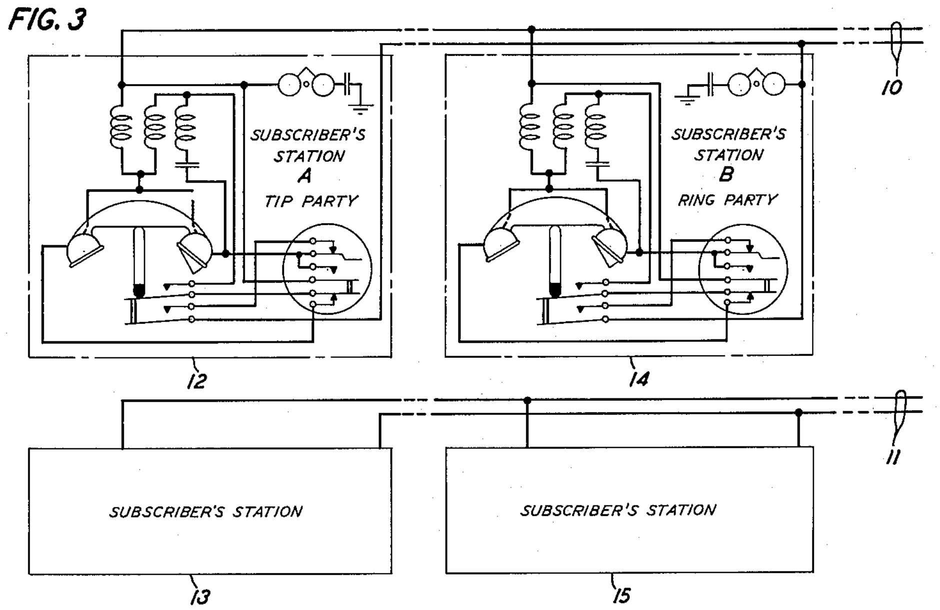
Figure 2:
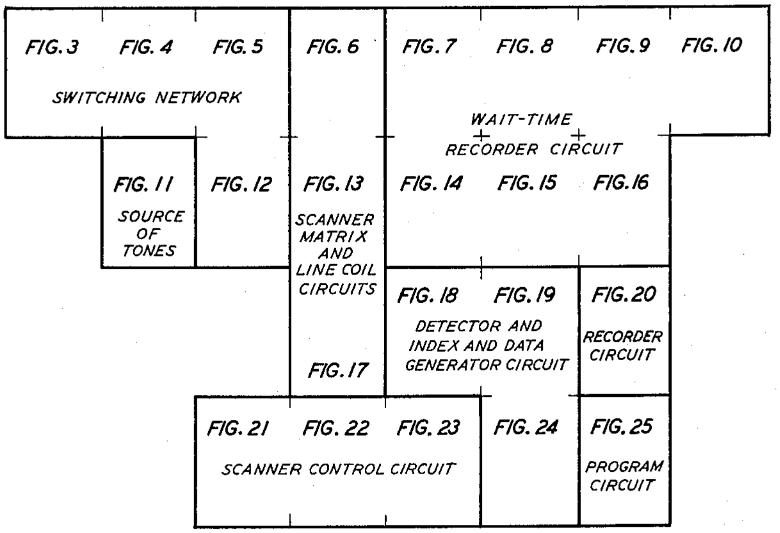
Fig. 2 shows the manner in which Figs. 3 through 25, inclusive are arranged adjacent one another.
Figure 4:
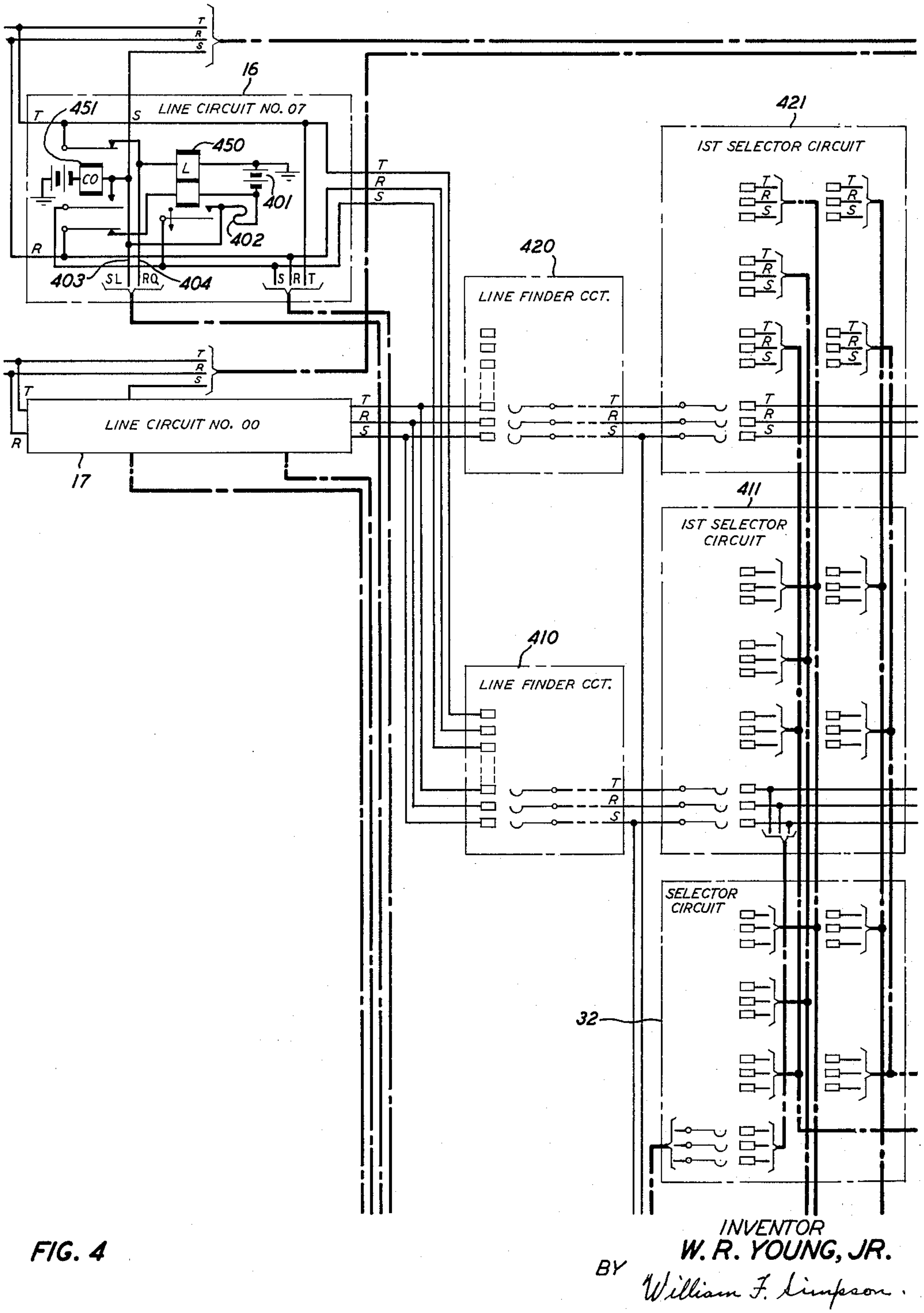
Figure 5:
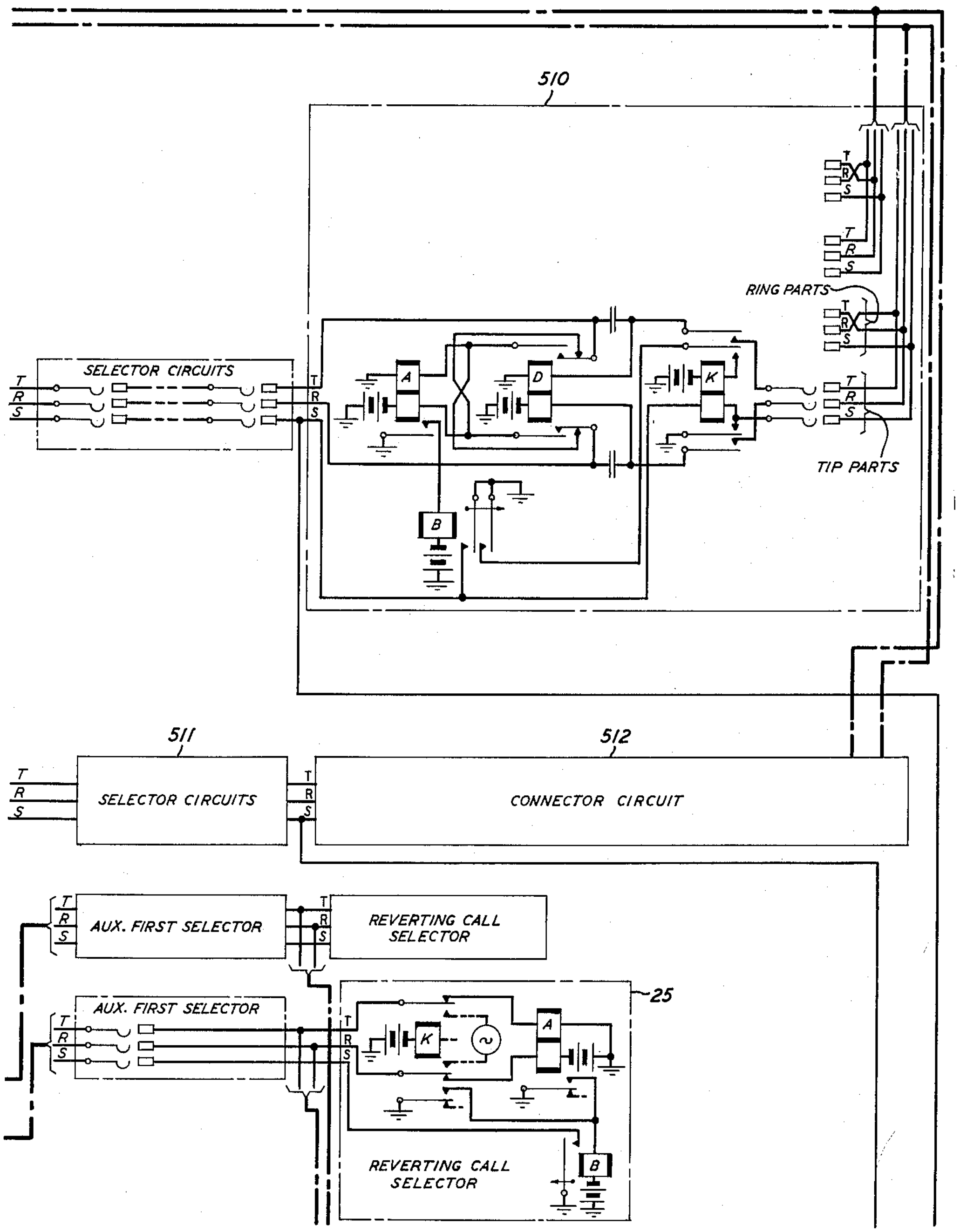
Figure 6:
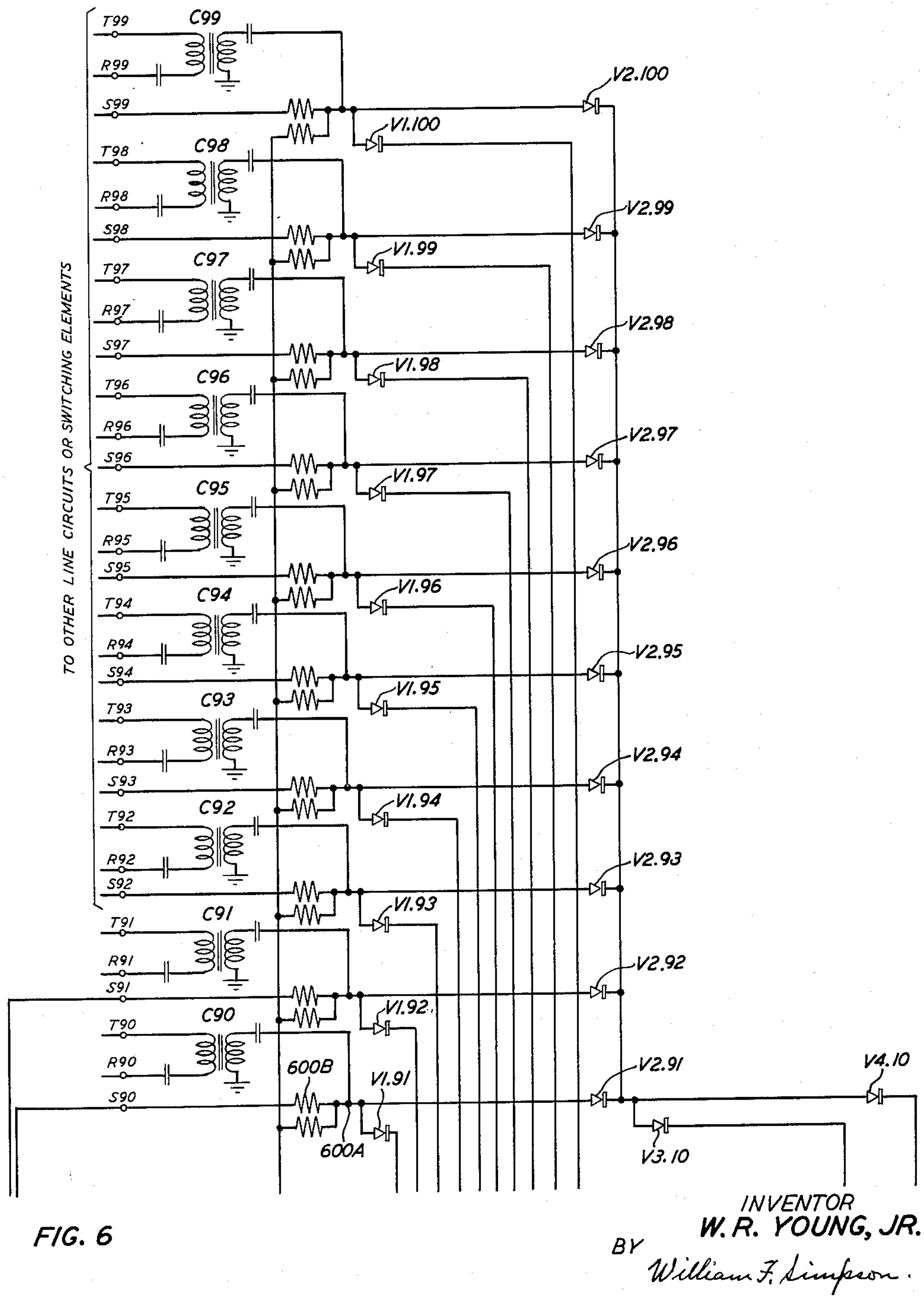
Figure 7:
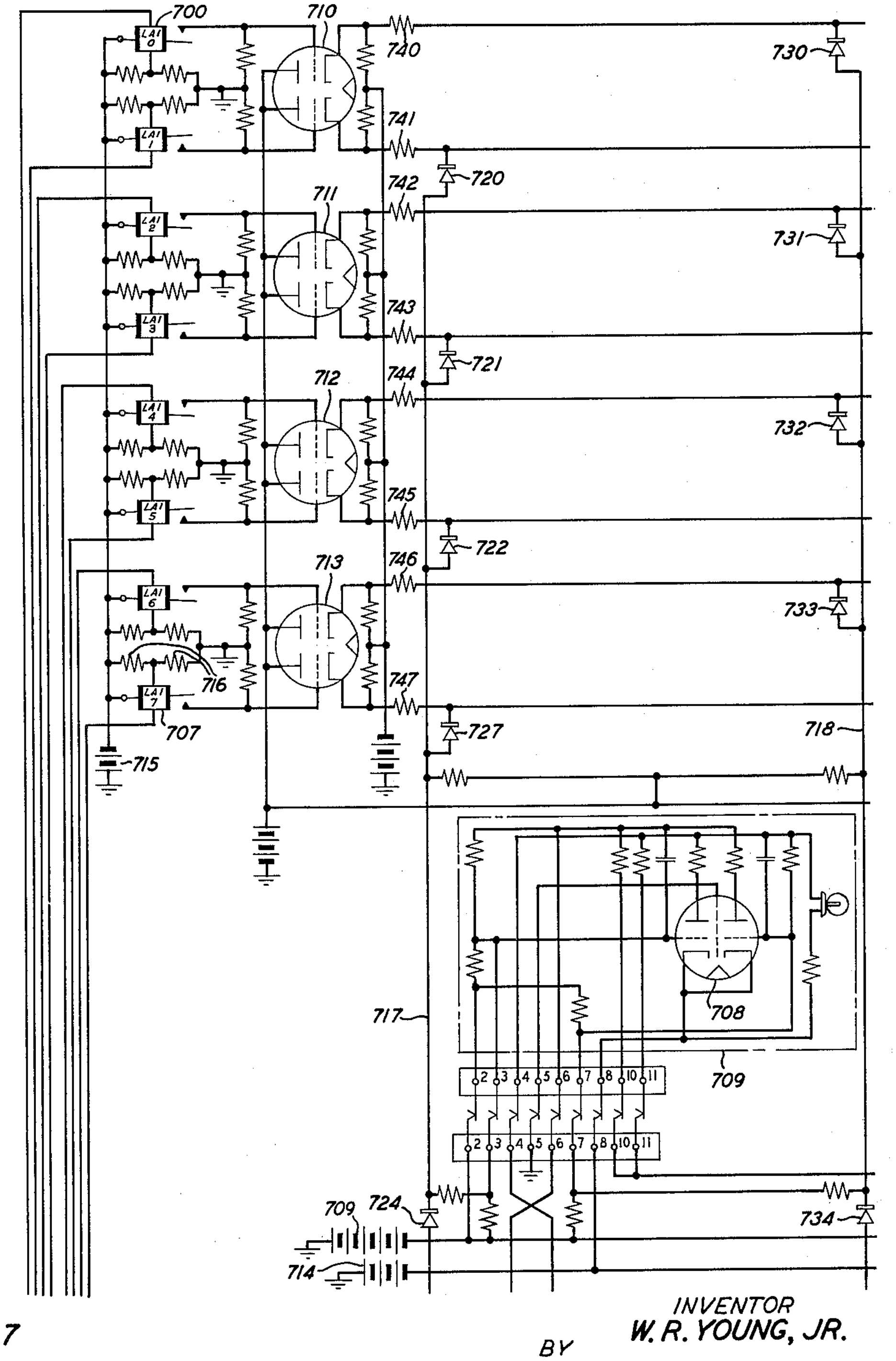
Figure 8:
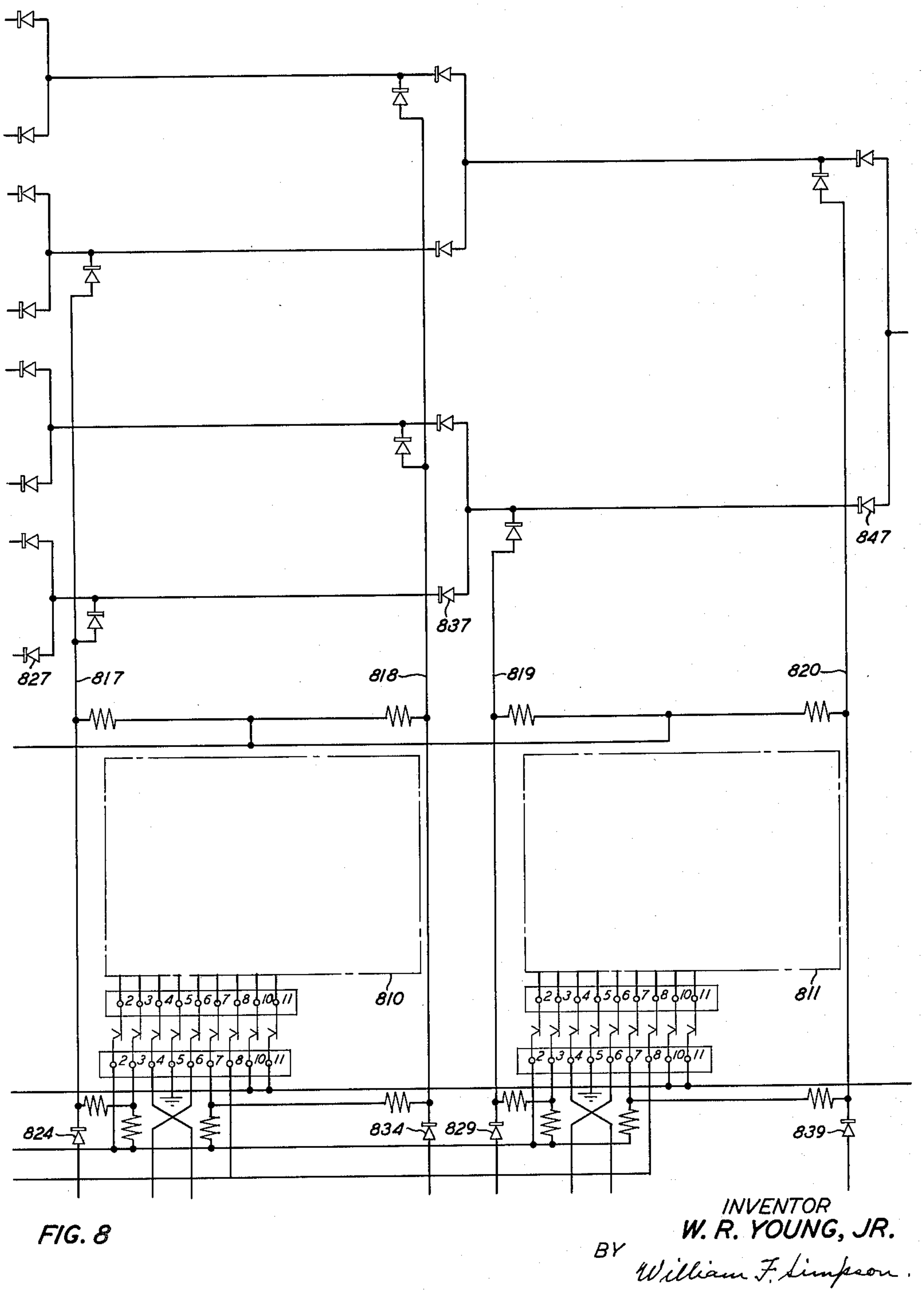
Figure 9:
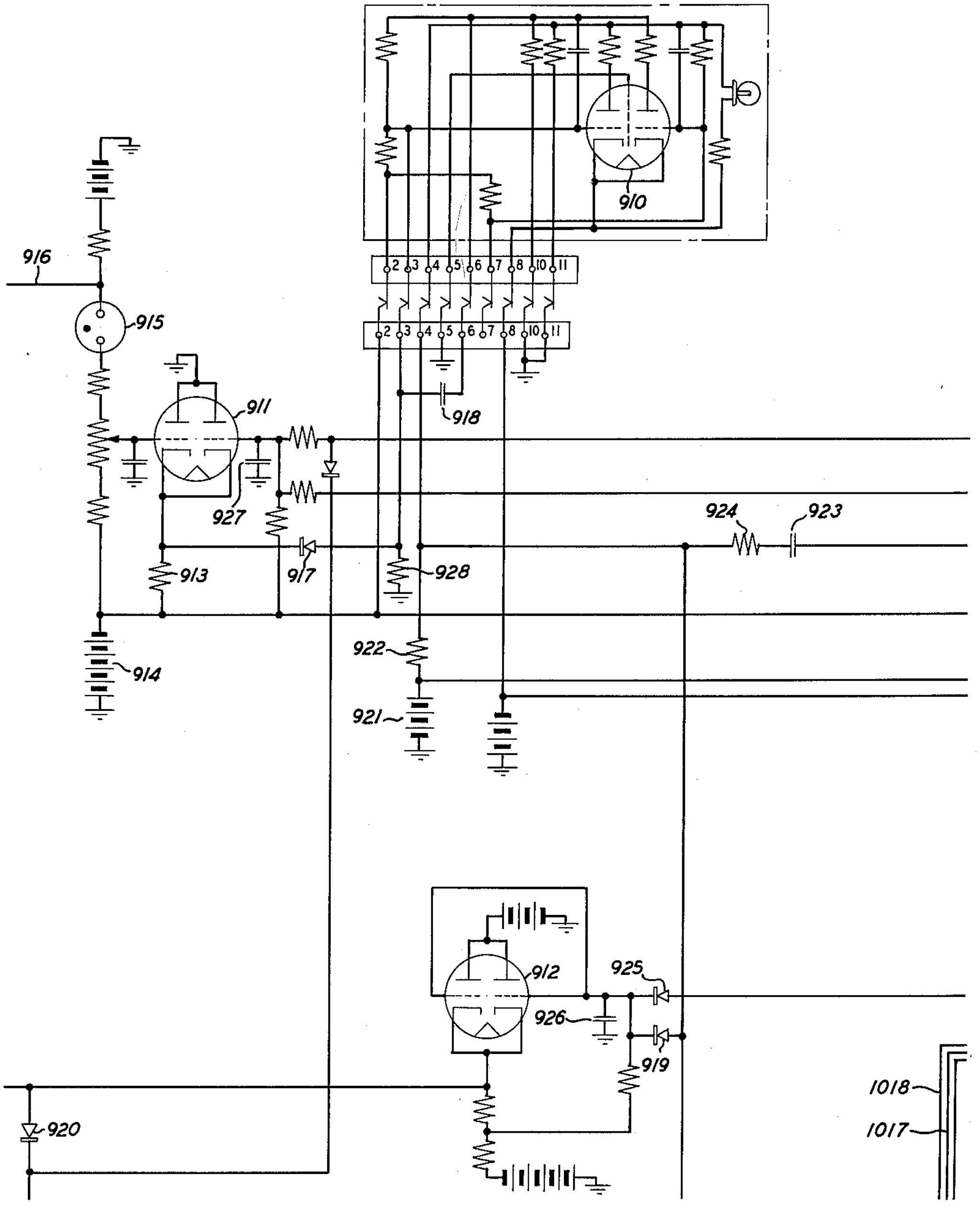
Figure 10:
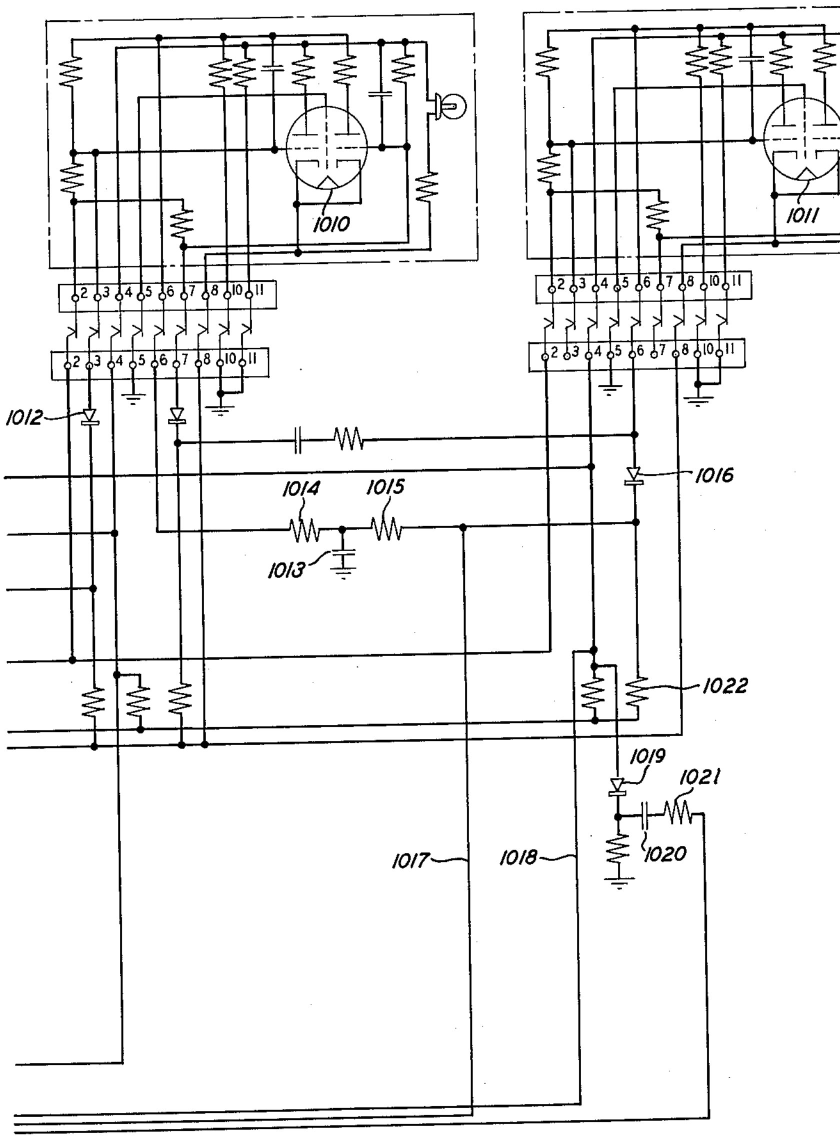
Figure 11:
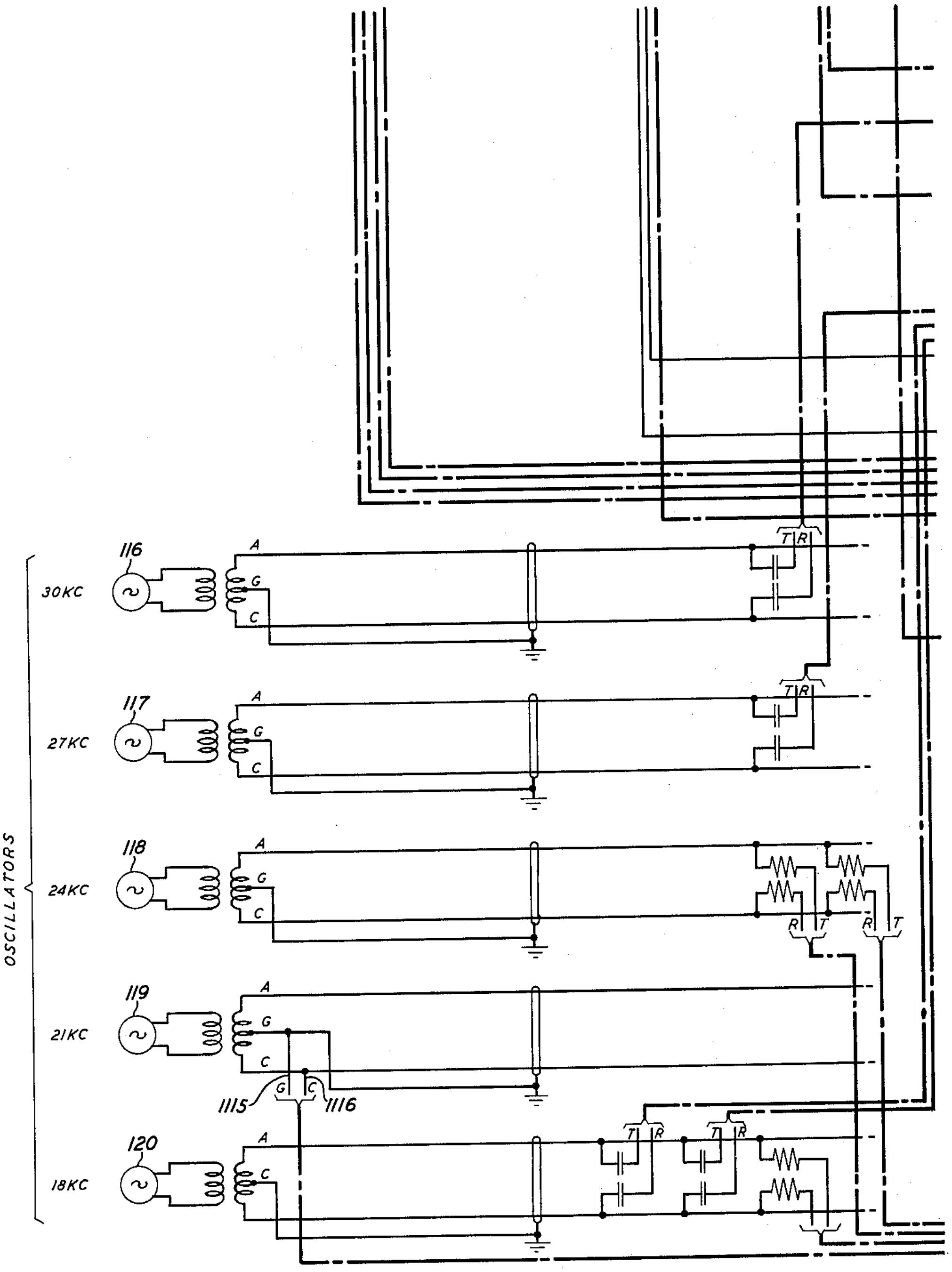
Figure 12:
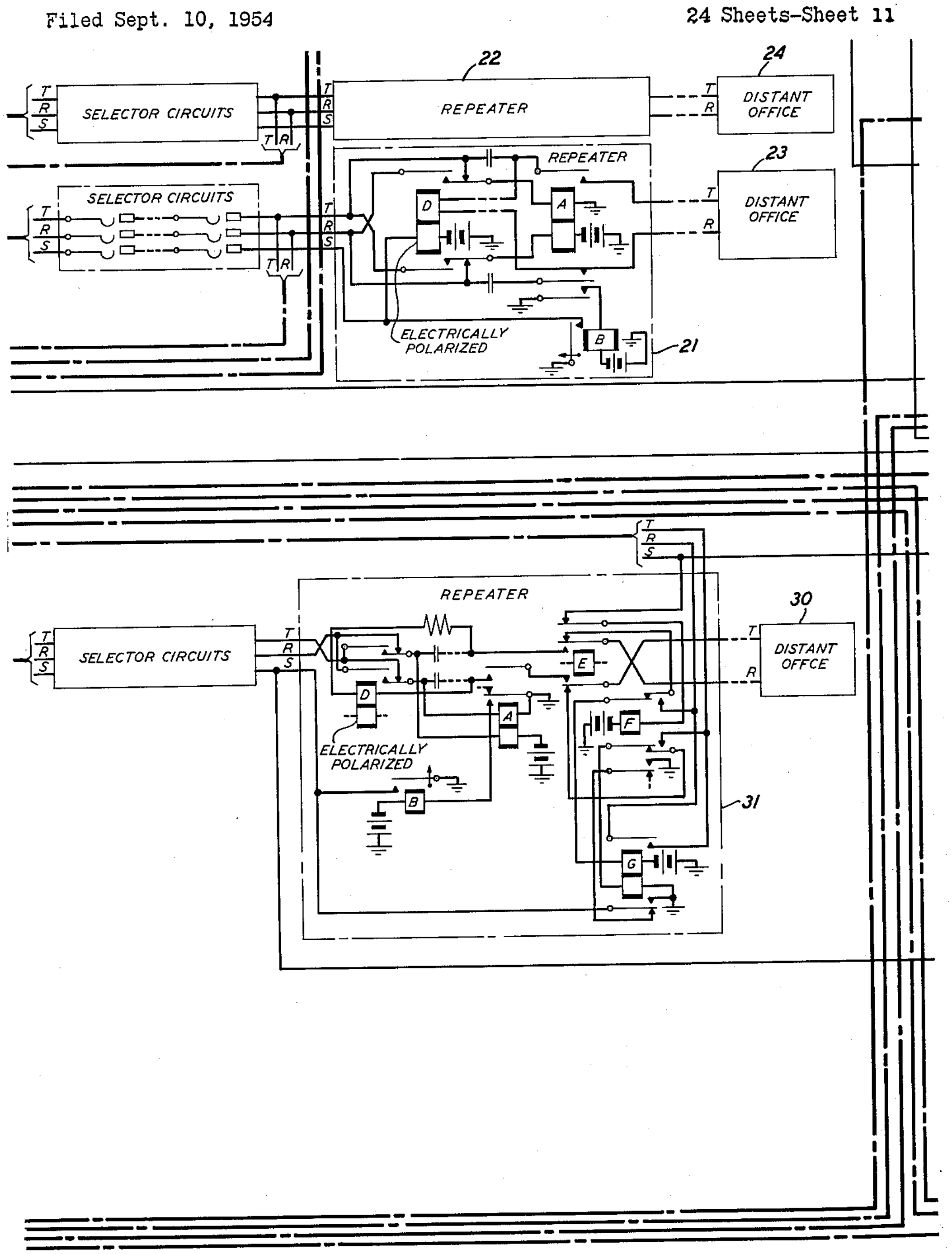
Figure 13:
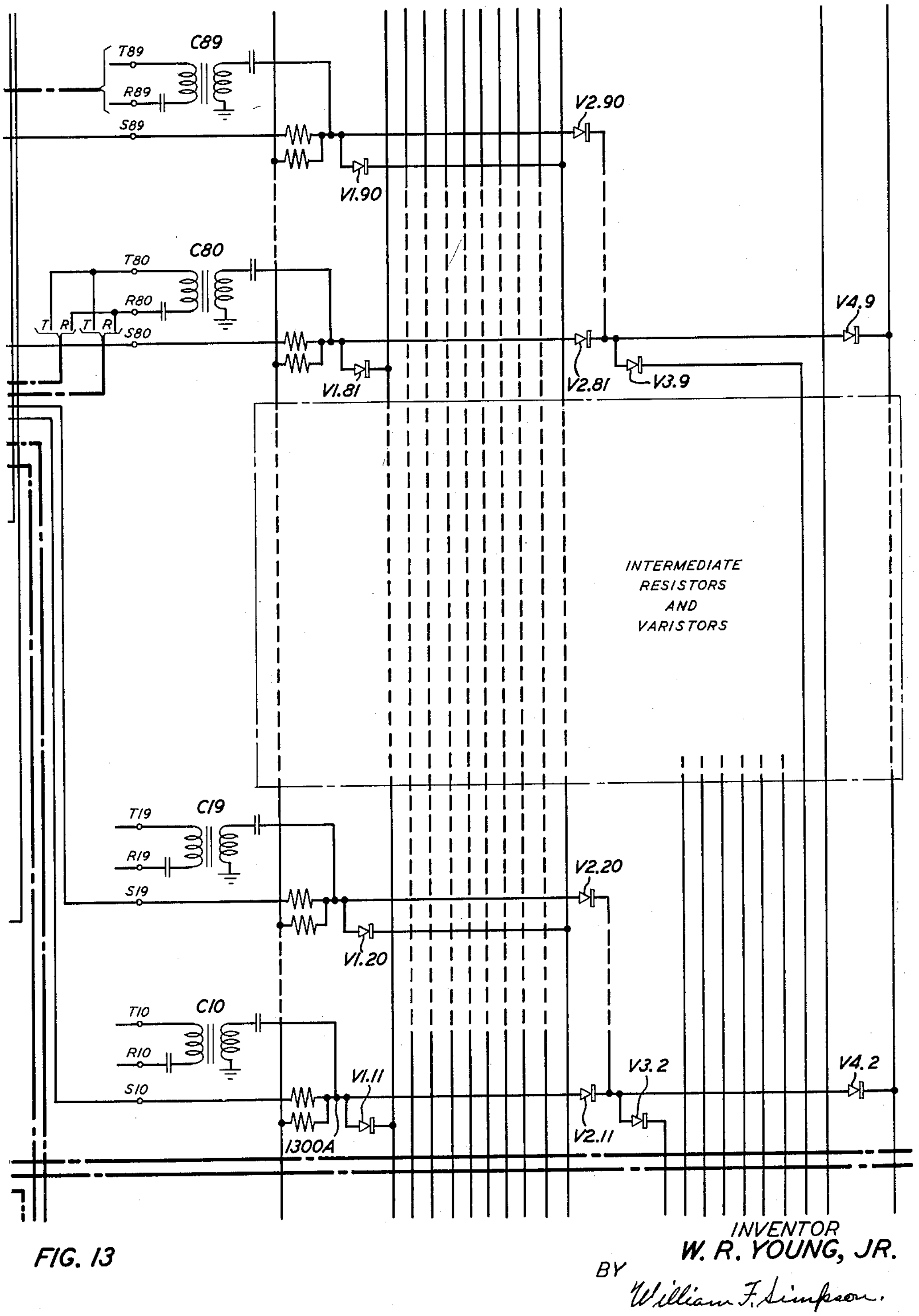
Figure 14:
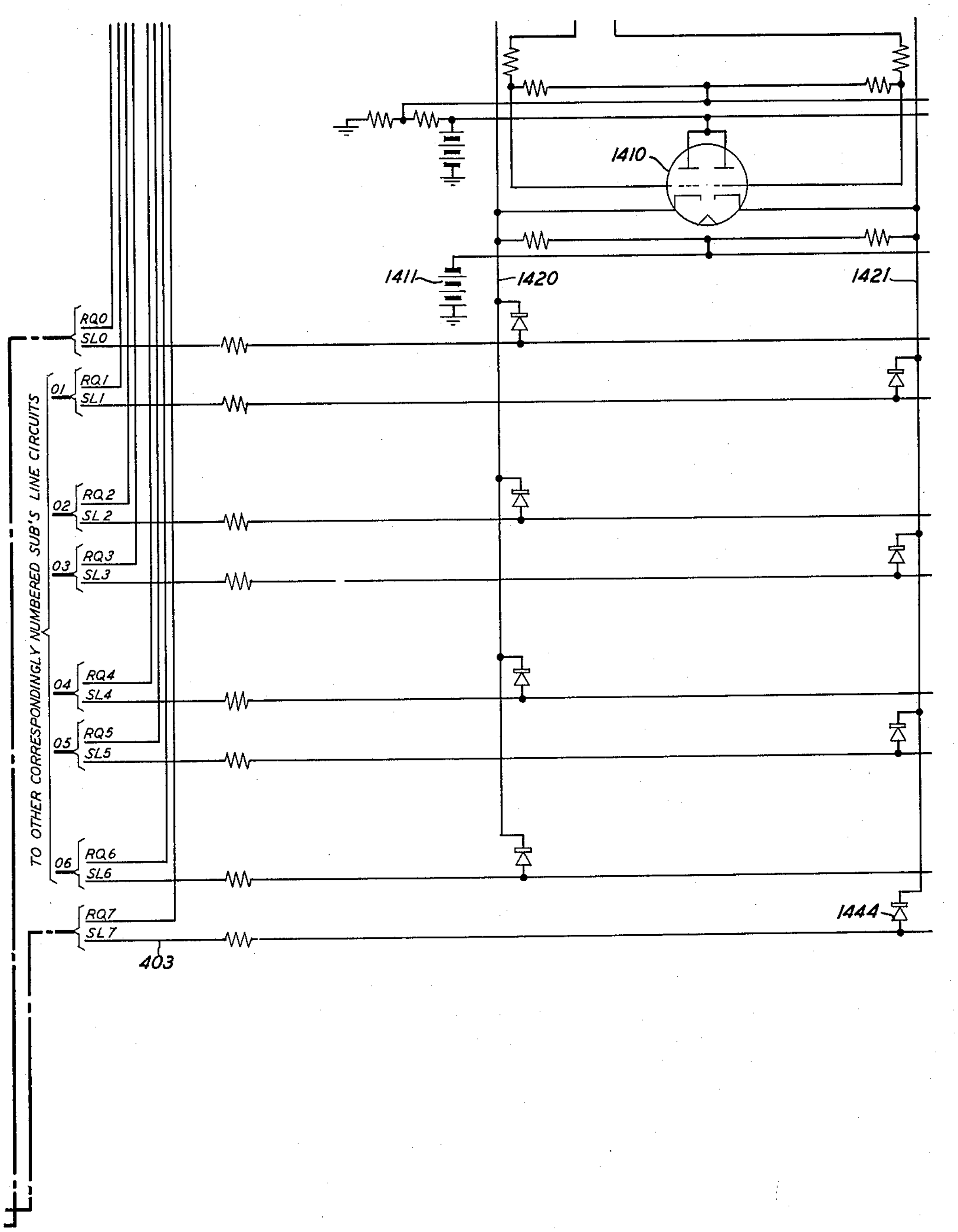
Figure 15:
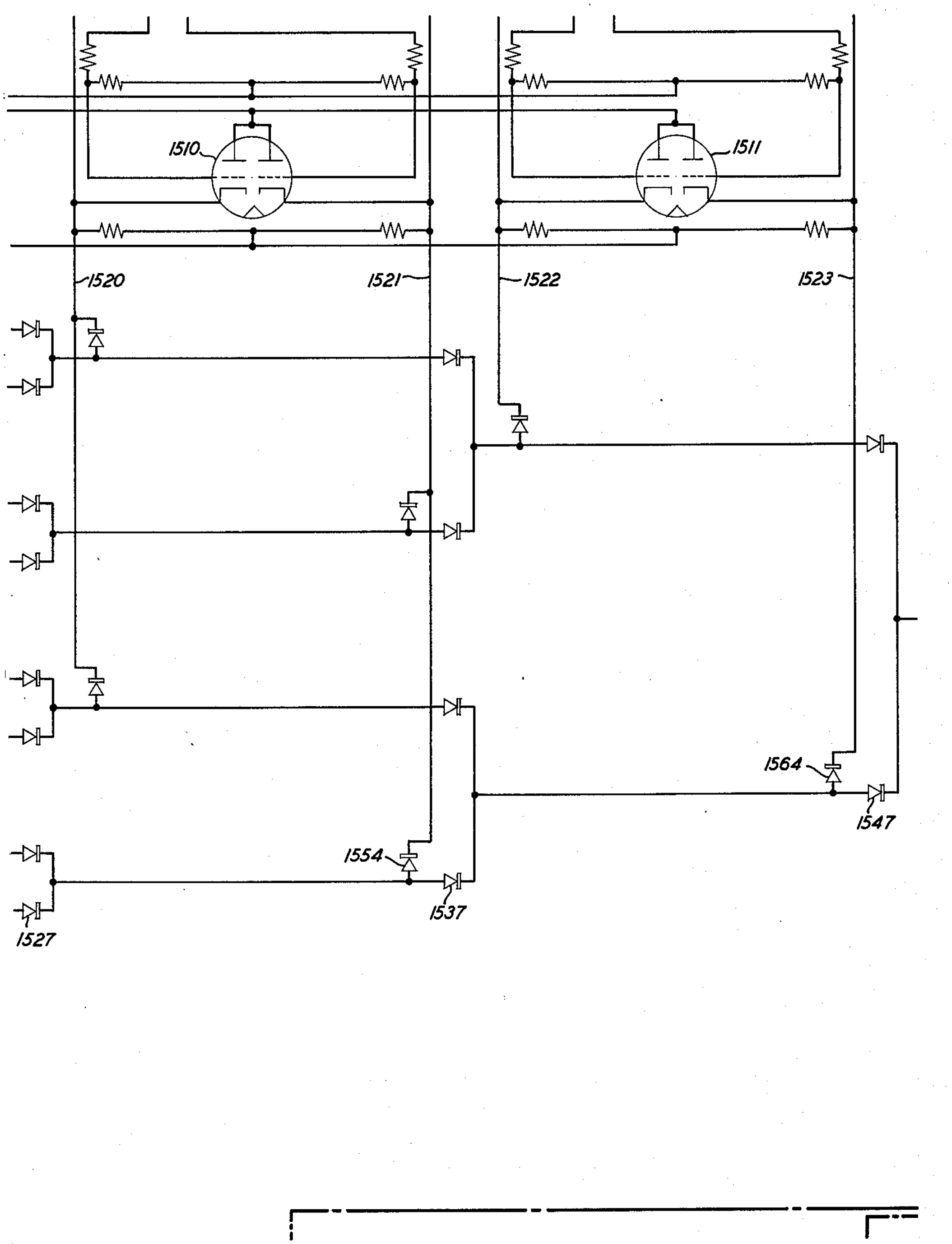
Figure 16:
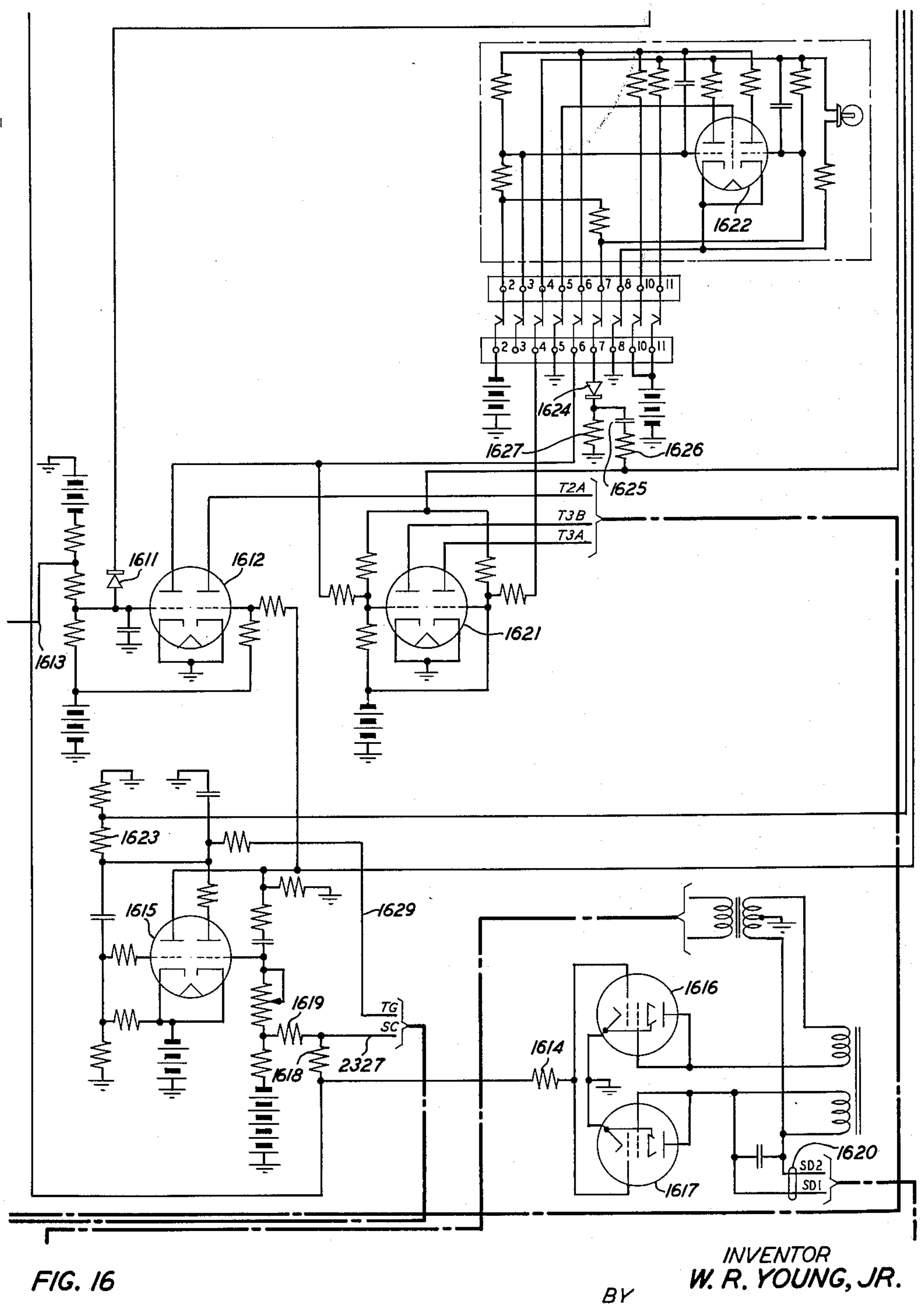
Figure 17:
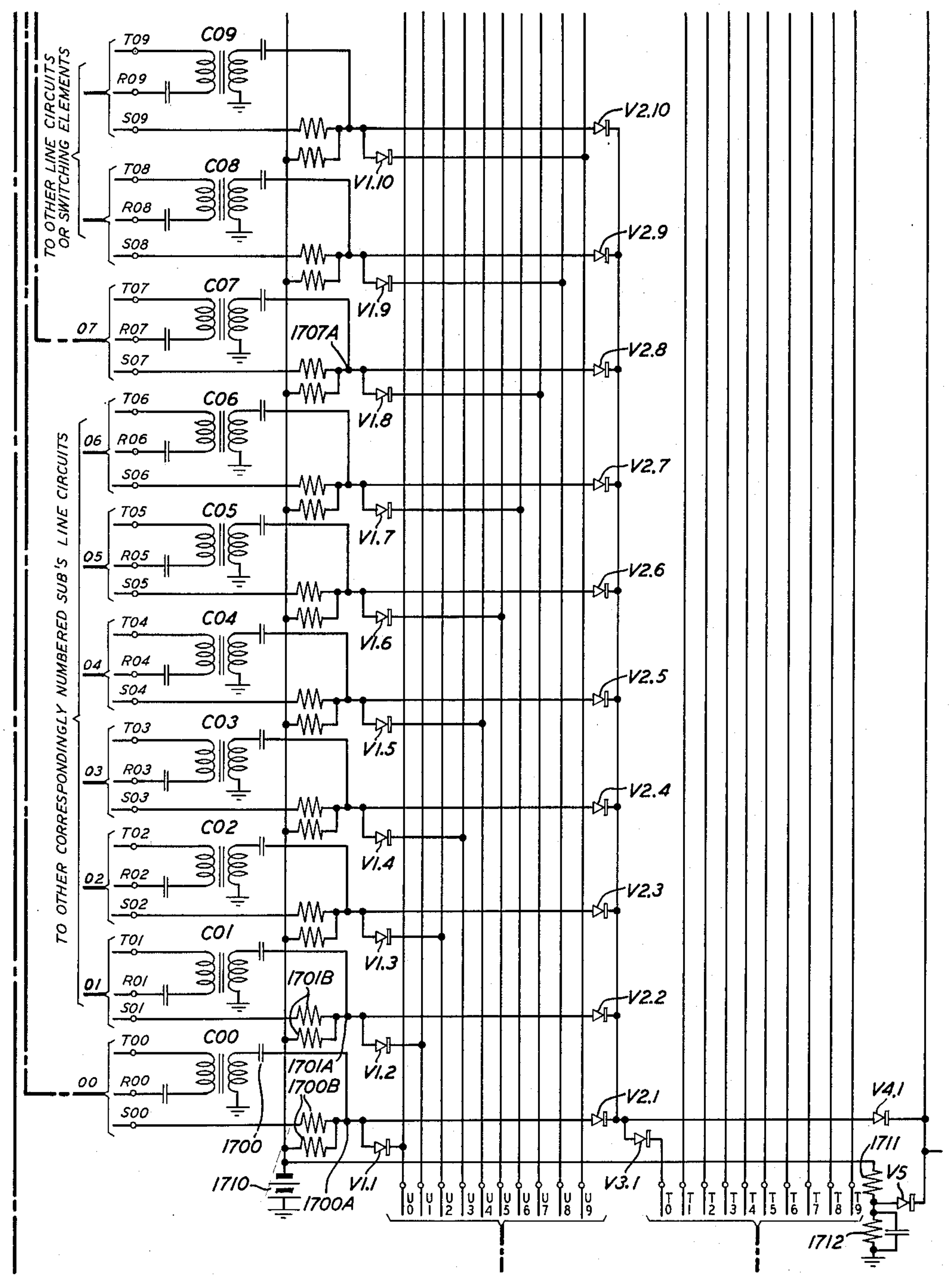
Figure 18:
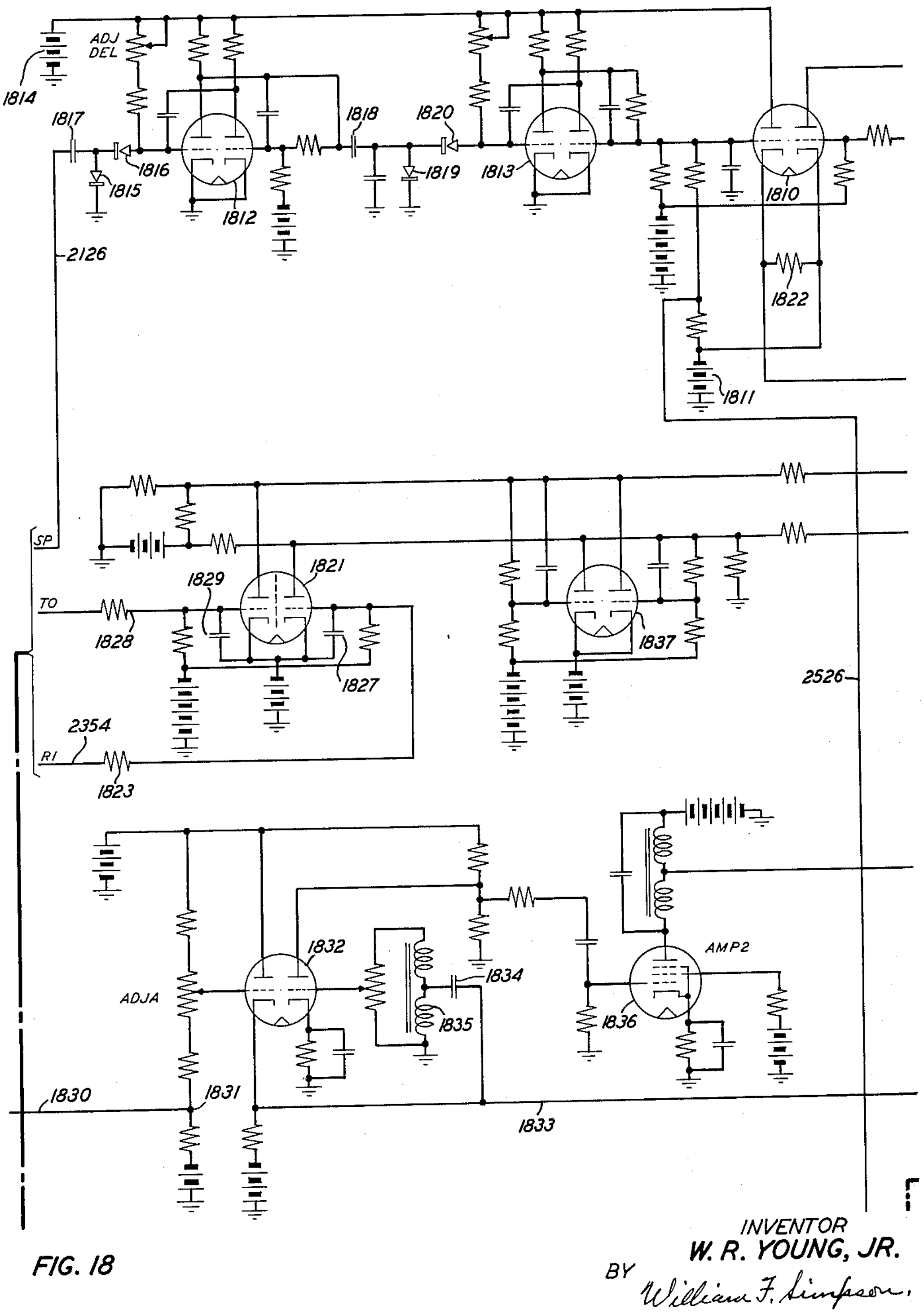
Figure 19:
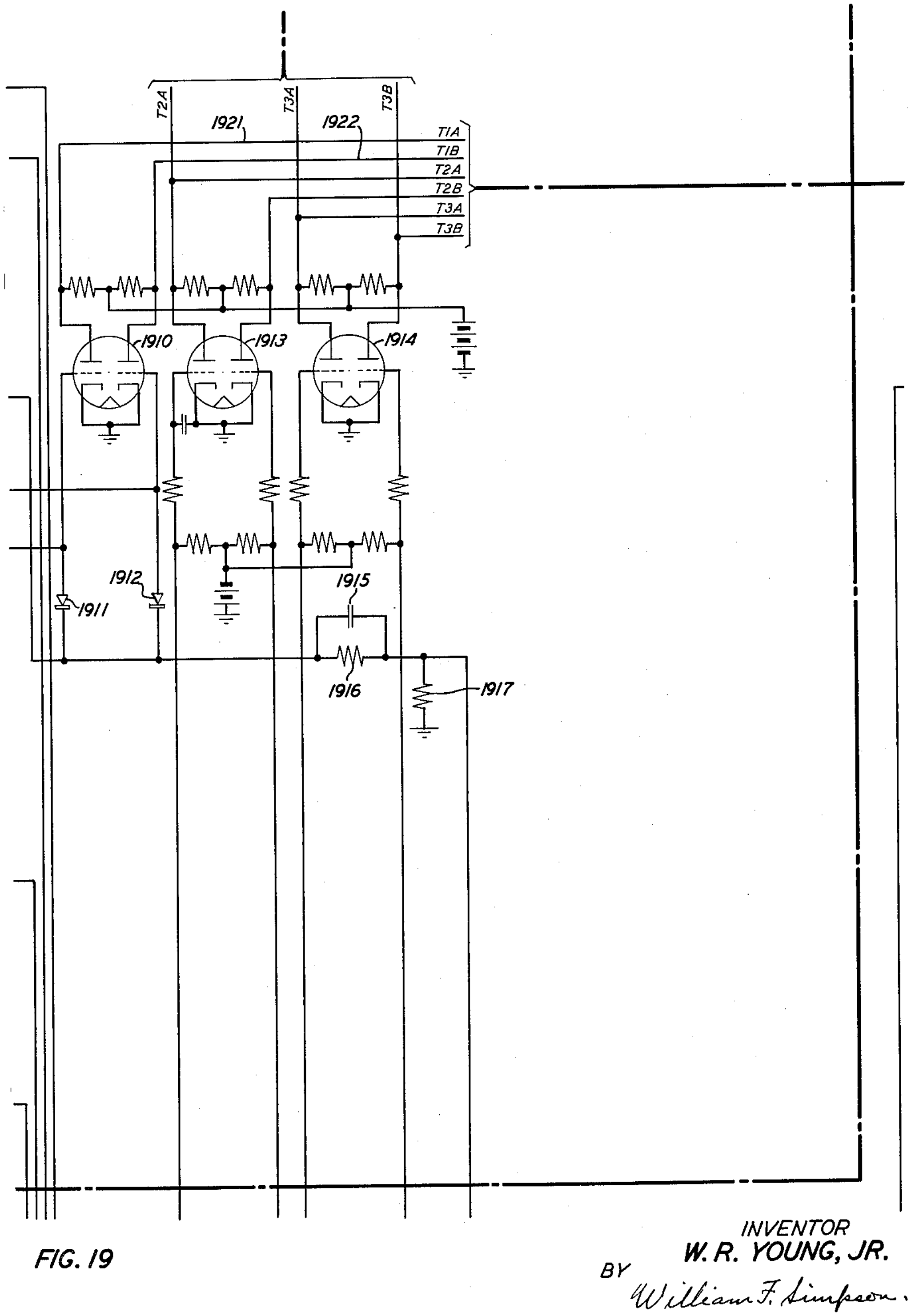
Figure 20:
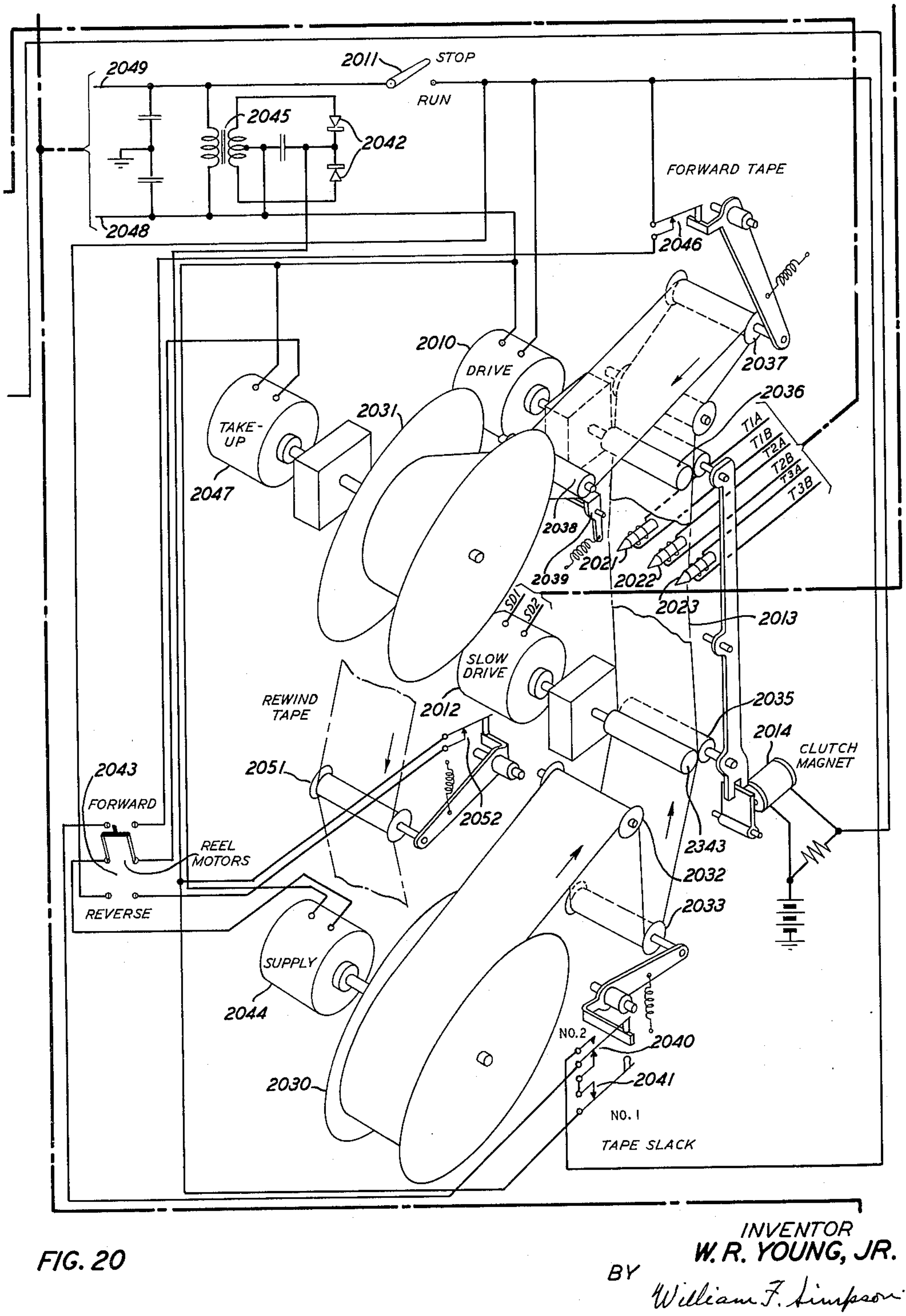
Figure 21:
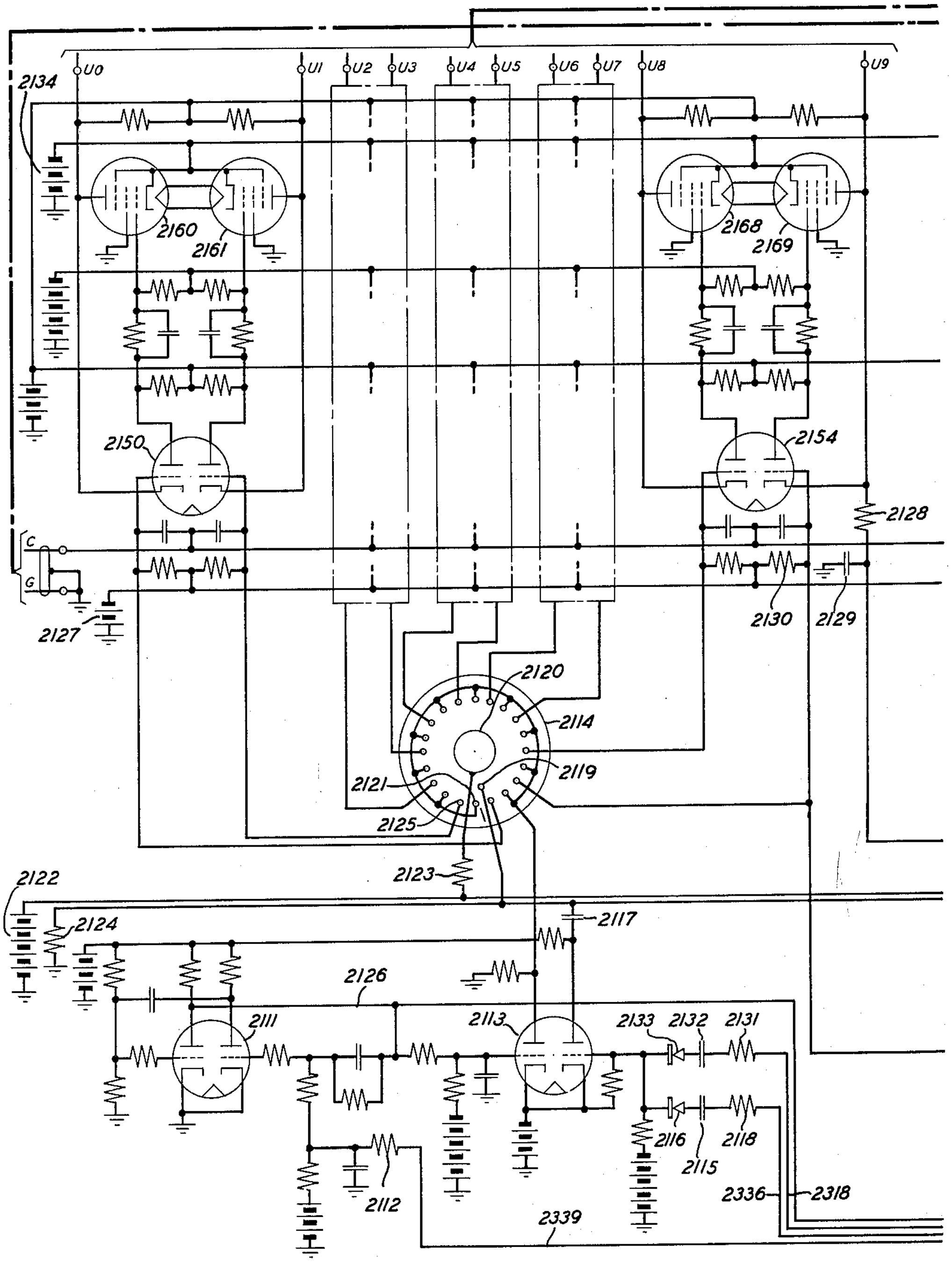
Figure 22:
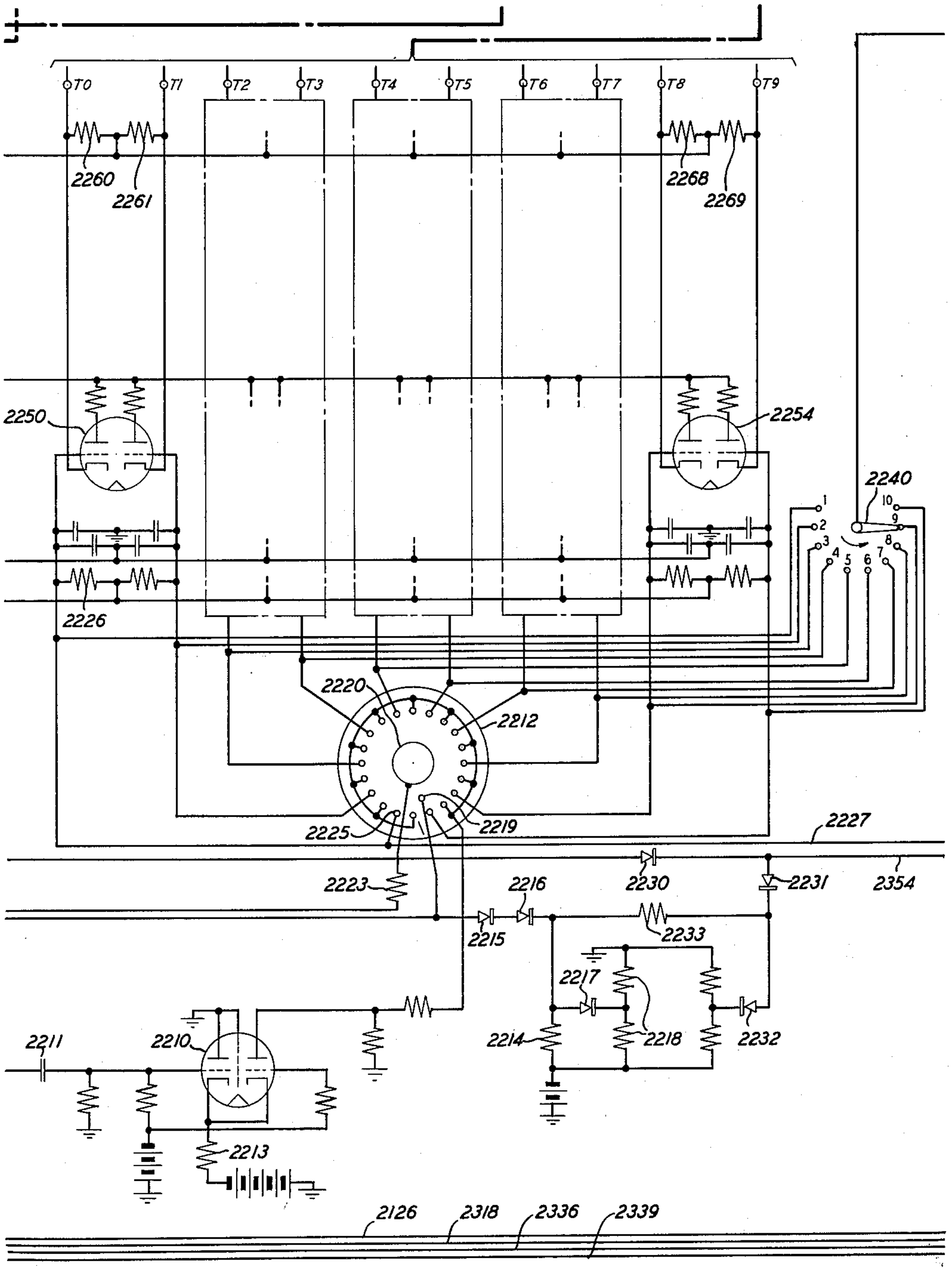
Figure 23:
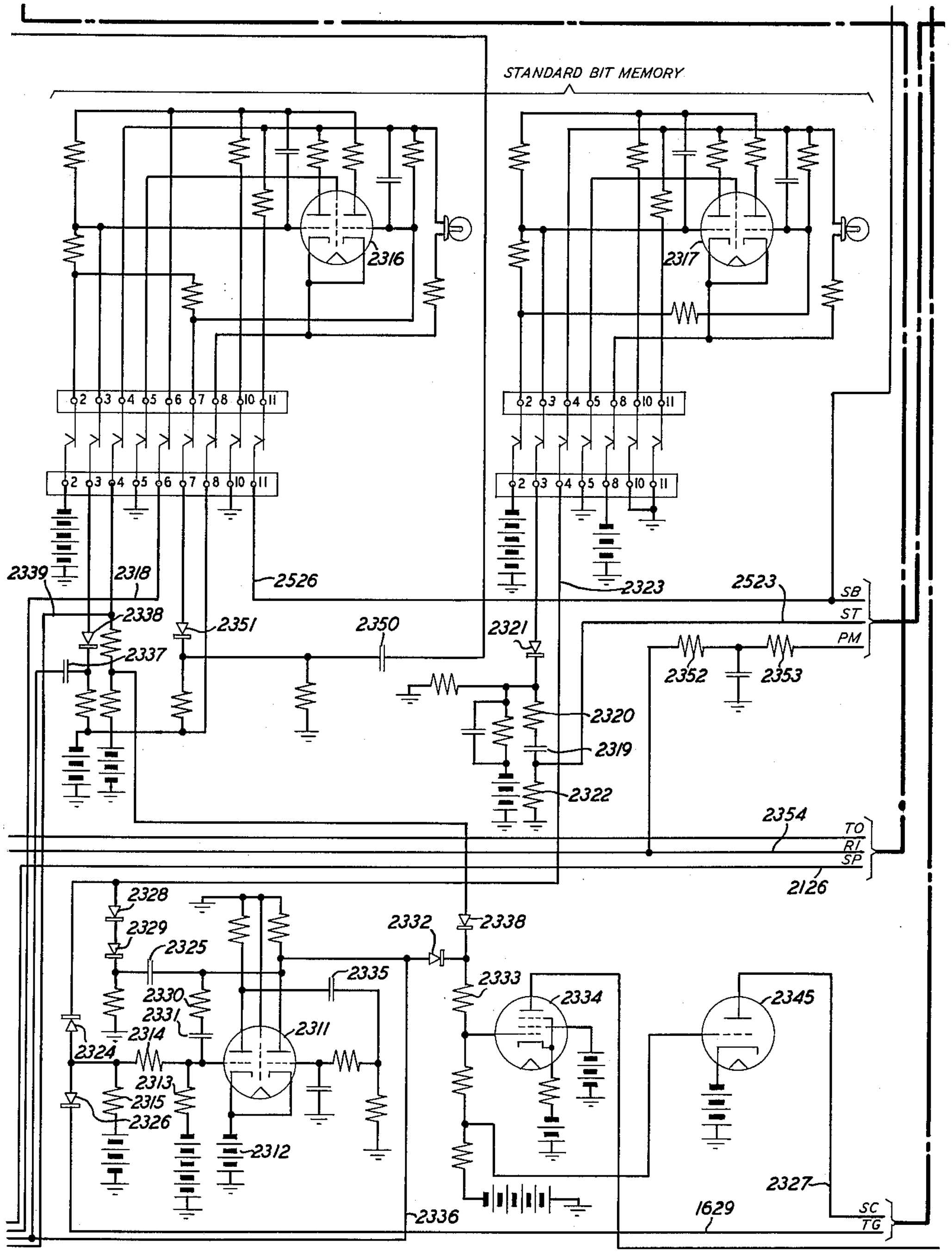
Figure 24:
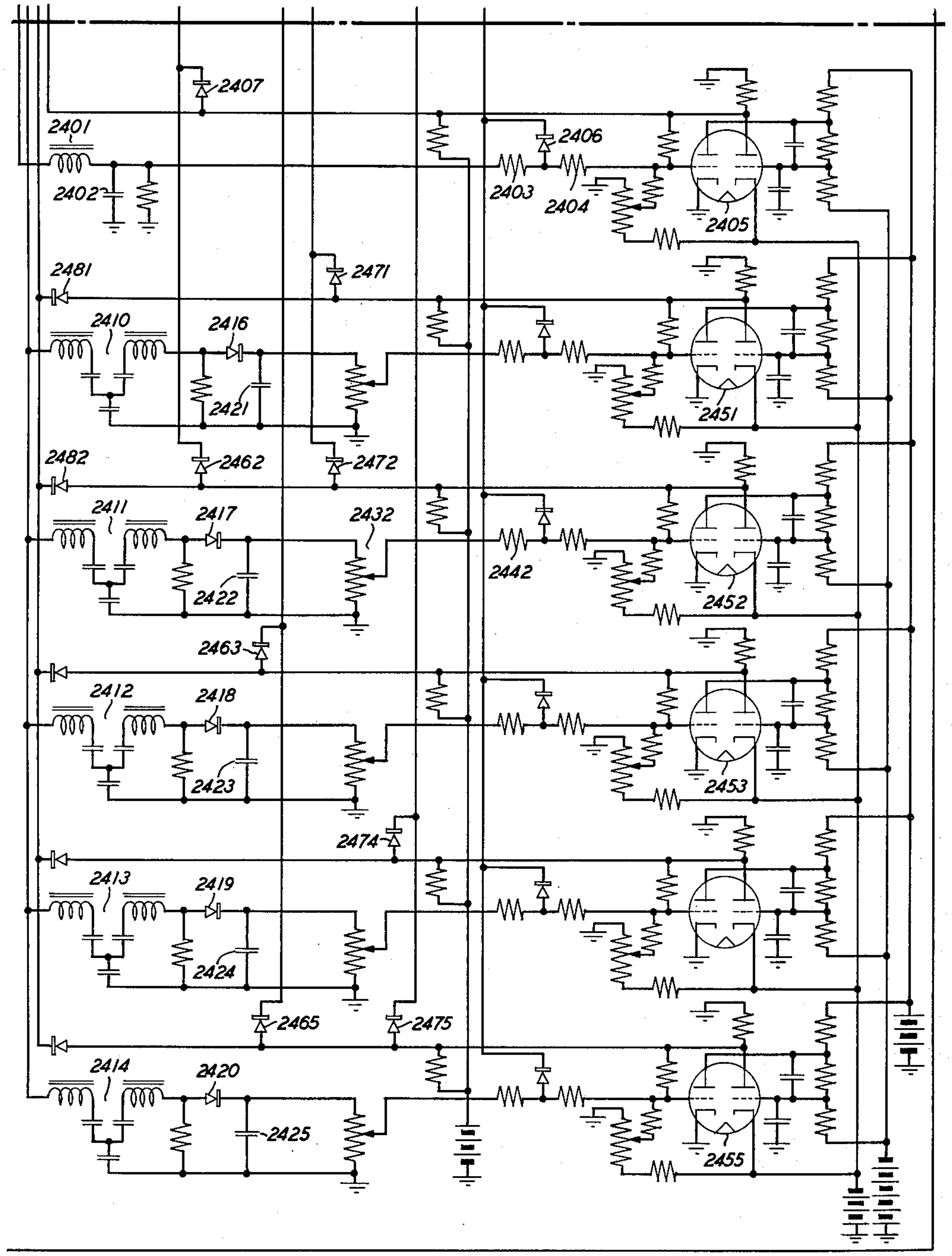

Figs. 3 through 25, inclusive when arranged adjacent one another as shown in Fig. 2, show the details of an exemplary embodiment of this invention arranged to cooperate with a step-by-step automatic telephone switching system;

Fig. 3 shows details of exemplary subscribers' line circuits of an automatic telephone system;

Fig. 4 shows line circuits, line finders and selectors of a step-by-step switching system in which it is desired to sample and record traffic;

Fig. 5 shows additional selector circuits, connector circuits, and reverting call selectors of such a system;

Fig. 6 shows a portion of a diode scanner and line coil system for interconnecting elements of a telephone switching system with an exemplary embodiment of an automatic telephone traffic sampler and recorder in accordance with this invention;

Fig. 7 shows the input circuits to a timing circuit;

Fig. 8 shows a diode switching circuit;

Fig. 9 shows a portion of a timing control circuit including a double stability or flip-flop circuit;

Fig. 10 shows additional portions of the timing control circuit including additional flip-flop circuits;

Fig. 11 shows a plurality of oscillators;

Fig. 12 shows additional selector circuits and repeater circuits connected to trunks extending to other switching centers or central offices;

Fig. 13 shows another portion of a diode scanning circuit;

Fig. 14 shows a portion of a switching network and circuits therefor;

Fig. 15 shows an additional portion of a switching network;

Fig. 16 shows interlocking control circuits and recording circuits;

Fig. 17 shows another portion of the diode scanning circuit and coil circuits for interconnecting with subscriber lines and other switching equipment;

Fig. 18 shows a pulse shaping circuit and interlocking control circuits;

Fig. 19 shows recording amplifiers;

Fig. 20 shows the mechanical arrangement for moving a magnetic tape past magnetic recording devices or heads;

Fig. 21 shows the units control circuits for the diode scanner;

Fig. 22 shows the tens control circuits for the diode scanner;

Fig. 23 shows the starting and interlocking control circuits for setting the circuits of Figs. 21 and 22;

Fig. 24 shows filter, detecting and encoding circuits; and

Figure 25:
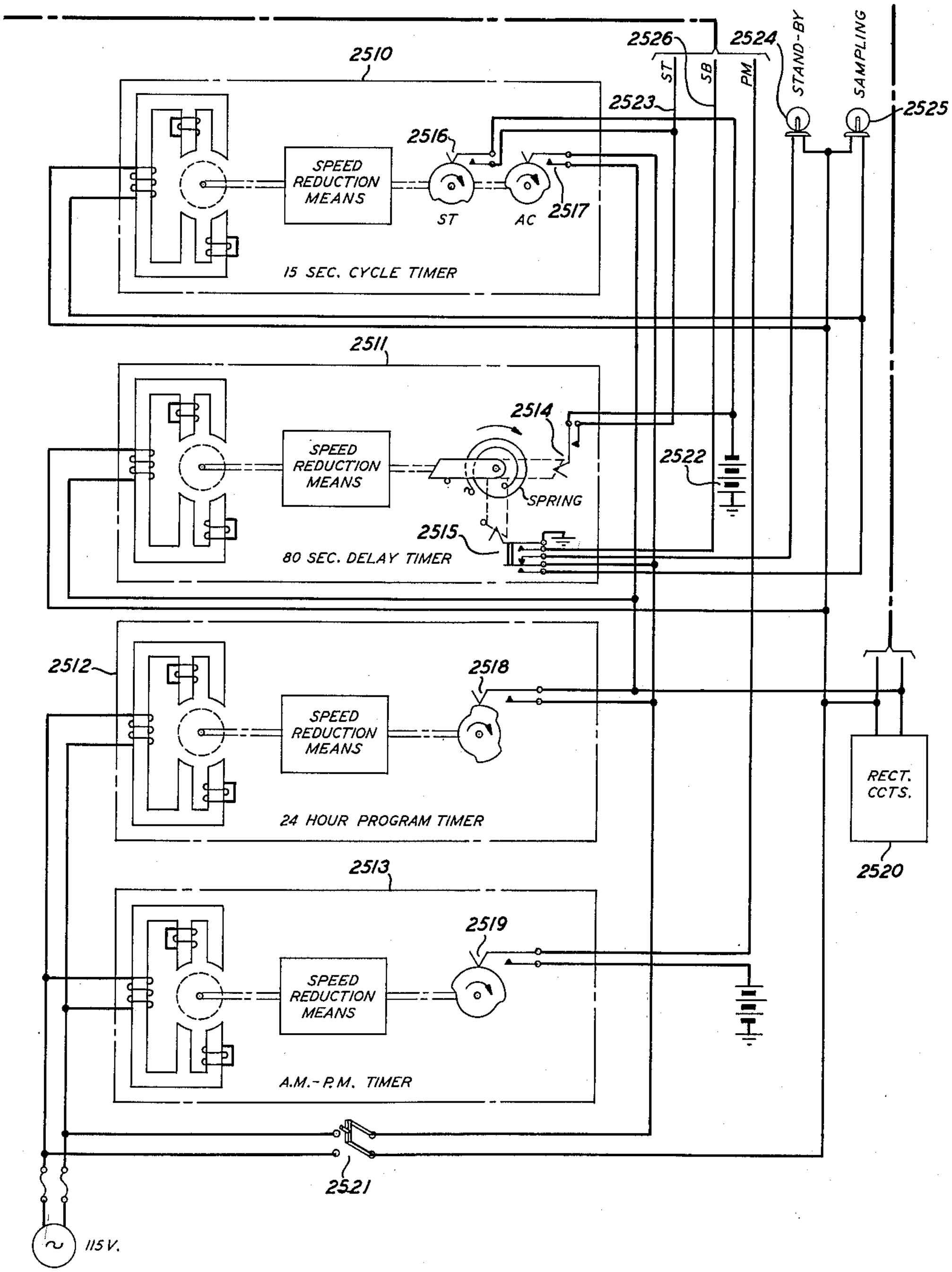

Fig. 25 shows the program control circuit.

Figure 1:
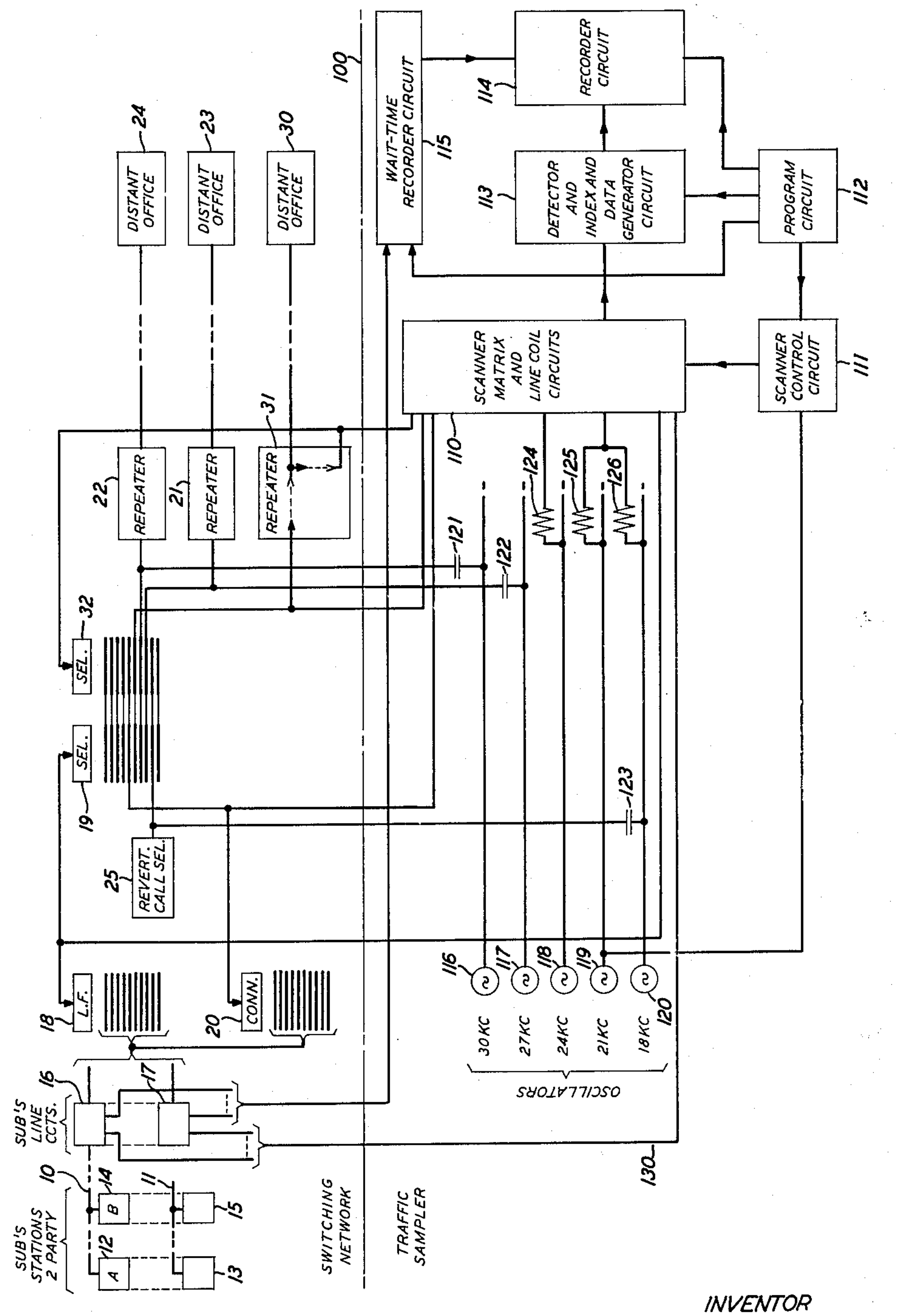
Fig. 1 shows in outline form the elements of applicant's automatic traffic sampler and recorder and the manner in which these elements cooperate with each other and the manner in which these elements cooperate with the elements of an exemplary automatic switching system.

Fig. 1 shows in outline form various elements of an exemplary embodiment of this invention and the manner in which they are interconnected with various elements of an automatic telephone switching system. The equipment represented above line 100 comprises various types of apparatus, devices and circuits employed in an automatic telephone switching system. In the exemplary embodiment described herein in detail, this automatic switching system is of the step-by-step or Strowger type.

The traffic sampler and recording methods, circuits and apparatus in accordance with this invention cooperate equally well and in substantially the same manner with other types of switching systems including manual switching systems, the so-called panel type automatic switching systems, crossbar automatic switching systems, including the so-called No. 1 crossbar, No. 5 crossbar and toll crossbar switching systems. The circuits in accordance with this invention also cooperate equally well with other types of switching systems such as the types employing the X—Y switches as well as common control and step-by-step and other types of automatic switching circuits employed in Europe and other foreign countries.

Referring more specifically to the arrangement shown in Fig. 1, 12 and 14 represent two subscribers' stations connected to a party line 10, and 13 and 15 represent two other party line subscriber station circuits connected to line 11. Lines 10 and 11 extend to a central switching station where they are connected to the subscriber line circuits 16 and 17, respectively. The subscriber station circuits 12 through 15 represent a plurality of subscribers' stations connected to an automatic switching system, while subscriber lines 10 and 11 represent corresponding subscriber lines. These lines represent both single and multiparty subscribers' lines and may have more than two stations connected to them when it is so desired.

The subscribers' line circuits 16 and 17 are connected to line finder equipment 18 which usually includes a plurality of line finder switches, but may include rotary line switches or other types of line switches or other types of line finders. Line finders 18 are connected to selectors 19 which in turn are connected to reverting call switches 25 and also to connectors 20 and repeaters 21, 22 and 31.

The subscriber at station 12, for example, in initiating a call, lifts his telephone instrument and initiates the operation of the subscriber's line circuit 16. This in turn initiates the operation of the line finders 18 which find the subscriber's line and interconnects it with a selector 19 which supplies dial tone to the subscriber. The subscriber will then dial the numbers representing the called subscriber's station designation which causes pulses to be transmitted and actuates the selectors 19 and connectors 20 if the call is directed to another subscriber's line such as 11 shown in Fig. 1. If the call is dialed to another subscriber on the same line 10 as the calling subscriber 12, subscriber 14, for example, then the number dialed by the subscriber 14 actuates selector equipment 19 to select the reverting call selector 25. If the call station is connected to another central office, then the number dialed by the calling subscriber will cause the selectors 19 to select one repeater of one of the groups of repeaters 21, 22 or 31 connected to trunks extending to distant switching stations and the succeeding digits dialed by the subscriber will then control equipment in the distant central office.

The operation of the various circuits and equipment in the central office are well known and understood by persons skilled in the art and operate in their usual manner in cooperating with the circuits and apparatus of this invention.

The traffic sampling and recording equipment for sampling and recording the traffic conditions in such an exemplary central office are represented in Fig. 1 below the line 100. This equipment comprises a group of oscillators 116 through 120, inclusive which, in the exemplary embodiment of this invention, generate superaudible frequencies as, for example, 18 kilocycles, 21 kilocycles, 24 kilocycles, 27 kilocycles and 30 kilocycles. The scanning matrix 110 including a plurality of line coils is interconnected with the subscribers' line circuits by conductors 130. This scanning matrix is also connected through isolating resistors, impedance elements, or filters 124 through 126 with the various sources of superaudible frequencies 116 through 120. The scanning control circuit 111 is provided to control the scanning matrix 110. The scanning control circuit is in turn controlled by program control circuit 112 which also controls the detector and index data generator 113 and the recorder 114.

An additional sampling and recording control circuit 115 is provided for determinng the time required for certain switching steps or functions to be performed. This circuit is called here in a "wait-time" recorder circuit. In the exemplary embodiment described herein, this circuit is employed to record the time required for dial tone to be returned to a subscriber after he picks up his telephone instrument. In the event that the subscriber abandons the call before dial tone is received, this fact is recorded in addition to the time from initiation to abandonment.

The program control circuit 112 is arranged to automatically turn on power and condition the circuits to automatically sample and record traffic conditions in the automatic telephone switching system. This program control circuit is arranged in the exemplary embodiment described herein to turn on the program sampling and recording circuit at least two times during each day, once in the a.m. and once in the p.m. This circuit, of course, could be arranged to turn on the sampling and control equipment for any desired number of times of any suitable duration throughout the day. Generally, it is desirable to determine the busy hour conditions in the morning, afternoon and sometimes in the evening. It may be desirable on occasion to determine traffic conditions under light traffic conditions at other times. The program control circuit is arranged so that it will turn on a power at the times desired.

After turning on the power, the program control circuit delays the operation of the sampling and recording circuits until various vacuum tubes have been energized for a sufficient period of time to insure that the cathodes are at working potential and suitable direct-current potentials are applied to them. Thereafter, the program control circuit will set the scanning control circuit into operation once every 15 seconds. The scanning control circuit then causes the scanning circuit to scan or interconnect each of a plurality of lines with a detecting and recording circuit to determine and record the traffic conditions on each of these lines.

At the beginning of each of the 15-second periods, scan control circuit 111 initiates the operation of the tape recorder 114 including the movement of the magnetic tape past the recording heads. In addition, the detector and index generator 113 records data on the tape identifying the period to be recorded as being either in the a.m. or p.m. Thereafter, the scanning circuit 110 interconnects each of a plurality of lines to the detector circuits 113 which in turn causes various traffic conditions to be determined and to be represented by coded groups of magnetic marks or spots upon the magnetic recording tape.

The scanner 110 is arranged to apply one of the superaudible frequencies, for example, 21 kilocycles, to each of the subscribers' lines when the subscriber's line becomes busy. When the subscriber's line becomes idle, this frequency is disconnected therefrom. Both the connection and disconnection of this frequency to the various subscribers' lines is wholly automatic and does not require the operation of any of the control circuits to either connect, maintain or disconnect this frequency from the subscribers' lines. However, when the subscriber's line is connected under control of the scanning circuits 110, which in turn are controlled by the scanner control circuits 111, to the detector circuits 113, this frequency of 21 kilocycles is automatically removed from the subscriber's line so connected to the detector circuits 113. If the 21 kilocycles are found to be still on the subscriber's line circuit, it indicates that this subscriber is connected to another subscriber in the central office equipment represented above line 100. If, instead, 30 kilocycles are found to be connected to this subscriber's line, it indicates that his line is connected to a repeater of a group of repeaters represented by 22 connected to trunks extending to distant central offices 24.

If, instead, 27 kilocycles are found to be present on the subscriber's line when this line is connected through the scanner 111 to the detector 113, it indicates that the subscriber's line is connected to a repeater 21 which in turn is connected to a trunk extending to the distant central office 23.

If, instead of 21 kilocycles, it is found that the line being scanned has a frequency of 18 kilocycles, this indicates that the calling subscriber is connected to a reverting pulse selector such as 25 and that the call is to the other party on the party line.

In addition to indicating the various trunks or lines to which the scanned line may be connected, the scanner may be connected to other devices such as line finders, selectors, connectors, etc. If the sleeve of these devices only is connected to the scanner, then the busy or idle condition in each of the devices so connected will be determined and recorded on each operation of the scanner, that is, every 15 seconds during the operating periods of the traffic sampler and recorder in accordance with this invention. However, it is also possible to connect predetermined ones of the frequencies to the line coil of the scanner so that the predetermined frequencies will be entered in the scanner and the detectors at this time, thus registering predetermined classes of busy or predetermined classes of equipment such as line finders, selectors, repeaters and other types of circuit.

Inasmuch as a plurality of distinct busy conditions are to be recorded, it is desirable to provide a plurality of tracks on the magnetic recording medium or tape and to code the signals simultaneously recorded in the plurality of tracks. In addition, the magnetic condition of these tracks may be left in its virgin or neutral condition, or a positive or a negative pulse may be recorded in each of the tracks in each of the positions thereof. During scanning operations of the type described above wherein it is desirable to record a plurality of different types of busy indications, one track is employed to record a signal for each line trunk and piece of apparatus, such as a line finder, selector, connector, repeater, tested.

Prior to each scanning operation at the beginning of each of the 15-second scans, this track has recorded in it a group of indexing signals which indicate that the sampling period is either in the a.m. or p.m. If the sampling is done in a p.m. period, than the first nine pulses recorded in the first track will all be negative. If it is an a.m. period, the first eight pulses will be positive and the ninth pulse negative. Thereafter, all the pulses entered in this track will be positive and one pulse will be entered for each line or transmission path or device tested. Thus, a pulse in the first track and the absence of a pulse, that is, a neutral condition in the other two tracks, indicates an idle condition of the line trunk or device tested.

The above and other conditions as recorded are shown in the following table:

| Output from Scanner | Track 1 | Track 2 | Track 3 | Busy Condition of Circuit or Device Tested |
|---|---|---|---|---|
| Not busy | + | N | N | |
| D.C | + | + | N | Non-classified busy. |
| 18 kc | + | N | + | Revertive call. |
| 21 kc | + | + | + | Intragroup call. |
| 24 kc | + | − | N | Classified connector busy. |
| 27 kc | + | N | − | One trunk group busy. |
| 30 kc | + | − | − | Second trunk group busy. |
| 18 kc. and 24 kc | + | − | + | Classified line finder busy. |

These are the code assignments assumed in this discussion. It will be apparent that many other assignments could be found which would serve as well or nearly so, and that the meaning of any code may be reassigned as desired.

The above table shows an exemplary coding of different types of busy indications which may be recorded for different lines during a scanning cycle. Of course, the coding could be changed to represent different classes of busy conditions for the busy devices in any desired manner. Furthermore, the same code may represent different classifications of busy conditions in different groups of lines or devices scanned. Thus the connector busy classification may represent connector busy in one group of scanned circuits or lines as, for example, in the first 10, 20 or 50 scanned lines. The same code may represent a different device in another group of scanned lines. For example, the lines for 70 through 89 of the same code may represent a busy on a particular type of selector circuit such as for example, a digit absorbing selector circuit or a regular step-by-step selector circuit. Thus the various indications may be employed to represent different types of devices for different busy classifications or different lines scanned.

In addition certain repeaters such as 31 may be operated in two different manners. This repeater may be selected from selector 32 and employed to establish a call from one of the subscribers of Fig. 1 to the distant central office 30. This repeater circuit may also be seized from the distant office 30 and employed to establish a connection to one of the subscribers of the central office shown in Fig. 1. In case the circuit is employed to establish a connection from a subscriber of Fig. 1 to the distant office 30 the sleeve at the left-hand side of the rectangle will be busy whereas if it is employed to establish a call from office 30 to a subscriber shown in Fig. 1 then the sleeve terminals of both the left-hand and right-hand sides of the rectangle will both be busy. Both of these busy conditions may be recorded as an unclassified busy signal and the direction of the establishment of the call through the repeater determined by the busy conditions of both the sleeve terminals. In the exemplary embodiment of the invention described herein, these two terminals are scannned in succession one right after the other. However, it is not necessary that these two different terminals be scanned in succession one right after the other. It is possible to arrange the circuits to record either or both of two busy conditions of this repeater by means of special classified codes such as shown in the above table. Again the direction of establishment of a call through this repeater will be readily determined and recorded. By thus employing two scanning operations and recording the results in two transverse lines or patterns across the tape permits more information to be recorded for repeater circuits of the type represented by 31 in Fig. 1. It is, of course, possible to similarly scan other devices at more than one point during a complete scanning cycle and the result obtained later when the recording tape is read and analyzed.

At the completion of the scanning operation as described above, during which the busy condition of the various tested lines, circuits and devices is recorded, as described above, the scanning control circuit 111 under control of the program control circuit 112 stops and remains at rest until the beginning of the next 15-second interval. In the exemplary embodiment described herein, provision has been made for scanning each of 100 line circuits, trunks or other switching devices. Provision is made also for terminating the scanning operation after scanning any less number of such lines, circuits or devices. Of course, it is possible to provide additional switches to the scanner and scanner control circuits and scan a larger number of lines, circuits or devices if and when desired. In the specific embodiment described here in detail, it is assumed that provision is made for 100 such lines, circuits or devices and the time required for such a scanning operation is of the order of one or two-tenths of a second.

Thus, the scanning operation and the recording of the busy condition to each of the lines, circuits or devices to be tested requires a period of less than one-quarter second or second and is repeated every 15 seconds during the time intervals for which the program circuit 112 is adjusted. During the other 14½ or more seconds of each interval, the scanning and sampling circuits are idle. If, during this 14½ second interval, the subscriber whose line is under test initiates a call, the wait-time recorder 115 will be set into operation and record the time required for the subscriber to obtain dial tone. In recording this time, the wait-time recorder responds to the subscriber lifting his telephone instrument. The wait-time recorder in so responding, connects itself to this subscriber's line circuit and also to the sleeve circuit and then records a pulse every tenth of a second in track 2 on the magnetic tape until either one or the other of two events occur; namely, either the subscriber receives the dial tone in which case a pulse of one polarity is recorded in track 3 or, if the subscriber abandons the call without receiving dial tone, then a pulse of the opposite polarity is recorded on track 3 of the magnetic tape. Meantime, a pulse is recorded every tenth of a second from the time a subscriber initiates a call until either the call is abandoned or a dial tone is supplied to the subscriber's line. The pulses thus recorded in track 2 are positive pulses. During this time interval no pulses are recorded in track 1.

Inasmuch as the pulses to be recorded at this time occur at the rate of approximately a tenth of a second, the speed of advancing the tape need not be as fast as during the previously described scanning and recording operation. Consequently, means are provided for operating a tape at a relatively slow speed during the operating time of the wait-time recorder 115.

Interlocking circuits are also provided between the scanning control circuits 111 and the wait-time recorder 115 so that in case a scan is in progress when the subscriber whose line is under observation initiates a call, the operation of the wait-time recorder is delayed so that it will not interfere with the scanning operations. Likewise, if the program circuit attempts to initiate the operation of the scan control circuit 111 at the time when the wait-time recorder is recording on the tape, the initiation of the scan control circuit 111 is delayed until the end of the recording on the tape by the wait-time recorder.

From the combined operation of the various elements of a sampling and traffic recording device in the manner described above, a reasonably complete record of the traffic conditions of calls through the automatic switching office may be automatically obtained at predetermined intervals during any busy or light traffic conditions.

It is, of course, necessary to correlate the lines being sampled with their positions in the scanning cycle so that in addition to identifying the various classes or types of busy indications, the respective lines, trunks and switching devices which are busy may be readily determined and identified. In this manner, overloaded traffic conditions as well as excessive usage and other load conditions of the equipment may be determined and, when necessary, thereafter corrected by providing more or less circuits or different types of circuits and equipment.

Referring now to the detailed disclosure comprising Figs. 3 through 25 when arranged as shown in Fig. 2, Figs. 3, 4, 5, 6 and 12 illustrate in outline form the exemplary switching circuits and devices of a central exchange of the step-by-step type. As pointed out hereinbefore, this invention is not limited to sampling and recording traffic conditions in step-by-step systems, but is applicable also to other types of automatic or time control telephone switching systems.

The automatic switching systems operate in their usual manner and provide circuits, apparatus and means for establishing paths between telephone subscribers and between the subscribers' lines and trunk or other communication circuits or devices, including applying ringing current to the called subscriber's line, busy current to the calling subscriber's line when the called line is busy and such other functions as normally performed by automatic switching systems and equipment. Inasmuch as the central office equipment operates in its usual manner, its operation has not been described in detail herein. The other figures show details of an exemplary embodiment of this invention wherein the traffic conditions in the exemplary step-by-step switching system are periodically sampled and recorded on the magnetic tape.

The control of the sampling and recording system by means of a program circuit are shown in Fig. 25 comprising a plurality of timing devices 2510, 2511, 2512 and 2513. Each of these devices is shown to be actuated or controlled by the synchronous type of electric motor, sometimes called a clock motor, which in turn controls contacts through gear trains. In one exemplary embodiment of this invention, timing devices of the type manufactured by R. W. Cramer and Company, Incorporated, Centerbrook, Connecticut, have been employed. The timer 2513 is designated the a.m.-p.m. timer and comprises a single set of contacts which are controlled by cams so that these contacts are open during a.m. periods and closed during p.m. periods. As indicated herein, these a.m. and p.m. periods may be set in accordance with the standard time of the region or locality of the central office in which they are installed. These periods may also be arbitrarily set to include a light traffic period and a heavy traffic period in the morning, afternoon or evening or any other arbitrary period that may be desired.

Timer 2512 is designated the twenty-four hour program timer and this is shown to actuate one set of contacts by a cam. The time during which these contacts controlled by this timer are closed may be varied as may be desired. In addition, they may be closed and opened for one, two or more periods during any twenty-four hour interval merely by providing the proper cams or cam contours to so control the contacts.

As shown in the drawing, the timing motors of the timers 2512 and 2513 are connected to a source of alternating current so long as the alternating current is applied to the equipment. Thus, it is necessary to set these timing devices only once and thereafter they will control the various periods during which it is desired to sample the traffic of the central office.

Timer 2511 is provided with two groups of contacts each controlled by the timer, the first group of contacts 2514 being momentarily closed approximately 40 seconds after power is applied to the timer. The second set of contacts 2515 are closed at the end of approximately 80 seconds and remain closed so long as power is applied to the timing motor in the timer 2511. The other timer 2515 is arranged to close two sets of contacts every 15 seconds. The first set of contacts comprises locking contacts 1517 which maintain power supplied to the timers 2510, 2511 and rectifiers 2520 if the contacts 2518 of the twenty-four hour program timer 2512 open at a time when the equipment for sampling and recording of the traffic data is in operation. The other set of contacts 2516 actuates the circuits to initiate the sampling and recording of the traffic conditions in the central office circuits being observed.

Fig. 20 shows the mechanism for moving the recording tape 2013 passed the recording heads 2021 through 2023. This mechanism comprises a supply reel 2030 and a take-up reel 2031. A full reel of unrecorded tape is placed on the reel 2030 threaded over a fixed pulley or guide 2032 and then over a moving pulley 2033. The tape then passes between the feeding slow-drive capstan 2343 and the clutch member 2035 and then passed the recording heads 2021 through 2023. The tape then passes over the feeding capstan 2036 and the movable pulley 2037 and then over pulley 2038 and the one-way clutch 2039 to the take-up reel 2031. Normally, with the equipment at rest the various members are in the positions substantially as shown in Fig. 20. At this time the driving motor 2010 is continuously operating and driving the capstan 2036. However, at this time the tape is not held in engagement with this capstan so the tape remains at rest. At this time the contacts 2040 and 2041 will be in a position shown where a direct-current path may be traced from the rectifier 2042 through closed contacts 2040 and 2041, the left-hand switch member of switch 2043 which is closed to its forward position and then through the supply motor 2044 to the center point of the power transformer 2045. Direct current flowing in this path upon the application of alternating current to the rectifier circuit shown at the top of Fig. 20 acts as a break on motor 2044. In other words, when direct current flows through this motor winding the motor acts as an eddy-current break and tends to retard the supply of tape from the supply reel 2030. When it is desired to record on the tape at high speed the clutch magnet 2014 is operated which releases the tape from the slow-speed capstan 2043 and presses the tape against the high-speed capstan 2036 with the result that the tape is moved upwards so that the moving pulley 2037 will move in a counter-clockwise direction and allow contacts 2046 to complete a circuit for the take-up motor 2047 from grounded side of the alternating-current supply, conductor 2048, through motor 2047, the right-hand upper contacts of switch 2043, contacts 2046 to the other side of the alternating-current supply, conductor 2049, and through switch 2011. Likewise, the movable pulley or roller 2033 moves upward and tends to withdraw some tape from the supply reel 2030. However, the breaking action of the motor 2044 maintains the tape taut at this time. If the roller or pulley 2033 moves up sufficiently contacts 2041 operate and interrupt the breaking circuit of motor 2044, thus allowing a more rapid and more free withdrawal of tape from the supply reel 2030. Thereafter when more tape has been supplied the roller 2033 moves dawnward and causes contacts 2041 to reclose and again apply the dynamic or eddy-current break on motor 2034 thus retarding the supply of additional tape.

If when the clutch magnet 2343 is turned off the supply reel overruns so that there is an excess of tape between the supply reel and low-speed capstan 2343, the moving pulley or tape guide 2033 moves to its lower limit and actuates contacts 2040 which apply alternating current to motor 2034 and cause the motor to rewind on the supply reel 2030 of said excess tape.

When the clutch magnet 2014 is released then the tape is moved out of engagement with the high-speed capstan 2036 and into engagement with the low-speed capstan 2033. Consequently, if power is then applied to the low-speed drive motor 2012 the tape will move forward at slow speed under control of this motor and actuate the take-up supply reels and motors in substantially the same manner as described above.

A one-way clutch member 2039 presses the tape against the guide member 2038. This clutch member is arranged to permit the free movement of tape onto the take-up reel 2031 but prevents the movement of tape from this reel to return to the recording mechanism and thus prevents hunting of the contacts 2046.

When all of the tape on a reel has been transmitted through the recording mechanism and has traffic conditions recorded thereon as described herein, the tape is then threaded over the guide of clutch member 2051 and the switch 2043 operated to its reverse position, at which time direct current is supplied to the winding of motor 2047 under control of the tape control contacts 2052 and alternating-current power to motor 2044. As a result, the tape is rewound on the supply reel 2030 and then removed from the machine and a new supply reel inserted and threaded through in the manner shown in the drawing. Then the abovedescribed operations are again repeated as often as necessary or desired.

Assume that power is applied to the system and that the timers 2512 and 2513 are set to actuate their contacts at the desired time intervals. Also assume that switch 2521 is closed during an a.m. testing period and that shortly after the switch 2521 is closed, the twenty-four hour program timer 2512 also actuates its contacts 2518 which in turn apply power to the rectifier circuits 2520 and also to the timer 2511, which timer thereupon starts to time approximately an 80-second time interval. The application of the power to rectifier circuits 2520 causes these rectifiers to be energized so that they will deliver the various sources of anode and grid biasing potentials and also the energy to heat the filaments or heaters of the cathodes of the various vacuum tubes of the system. The closure of the contacts 2518 also supplies power to the driving motor 2010 assuming, of course, that the switch 2011 has been closed. Power is also supplied to the slow-drive motor 2012 through appropriate control circuits described herein. It is also assumed that a supply of magnetic tape has been provided in the recorder shown in Fig. 20 so that the equipment is in all respects ready to respond to the sampled traffic conditions and record the same in the magnetic tape 2013 as described herein.

Considering first the scanning circuits and the control of these scanning circuits, the application of power to the rectifier 2520 applies power to the other vacuum tube circuits including the circuits to tube 2311 which in turn causes the right-hand section of this tube to become conductive since its grid is at substantially ground potential and thus appreciably higher than the potential of the grid of the left-hand section, which grid potential is controlled by the large negative battery 2312 together with voltage dividing resistors 2313, 2314 and 2315.

Many of the devices and circuits employed in the exemplary embodiment of this invention, described herein in detail, are in one or the other of two states. In one state certain voltages are at a more positive value while other voltages are at a more negative value. In the other state these voltages usually reverse. The ones that were more positive become more negative and the ones that were more negative become more positive. The absolute value of these voltages may vary from circuit to circuit. The more positive voltage may in fact be negative with respect to ground in one circuit while the more negative voltage may in fact be positive with respect to ground in another circuit.

Both sections of tube 2316 are held non-conducting by the negative voltage from source 1811 which is connected to the left-hand anode at this time and in turn connected also to the right-hand grid of tube 2316. The source 1811 also maintains the left-hand section of tube 1810 non-conducting so that the pulse shaping circuits in the upper portion of Fig. 18 remain ineffective at this time. The left-hand sections of tubes 1812 and 1813 are maintained conducting at this time because their grids are returned to positive voltage source 1814 while the grids of the right-hand sections of these tubes are returned to negative voltage source.

With the more negative voltage applied to the right-hand grid of tube 2316, the right-hand section is cut off so that its anode is at a relatively high positive voltage which in turn tends to apply a more positive voltage to the left-hand grid of this tube. However, the negative voltage from source 1811 applied to the anode of this tube at this time prevents conduction of current through the left-hand section of tube 2316. Upon application of power to the system, either section of tube 2317 may start to conduct a current. Assume for purposes of illustration that the left-hand section starts to conduct current. If the right-hand section starts to conduct current, then the circuit will operate in a manner similar to that described hereinafter when the right-hand section starts to conduct. The oscillator tube 2111 is maintained inoperative and with the right-hand section substantially cut off due to the negative voltage applied from the left-hand anode of tube 2316, which voltage is applied over conductor 2339 and resistor 2112. The stepping tubes 2114 and 2212 may or may not have discharges initiated through them upon the application of power to the system at this time. Any discharges flowing through them produce no useful results at this time. Thereafter, the circuits remain in substantially the condition described above for the remaining part of the first approximately 40-second delay timing interval of the delay timer 2411. At the end of the approximately 40-second interval, contacts 2514 close and apply negative voltage from source 2522 to the start conductor 2523 through the momentarily operated contacts 2514.

The momentary application of negative voltage from source 2522 to conductor 2523 by means of contacts 2524 applies a negative pulse through condenser 2319, resistor 2320, diode 2321 to the left-hand grid of tube 2317. As assumed above, the left-hand section of this tube is conducting so that the application of a negative pulse to this grid at any time interrupts the current flowing through the left-hand section of this tube which in turn causes its anode to rise in voltage and apply a more positive voltage to the right-hand grid of this tube. As a result, a discharge is initiated through the right-hand section of tube 2317. Thereafter no appreciable current flows through the left-hand section of this tube while current flows through the right-hand section until interrupted as described hereinafter.

The rise in voltage at the left-hand plate of this tube applies a more positive voltage to the upper terminal of diode 2324. Assume that, as will be explained hereinafter, the wait-time recorder is not recording signals on the tape so that a similar voltage near ground potential is applied to conductor 2327 and thus to the lower terminal of the diode 2326 from the anode of the right-hand section of tube 1615. Consequently, a more positive voltage near ground potential is applied to the left-hand grid of tube 2311. An alternate path for applying a positive voltage to this grid may be traced from conductor 2323 and diodes 2328 and 2329 and condenser 2325, resistor 2330 and condenser 2331. The pulse applied over this alternative path is not of sufficient magnitude to actuate the tube unless the conductor 2327 is standing at its more positive excursion. The application of the positive pulse to the left-hand grid of tube 2311 in the manner described above through the "and" gates comprising diodes 2324 and 2326 initiates a flow of current through the left-hand section of tube 2311 which in turn interrupts the current flowing through the right-hand section of this tube and allows the right-hand anode to rise to a more positive voltage near ground potential. As a result, more positive voltage of approximately ground potential is transmitted through diode 2332 and resistor 2333 to the grid of tube 2334. As a result, current starts to flow through the anode-cathode path of tube 2334 and the clutch magnet 2014 which current tends to operate this magnet.

At the end of about 25 milliseconds condenser 2335 becomes sufficiently charged so that this condenser in combination with the other circuits of this tube causes the right-hand grid to again become sufficiently positive to cause conduction through the right-hand section of tube 2311 and interrupt the conduction through the left-hand section of this tube. As a result the voltage of the anode of the right-hand section again falls so that flow of current through tube 2334 is interrupted which in turn interrupts the flow of current through the clutch magnet 2014. Clutch magnet 2014 requires 20 to 25 milliseconds to operate so that this magnet operates long enough to cause the tape 2013 to start to move and then immediately stops at this time.

The reduction of voltage of the right-hand anode of tube 2311 at the termination of the discharge through this section of the tube transmits a negative pulse through the condenser 2325 and diodes 2329 and 2328 back over conductor 2323 and through the coupling condenser to the grid of the left-hand section of tube 2317 thus interrupting the discharge through the right-hand section of this tube and restoring the flow of current through the left-hand section.

Had the discharge been initiated through the right-hand section of tube 2317 instead of the left-hand section as assumed above, then the circuits of tube 2311 would have been actuated in the manner described above and at the end of approximately 25 milliseconds restored to their initial condition and in turn interrupting the flow of current through the right-hand section of tube 2317 and initiating the flow of current through left-hand section of tube 2317. Thereafter the actuation of contacts 2514 would transfer the discharges between sections of tubes 2317 and 2312 in the manner described above.

During the 25-millisecond interval described above, the application of a positive voltage near ground potential to the anode of the right-hand section of tube 2311 applies a positive voltage pulse over conductor 2336 which extends through Fig. 22 to the right-hand grid of tube 2113 through resistor 2118, condenser 2115 and diode 2116. As a result a flow of current is initiated through the right-hand section of tube 2313 causing its anode to fall to a relatively low negative voltage and in turn transmitting a negative pulse through condenser 2117 to the reset cathode 2119 of the stepping tube 2114. A negative pulse is also applied to the reset cathode 2219 of tube 2212. Both condensers 2115 and 2117 tend to differentiate the pulse transmitted through them so that this pulse is of short duration but sufficiently long to reset tubes 2114 and 2212. The stepping tubes 2114 and 2212 have main anodes 2120 and 2220, respectively, a plurality of cathodes, one through zero, and a plurality of control or stepping cathodes. When power is initially applied to the system, discharges may start between the main anode and one or more of the various cathodes of the tube. However, upon the application of the negative pulse to the reset cathodes 2119 and 2219, the discharges within the tube are transferred to the reset cathode. Thereafter, the discharge will continue to flow between the main anodes and the reset cathodes until stepped to one of the other cathodes in the manner described herein. All of the other discharges which may have initially been flowing through the tubes are interrupted so that at the termination of the negative pulse from the right-hand section of tube 2113, a single discharge is flowing within each of the tubes 2114 and 2212, namely, between the main anode and the reset cathode of these tubes. Exemplary stepping tubes suitable for use in the exemplary arrangement described herein, are described in greater detail in United States Patent 2,575,370, granted to M. A. Townsend, November 20, 1951.

Thereafter the circuits remain in the above-described condition from the remainder of the 80-second time delay of the timer 2511. At the end of this time interval the contacts 2515 are actuated. The transfer set of contacts 2515 being actuated interrupts an obvious circuit through the stand-by lamp 2524 and completes a circuit for lighting the sampling lamp 2525 thus indicating that the sampling circuits are in condition for operation. Actuation of the upper contacts 2515 applies ground to conductor 2526 which extends to Figs. 18 and 23. Application of ground to conductor 2526 removes the relatively high negative bias applied to the left-hand grid of tube 1810 and thus biases this grid so that the left-hand section of tube 1810 will thereafter repeat in its cathode circuit the pulses applied to this grid. These pulses appear across the cathode resistor 1822.

The conductor 2526 also extends to the left-hand anode of tube 2316. Thus, upon the application of ground to the lead 2526 by contacts 2515, the left-hand section of tube 2316 starts to conduct current while the right-hand section remains cut off. The anode of the left-hand section does not rise to a sufficiently high positive voltage at this time to actuate the circuits of either tube 2334 or of tube 2111.

Thereafter so long as power is applied to the motor of the timer 2511 the contacts 2515 are maintained closed.

The operation of the lower set of contacts 2515 in addition to lighting the sampling lamp 2525 also applies power to the motor of the 15-second timer 2510. Contacts 2517 thereof close first and maintain the power applied to its motor and the sampling lamp 2515 as well as to rectifier 2520 during substantially half of the 15-second interval.

During the center portion of the closure of contacts 2517, contacts 2516 are actuated which contacts again apply negative voltage from battery 2522 to the start conductor 2523. Application of negative voltage to conductor 2523 again applies the negative voltage to the left-hand grid of tube 2317 which in turn interrupts the current flowing through this section of tube 2317 and initiates the flow of current through right section of this tube 2317. As a result a more positive voltage is again applied to the upper terminal of diode 2324. Again, assume as before that the wait-time recorder is inactive, i.e., not recording on the tape, so that a positive voltage is also applied to the lower terminal of diode 2326. Consequently, the more positive voltage near ground potential on conductor 2323 from the left-hand anode of tube 2317 is again transmitted to the left-hand grid of tube 2311. The application of said more positive voltage to the left-hand grid of tube 2311 initiates the flow of current through the left-hand section of this tube and interrupts the flow of current through the right-hand section with the result that more positive voltage is again applied to the grid of tube 2334 which causes current to flow through this tube and actuate the clutch magnet 2014. The interruption of current through the right-hand section of tube 2311 also applies a more positive voltage over conductor 2336 to the grid of the right-hand section of tube 2113 which again applies a negative pulse to the reset cathodes of tubes 2114 and 2212, to insure that these tubes have a discharge flowing only between their main anode and the reset cathode.

At the end of approximately 25 milliseconds, after the clutch magnet 2014 has had ample time to become fully operated and set the tape 2013 into motion, a discharge is again initiated through the right-hand section of tube 2311 which in turn interrupts a discharge through the left-hand section of this tube in the manner described above with the result that the more positive potential is removed from conductor 2336 and the right-hand grid of tube 2313. Removal of this more positive voltage, in effect, is equivalent to applying a negative pulse to the right-hand grid of tube 2113 through condenser 2116. Since the right-hand section of this tube is not now conducting this pulse produces little or no effect upon the right-hand section of tube 2113 or the circuits controlled by this section. In addition, a negative pulse is transmitted at this time from the anode of the right-hand section of tube 2311 through condenser 2325 and diodes 2329 and 2328 over conductor 2323 to the grid of the right-hand section of tube 2317 thus interrupting the flow of current through this section of tube 2317 and again initiating the flow of current through the left-hand section of tube 2317.

The initiation of the flow of current through the right-hand section of tube 2311 also applies a negative pulse through condenser 2337 and diode 2338 to the left-hand grid of tube 2316 thus interrupting the flow of current through the left-hand section of this tube and initiating the flow of current through the right-hand section of this tube. As a result, the voltage of the anode of the left-hand section of tube 2316 rises to near ground potential with the result that this voltage is applied through the diode 2338 to the control grid of tube 2334 thus maintaining current flowing through this tube and through the clutch magnet 2014. In addition, the application of substantially ground potential to conductor 2339 due to the interruption of current flowing through the left-hand section of tube 2316 conditions the right-hand grid of tube 2111 so that this tube is set into operation.

Tube 2111 is connected in a multivibrator circuit which will oscillate at and produce a substantially square wave having a fundamental frequency of approximately one thousand cycles per second. So long as an appreciable negative voltage is applied to conductor 2339 the right-hand section of tube 2111 is maintained non-conducting so that this multivibrator circuit is inoperative. However, upon the interruption of the discharge through the left-hand section of tube 2316 and the resulting application of substantially ground potential of conductor 2339, the oscillator circuit of tube 2111 is set into operation and generates oscillations.

When the oscillator tube 2111 starts to oscillate, the grid of the right-hand section becomes more positive and causes a more positive voltage to be applied to the grid of the left-hand section of tube 2113. As a result, anode current flows through the left-hand section of tube 2113 and causes its anode voltage to fall below the ground voltage and thus become more negative. The anode of tube 2113 is connected to stepping cathodes of the stepping tube 2114 with the result that these cathodes become more negative and cause a discharge which was previously flowing between the main anode 2120 and the reset anode 2119 to be transferred to the first stepping cathode 2121.

It should be noted that upon the termination of the negative pulse applied from the anode of the right-hand section of tube 2113 to the reset cathode 2119 of tube 2114 and the reset cathode 2219 of tube 2212, the discharge continues to flow from the main anodes of these tubes to the reset cathodes in the circuit from positive battery 2122 and resistors 2123 and 2223 to the respective main anodes and then to the respective reset cathodes and then through the diodes 2215 and 2216 and resistor 2214 to negative battery. A path also extends from the diode 2216 through diode 2217 and the voltage dividing resistors 2218 to an intermediate voltage of approximately negative 20 volts. Thus, the right-hand terminal of diode 2216 is maintained at approximately minus 20 volts so long as a discharge flows between the main anode and the reset cathode of either of the stepping tubes 2114 or 2212. An additional auxiliary path also exists from the reset cathodes of the stepping tubes to ground through the resistor 2124. This resistor, however, is sufficiently high so that the current flowing through this resistor does not greatly change the above-described voltages at the various places in the circuit.

At the end of the first positive cycle or form from the oscillator 2111, the left-hand section of tube 2113 ceases to conduct so that the voltage on the stepping cathodes rises with the result that the discharge within the stepping tube 2114 transfers from the first stepping cathode 2121 to the No. 1 cathode 2125.

The output of the oscillator tube 2111 in addition to applying a positive voltage to the left-hand grid of tube 2113 in the manner described above, is also connected over conductor 2126 which extends through Figs. 22, 23 to the left-hand grid circuit of tube 1812 in Fig. 18 through condenser 1817 and diode 1816.

Tubes 1812 and 1813 have their two sections connected in single-cycle multivibrator circuits (mono-stable) in which the left-hand sections are normally conducting. Tube 1837 is connected in a double stability or flip-flop circuit and it is assumed that when power is supplied to the system as described above, the right-hand section of this tube will start to conduct and prevent the left-hand section from conducting.

Inasmuch as the left-hand section of tube 1812 is normally conducting, the application of a positive potential or pulse over conductor 2126 to its left-hand grid produces little or no effect upon this tube. In addition, the diode 1815 tends to prevent its upper terminal from becoming appreciably positive while diode 1816 presents a high impedance to positive pulses. Consequently, the application of a positive voltage to the conductor 2126 does not change the current conditions within the tube 1812. However, upon the termination of the positive pulse, a negative pulse due to the operation of condenser 1817 is applied to the left-hand grid of tube 1812 with the result that the current flowing through the left-hand section of this tube is momentarily interrupted and the current through the right-hand section initiated. It may be pointed out that this occurs at substantially the same instant that the discharge transfers on to one of the cathodes 1 to 0 of tube 2114. As a result, a positive pulse is applied through the coupling or differentiating condenser 1818 and the diodes 1819 and 1820 to the left-hand grid of tube 1813. Since the left-hand section of this tube is already conducting and since the diodes 1819 and 1820 are poled to provide a maximum attenuation for positive pulses, this positive pulse produces substantially no effect upon the circuits of tube 1818.

A short interval of time later, the circuits of tube 1812 will cause the flow of current through its left-hand section to be initiated again which in turn causes a negative pulse to be transmitted through the condenser 1818 to the left-hand grid of tube 1813. The diodes 1819 and 1820 are poled to present a minimum of attenuation for negative pulses. Consequently, this negative pulse is applied to the left-hand grid of tube 1813 which interrupts the discharge flowing through this section and initiates the flow of current through the right-hand section of this tube. The circuits of tube 1813, a short interval of time thereafter, then cause a discharge again to be initiated through the left-hand section of this tube. As a result, a positive pulse of short duration is generated on the anode of the left-hand section of this tube. The delay time of the circuit of tubes 1812 is adjusted so that the positive pulse appearing on the anode of the left-hand section of tube 1813 occurs near the end of the more negative excursion of the left-hand anode of tube 2111. The delay time of the circuits of tube 1812 are employed to select the time of sampling the potential conditions of conductor 1830 and of recording on the tape, while the delay time of the circuits of tube 1813 are employed to control the length of the recording pulse applied to the recording heads or devices as appears hereinafter.

Inasmuch as ground is now applied on conductor 2526 in the manner described above, the positive pulse generated on the anode of the left-hand section of tube 1813 is repeated by the left-hand section of tube 1810 with the result that a positive pulse is applied to the cathode of this tube and then through the diode 1911 to the grid of the left-hand section of tube 1910. As pointed out above, it is assumed that the right-hand section of tube 1837 is conducting and that the left-hand section is not conducting. As a result, a more positive voltage is applied to the upper terminal of diode 1911 and a more negative voltage is applied to the upper terminal of diode 1912. Consequently, when a more positive voltage from the cathode of the left-hand section of tube 1810 is applied to the lower terminals of diodes 1911 and 1912 the more positive voltage is applied to the grid of the left-hand section of tube 1910 but is not applied to the grid of the right-hand section of this tube. As a result, current flows through the right-hand section of tube 1910 and over conductor 1921 to the recording head 2021 for the first track on the tape 2013 and in such a direction as to write or record a positive signal pulse or magnetization of a sign called positive herein in a small area of the tape under the head at this time. At the completion of the more positive pulse from the left-hand anode of tube 1813, the current flowing over the conductor 1921 is interrupted. At about this time, a little before or a little after this time the anode of the left-hand section of tube 2111 again becomes positive with the result that a more negative voltage is again supplied to the stepping cathodes of the stepping tube 2114. As a result, the discharge transfers from the No. 1 cathode of this tube to the next stepping cathode, and at the termination of this pulse, the discharge then steps to the No. 2 cathode. Then, in the manner similar to that described above, the circuits of tubes 1812, 1813, 1810 and 1910 operate to cause a second positive pulse to be recorded in the tape in track 1. Thereafter, the above-described operations continue for the next succeeding oscillations or cycles from the oscillator tube 2111. After eight cycles have been generated by the oscillator tube 2111 and eight positive pulses recorded, one after the other, in track 1 on the tape 2013, the discharge within the stepping tube 2114 steps to the No. 9 cathode thereof. At this time, a discharge is initiated through the left-hand section of tube 1837 and the discharge previously flowing through the right-hand section of this tube is interrupted.

In order to describe the operation of the circuits to transfer the discharge within the section of tube 1837, it is necessary to describe the operation of the units amplifier tubes shown in the upper portion of Fig. 21. The details of four such amplifiers are shown and the other six represented in outline form, one such amplifier being provided for each of the ten control cathodes of the stepping tube 2114. Each of the control cathodes of tube 2114 is connected to the control grid of a respective amplifier. Thus, the control grid of the left-hand section of tube 2150 is connected to the No. 0 control cathode while the right-hand grid of this amplifier is connected to the No. 1 control cathode. The left-hand grid of tube 2154 is connected to the No. 8 control cathode while the right-hand grid of this tube is connected to the No. 9 control cathode. Normally, these grids are maintained at the voltage supplied by the negative battery 2127. However, upon the transfer of the discharge to the respective cathode, this voltage rises due to the current flowing through the corresponding resistor to battery. The voltage rises from about minus 50 volts to approximately minus 20 volts. This voltage is then repeated to the cathode of the respective sections of tubes 2150 through 2154 with the result that the cathode of the respective sections of these tubes rises substantially a corresponding number of volts. The anodes of the various sections of the tubes are direct coupled to a control grid of the respective amplifier tubes 2160, 2161 through 2168 and 2169. The application of a positive pulse to the grid of the right-hand section of tube 2154, for example, causes a negative pulse to be repeated by the anode of this section and a positive pulse to be repeated by its cathode. The negative pulse from the anode of the right-hand section of tube 2154 is supplied to a control grid of tube 2169 which decreases the current flowing in the anode-cathode path of this tube and allows its anode voltage to rise, thus aiding the cathode of the right-hand section of tube 2154 to which it is connected.

The rise in voltage of the anode of tube 2169 and of the cathode of tube 2154 when the discharge within stepping tube 2114 is transferred to the No. 9 cathode is transmitted through the resistor 2128 and through the diode 2230 to the grid of the right-hand section of tube 1821. Normally this grid is maintained at approximately minus 50 volts in a circuit path which may be traced from battery 2127, resistor 2130 and then through the circuits of the left-hand section of tube 2154 so that the cathode of this tube is maintained at approximately the same voltage of minus 50 volts and then through resistor 2128, diode 2230 and resistor 1823 to the grid of the right-hand section of tube 1821. When the voltage of the cathode of the right-hand section of tube 2154 rises to approximately minus 20 volts, the right-hand grid of tube 1821 rises to a more positive voltage than before. It is to be noted that the diodes 2231 and 2232 provide a circuit sometimes called a clamping circuit which tends to prevent the voltage of lead 2354 from becoming more positive than approximately minus 20 volts. These diodes, however, do not interfere with the application of more negative voltage to the grid of this tube.

As a result, current flows through the right-hand section of tube 1821 and causes a low voltage to be applied to the grid of the right-hand section of tube 1837, thus interrupting the current flowing through this section and initiating the flow of current through the left-hand section of tube 1837. As a result, a lower voltage is now applied to the upper terminal of diode 1911 and a higher voltage to the diode 1912. Consequently, when the corresponding positive pulse is transmitted from the cathode of the left-hand section of tube 1810 in the manner described above following the stepping of the discharge to the ninth cathode of tube 2114, a pulse of current will flow through the right-hand section of tube 1910 instead of through the left-hand section with the result that current flows over conductor 1922 to the recording head 2021 at this time and through the negative coil thereof or in the negative direction with the result that a negative pulse will be recorded in track 1 in the ninth position following the previous eight positive pulses.

A network comprising resistor 2128 and condenser 2129 is employed to suppress or attenuate superaudible alternating current applied to the cathode of tube 2154 and the anode of tube 2169 as will be described hereinafter and also to delay transmission of the positive pulse or more positive voltage through the diode 2230 and resistor 1823 to the grid of the right-hand section of tube 1821. Resistor 1823 and condenser 1827 further delay the application of this voltage to the right-hand grid so that the change in state of tube 1837 described above will not occur during the application of the eighth positive voltage pulse from the cathode to the left-hand section of tube 1810 and thence to the lower terminals of the diodes 1911 and 1912.

In the above-described operation of the system, it was assumed that the a.m.-p.m. timer 2513 was in the a.m. condition with contacts 2519 open. If the power had been applied to the system by means of the twenty-four hour program timer 2512 during a P.M. interval, the contacts 2519 would be closed which would cause the application of positive bias voltage to the network associated with the right-hand grid of tube 1821 which would in turn interrupt the discharge flowing through the right-hand section of tube 1837 and initiate a discharge through the left-hand section of this tube as soon as power was applied to the system with the result that all nine of the pulses recorded in the tape during the preliminary period described above would be negative instead of the first eight being positive and the ninth one being negative as described for an a.m. sampling period. Otherwise, the circuits will operate in substantially the same manner. It should be noted, however, that the clamping diodes 2231 and 2232 also at this time prevent conductor 2354 from becoming more positive than approximately minus 20 volts.

Returning now to the operation of the stepping tube 2114, when the discharge in this tube was stepped to the No. 9 control cathode in the manner described above, in addition to raising the voltage of the grid of the right-hand section of tube 2154 from approximately minus 50 volts to approximately minus 20 volts as described above, a similar voltage is applied through the coupling condenser 2211 to the grid of the left-hand section of tube 2210.

The grid of the left-hand section of tube 2210 is normally biased to a more positive voltage than is the grid of the right-hand section of this tube. Consequently, due to the action of the cathode resistor 2213, current normally flows through the left-hand section of tube 2210 and the flow through the right-hand section is substantially cut off. Consequently, the application of a more positive voltage through the coupling condenser 2211 at this time produces substantially no effect upon the current flowing within the sections of this tube.

At the beginning of the tenth cycle from tube 2111, conductor 2126 again becomes positive, after the negative pulse is fully recorded in the track 1 of tape 2013 in the manner described above, and as a result, the discharge within tube 2114 is stepped from the ninth cathode to the next stepping cathode. Consequently, the voltage on the ninth cathode again becomes more negative and applies a negative voltage through the coupling condenser 2211 to the left-hand grid of tube 2210, thus interrupting or reducing the current flowing through this section of the tube and, due to the coupling action of the cathode resistor 2213, causes the increased current to flow through the right-hand section of this tube. Consequently, a more negative voltage is applied to the stepping cathodes of the tens stepping tube 2212. As a result, the discharge in this tube steps first to the first stepping cathode. A short time later, when the charge on condenser 2211 returns to its more normal condition, the left-hand section of tube 2210 again starts to conduct and interrupt the current flowing through the right-hand section of this tube with the result that the voltage applied to the stepping cathode of tube 2212 again approaches a normal condition which in turn transfers the discharge within the tube to the first control cathode which in this case is called the tens zero cathode and is designated 2225 in Fig. 22. As a result of the current flowing to this cathode from the main anode, voltage drop is created across resistor 2226 which applies a more positive voltage to the left-hand grid of tube 2250 and also applies a more positive voltage to conductor 2227 extending to the grid of the left-hand section of tube 1821 through resistor 1828. This more positive voltage comprises a change in voltage from approximately minus 50 volts to approximately minus 20 volts. The application of this voltage to the grid of the left-hand section of tube 1821 causes current to flow through the left-hand section of this tube and in turn apply a more negative voltage to the grid of the left-hand section of tube 1837, thus interrupting the flow of current through this tube and initiating the flow of current through the right-hand section. As a result, the pulse transmitted from the cathode of tube 1810 will cause a positive pulse to be recorded in the first track on the tape 2013 in the manner described above. Resistor 1828 and condenser 1829 tend to delay the application of the positive voltage to the left-hand grid of tube 1821 until after the previous pulse from the cathode of the left-hand section of tube 1810 has been fully recorded. Consequently, the next pulse which will be the tenth pulse or the 00 pulse will be recorded as a positive pulse in track 1. This pulse is called a 00 pulse because it is the pulse recorded in response to the units stepping tube 2114 being stepped to its zero cathode and the tens stepping tube 2212 having its discharge stepped to its zero cathode.

Thereafter, each cycle from the oscillator 2111 causes the discharge in the units tube 2114 to be stepped to the next cathode in the manner described above and a corresponding positive pulse to be recorded in the first track of the magnetic tape 2013 by the recording coil or head 2021. Each time the units stepping tube 2114 has the discharge stepped off of the ninth cathode, the discharge within the tens stepping tube is advanced to the next control cathode in the manner described above.

However, the stepping of a discharge onto the ninth cathode of the units tube after the first time does not apply a more positive voltage to the control grid of the left-hand section of tube 1821. In other words, lead 2354 associated with the control grid of the left-hand section of tube 1821 does not have its voltage changed from approximately minus 50 volts to be approximately minus 20 volts at these times. The reason the voltage on this grid does not change at this time is due to the fact that no discharge flows to either of the reset cathodes of the stepping tubes 2114 or 2112. As a result, lead 2354 is maintained at substantially minus 50 volts in a circuit extending through diode 2231 and resistors 2233 and 2214 to minus 48 volts. Inasmuch as neither one of the stepping tubes has a discharge flowing to their reset cathodes, no appreciable discharge current flows through resistor 2214 with the result that the voltage applied to the right-hand grid of tube 1821 remains at substantially cut-off value. When the cathode of the right-hand section of tube 2154 changes from about minus 50 to about minus 20 volts in the manner described above, this additional voltage drop appears across the coupling resistor 2128 instead of being applied to the grid of tube 1821 because the diodes 2230 and 2231 now have a low impedance and thus attenuate or suppress this more positive voltage to a point where it is ineffective to cause current to flow through the right-hand section of tube 1821. During p.m. recording intervals after the first nine pulses the right-hand grid of tube 1821 is likewise maintained at its negative or cut-off value. The voltage drop due to the closure of contacts 2519 appears across resistors 2352 and 2353 instead of affecting the voltage of the right-hand grid of tube 1821. As a result, the corresponding pulse recorded in track 1 will be positive and not negative because the conduction within tube 1837 cannot thereafter be reversed during the scanning cycle.

The above-described operation then continues each cycle or pulse from the oscillator tube 2111 causing the units tube to have a discharge step to the next succeeding cathode and each tens steps causing the discharge in the tens stepping tube 2212 to be stepped to the next tens cathode. At the end of the predetermined number of cycles or pulses and thus at the end of a predetermined number of steps of the various stepping tubes, the operation of these circuits is terminated in the following manner. The switch 2240 is set on one of the ten terminals shown so that the stepping may be stopped at the end of any complete cycle of the units stepping tube. The switch 2240 is shown resting on the No. 9 terminal so that at the end of 90 pulses in addition to the first nine pulses recorded in track 1 of the magnetic tape 2013, the operation of the stepping circuits is terminated. If this switch had been set on some other terminal, then the operation is terminated at the number steps indicated by the position at which this switch is set.

With the switch 2240 set on the No. 9 terminal when the stepping tube 2212 has a discharge transferred to the No. 8 cathode, this cathode has its potential changed from approximately minus 50 volts to approximately minus 20 volts in the manner described above, which voltage change is also supplied through to the switch 2240 to the coupling condenser 2350 and diode 2351 to the right-hand grid of tube 2316. The diode 2351 opposes this more positive voltage and inasmuch as the right-hand section is conducting, this voltage does not produce any change in the conducting circuits of this tube. However, when the discharge within this tube 2212 steps off of this particular cathode in the manner described above after step No. 89 (after the ninth step calling the first step No. 00), then this cathode No. 8 becomes more negative and a negative voltage pulse is transmitted through the coupling condenser 2350 and diode 2351 to the grid of the right-hand section of tube 2316. As a result, the discharge flowing through this section is interrupted and the discharge transferred to the left-hand section thus returning the circuits of this tube to their normal condition. As a result, a more negative biasing voltage is again applied to the grid of the right-hand section of tube 2111, thus making it monostable so that the oscillations stop. This in turn stops the stepping of the stepping tubes, which tubes then remain in this condition until another scanning operation is initiated by the closure of fifteen-second cycle timer contacts 2516, approximately fourteen or fourteen and one-half seconds later.

Interruption of the current flowing through the right-hand section of tube 2316 permits its anode to rise to a more positive voltage near ground potential and in turn applies such a voltage over conductor 2318 to the grid of the right-hand section of tube 2113 through resistor 2131, condenser 2132 and diode 2133. As a result, the grid of the right-hand section of tube 2113 becomes more positive and causes current to flow through the anode-cathode path of this tube. This voltage in turn is repeated as a negative voltage pulse by the right-hand section of tube 2113 and transmitted through condenser 2117 to the restoring or resetting cathodes of the stepping tubes 2114 and 2212. In response to this negative pulse, the discharges flowing between the main anode and any of the other cathodes of the stepping tubes are interrupted and transferred to the path between the main anode and the reset cathodes of these tubes. The condenser 2132 acts as a differentiating condenser and causes a pulse of relatively short duration transmitted therethrough and similarly condenser 2117 causes the pulse transmitted to the resetting cathodes of these tubes to be of relatively short duration so that after a short interval of time, the right-hand section of tube 2113 ceases to conduct and the voltage or potential applied to the resetting cathodes of the stepping tubes returns to a steady-state voltage whereupon the discharge continues to flow between the main anode and reset cathodes of these tubes in the above-described circuit through resistor 2124 to ground in parallel with the diodes 2215, 2216 and 2217 and resistors 2214 and 2218 to negative battery. Thereafter, the circuits remain in the above-described condition until the 15-second cycle timer contacts 2516 again close at which time the above-described operation is repeated. At that time, the circuits of tube 2311 are actuated again which in turn actuate the circuits of tube 2317 and also again apply a reset pulse to a reset cathode of stepping tubes 2212 and 2114 to insure that the discharge within these tubes is returned, at that time, to the reset cathode. In addition, the clutch magnet 2014 is actuated under control of tube 2334. At the end of the delay interval of the circuits of tube 2311, the discharges within tube 2311 are restored which in turn restores the discharges through tube 2317. In addition, the circuits of tube 2316 are again actuated and in turn the oscillator 2111 is set into oscillation. Thereafter, the stepping tubes are stepped in the manner described above until a complete scanning cycle is performed at which time the circuits are again restored to their normal condition. The above-described operations are then repeated every 15 seconds during the time interval assigned for scanning under control of the program timer 2512. As indicated herein, the contacts 2518 may reopen during the scanning interval, but contacts 2517 remain closed until the end of the scanning interval so that the scanning cycle then in progress will not be interrupted. Instead, it will be completed after which the circuits are then returned to their normal or idle condition.

The stepping tubes 2114 and 2212 are employed to control a scanner shown in Figs. 6, 13 and 17. This scanner comprises a plurality of diodes arranged in a matrix together with a plurality of tone coils. The scanner is controlled by application of voltages or potentials to the units leads U0 through U9 and the potentials supplied to the tens lead T0, T9 shown at the bottom of Fig. 17 and the top of Figs. 21 and 22. During idle periods when it is not desired to cause any scanning, a negative voltage approximately —45 to —50 volts is applied to all of these controls. In addition, a superaudible tone is also applied to include all of these leads.

The —45 to —50 volts applied to these leads are obtained from the corresponding amplifier circuits shown in the upper portions of Figs. 21 and 22. As pointed out herein, the grids of the sections of tubes 2150 through 2154 and 2250 through 2254 are normally biased to approximately —45 to —50 volts by battery 2127. Battery 2127 represents any suitable source of such a voltage including a rectifier source energized as represented by rectifier circuits 2520 under control of the program timer 2512.

As described above, the sections of tubes 2150 operate as cathode followers wherein the anode cathode path of tubes 2160 through 2169 comprise the cathode impedance for the cathode follower sections of tubes 2150 through 2154. The control elements of the tubes 2160 through 2169 are coupled to the anodes of the sections of tubes 2150 through 2154. When negative voltage of —45 to —50 volts is applied to the grids of the sections of tubes 2150 through 2154, a sufficiently positive voltage with respect to the cathodes of tubes 2160 through 2169 is applied to the control grids of tubes 2160 through 2169 so that sufficient current will flow through these tubes from a high negative source 2134 to maintain the voltage on the conductors U0 to U9 at approximately —48 to —50 volts. Both sections of the tubes 2250 through 2254 operate in substantially the same manner excepting that resistors 2260 through 2269 comprise the cathode impedances of these tubes instead of amplifier tubes such as 2160 through 2169.

In addition to the negative voltage applied to the grids of both sections of the tubes 2150 through 2154 and of tubes 2250 through 2254, a source of superaudible frequency from one of the generators of Fig. 11 is also applied to the control grids of these tubes. In the exemplary embodiment shown in the drawings, a frequency of 21 kilocycles is supplied over conductors 1115 and 1116 to the control grid of the sections of tubes 2150 through 2154 and 2250 to 2254. As a result due to the operation of these tubes as cathode followers and also the amplifier tubes 2160 through 2169, a corresponding frequency is applied to the units control conductors U0 to U9 and to the tens control conductors T0 to T9.

With a negative voltage of —45 to —50 volts applied to all of the control conductors U0 through U9 and T0 through T9, the diodes of the scanning matrix shown in Figs. 6, 13 and 17 cause the output from the scanner over conductor 1830 to be clamped at about —40 volts. Resistors 1711 and 1712 comprise a voltage divider with the mid-point at about —40 volts. The left-hand terminal of diode V5 is connected to this point. The left-hand terminal of diode V5 is connected to point 1831 which is a few volts more negative due to the voltage divider resistors in the grid circuit of tube 1832. Consequently, this diode is conducting and maintains the output conduct 1830 and point 1831 at about —40 volts. The —45 to —50 volts applied to the control conductors U0 through U9 and to T0 through T9 maintain diodes 4.1 through 4.10 nonconducting. In addition, substantially no tone or alternating current is applied to the output conductor 1830 at this time due in part to the low impedance of the conducting diode V5 and the high impedances of the nonconducting diodes 4.1 through 4.10.

The diode scanner has a conductor such as S00, S01, S02, etc. which is connected to the sleeve or private wire of each of the subscriber's circuits or other switching equipment which it is desired to scan and determine whether or not these line circuits and other devices are idle or busy. When such a line or other switching device or switching circuit or path is idle, it normally has either approximately —45 to —50 volts connected thereto or it is open, i.e., not connected to any source of potential, and is not connected to ground, but when it is busy, these conductors are connected to ground so that they have substantially zero or ground voltage applied to them. When busy and idle conditions are indicated by other potentials or in other manners, it is necessary to add a relay to repeat the busy condition as ground on a conductor or terminal and the idle condition as an open or as negative 48 to 50 volts.

In addition, two other conductors such as T00 and R00, associated with the conductor S00, are connected to the tip and ring, respectively, of the subscriber's line circuit to which the sleeve conductor S00 is connected. Each of the subscriber's lines upon which it is desired to sample and record the busy or idle condition is similarly connected to a sleeve conductor S01, etc. while the tip and ring are similarly connected to conductors T01, R01, etc.

As is explained herein, when it is desired to test certain types of equipment such as line finders, connectors, repeaters or other devices, the sleeve conductors only such as S10 or S19 are connected to the sleeve of the device in question. If only the sleeve is thus connected the busy or idle condition of this device will be determined and recorded as described hereinafter. In such cases, the various devices so scanned are identified by the position in the scanning cycle at which they are scanned. If it is desired to further identify these devices, any desirable frequency or such as obtained from one of the sources 116 through 120 or any other suitable frequency is connected to the T and R conductors associated with the respective sleeve conductors such as S10. The connections from the sources of the superaudible frequency to the various coils of the scanner as well as the connection of the coils of these scanners to the subscriber's line circuits is by way of isolating or decoupling networks, impedance elements or filters so that these frequencies do not interfere one with another or with the operation of the communication signals being transmitted over the communication circuits and also so that some undesirable or objectionable crosstalk is not introduced between the various subscriber's line circuits or communication paths, the traffic of which it is desired to sample and record.

The primary winding of each of the tone coils is connected through a condensed to the output of the matrix scanner. Thus, the primary winding of the first tone coil C00 is connected between ground and the condenser 1700, and condenser 1700 in turn is connected to terminal 1700A. The primaries of the other coils of the scanner are similarly connected to corresponding output terminals of the diode matrix network employed in the scanner. The terminal 1700A is connected through resistor 1700B to the sleeve S00 as described hereinbefore.

As pointed out above, so long as the circuits or lines to be scanned or tested are idle, either approximately —48 volts is applied to the sleeve conductor S00, or the circuit of this conductor is open. As shown in the drawing, the sleeves S00 and S07 are open in the respective line circuits when these lines and circuits are idle. However, negative battery 1710 is connected through individual isolating resistances to point 1700A and the corresponding points individual to the other conductors S01 through S99. Consequently, substantially the same voltage is applied to both the terminals of the diodes, such as V1.1, so that these diodes will have a high impedance at this time and suppress or greatly attenuate the alternating current applied to the units lead U0. Likewise, diodes V3.1 and V2.1 have high impedance and thus suppress or greatly attenuate the alternating current applied to the T0 lead. Consequently, substantially no superaudible alternating current is applied to the primary winding of the coil C00 at this time. The same applies to all of the other primary windings of the other scanner coils. So long as the line to which these coils are connected is idle and its sleeve is not grounded, substantially no alternating-current voltage or tone of a superaudible frequency is applied to any of the line circuits or tips and rings of the communication paths.

However, when any one of these line circuits become busy as, for example, when the subscriber's line connected to the line circuit shown at the top of Fig. 4 becomes busy, ground will be applied to the sleeve conductor 404 which in turn applies ground to the conductor S07 with the result that the left-hand terminal of diode V1.8 rises to a voltage determined by the voltage divider resistors 1707B. Consequently, the left-hand terminal of this diode is more positive than the right-hand terminal and the diode is connected or poled in such a direction as to have a low impedance at this time. Consequently, the alternating current or tone of the U0 lead is readily transmitted through the diode V1.8 and then through primary winding of coil C07 to ground. Since the current of the alternating current is now applied to the primary winding of this coil, it will be transmitted through the coil to the secondary winding and applied to the busy subscriber's line.

However, since this tone has a frequency above audibility, it will not be heard by the subscriber and in addition, lies outside of the pass band or transmission band of the subscriber's line circuit and other equipment. Consequently, the subscriber will be unaware of the presence of this tone on the line conductors and the tone will not in any way interfere with the normal or usual operation of the line circuits and other circuits or equipment of the switching system.

In a similar manner, tone is applied to the other subscriber's line circuits when these circuits become busy due to the application of ground to the corresponding conductors S00—S06 and S08—S99. Thus, during the time the scanning operation is not in progress, a superaudible frequency, which is approximately 21 kilocycles in the exemplary embodiment described herein, is automatically applied to the transmission path of each of the subscriber's line circuits or other transmission paths, the traffic of which is desired to sample or determine. Likewise, the control potentials applied to the scanner are such that the connections to the scanner do not in any way affect or interfere with the normal operation of the telephone switching system to which it is connected.

When a scanning cycle was initiated in the manner described above, the first nine oscillations from tube 2111 were recorded in channel 1 on the tape in the manner described above. If the scan is made in a p.m. time interval, then all nine pulses recorded in the tape will be negative. If the scan is initiated in the a.m. interval, then the first eight pulses will be positive and the ninth pulse negative in response to to the first nine cycles from the oscillator 2111. As described herein, in response to the tenth cycle from the oscillator 2111, the discharge within the stepping tube 2114 is advanced to the No. 0 stepping or control cathode and the discharge within tube 2212 is advanced to the No. 0 stepping or output cathode. As a result, approximately —20 volts potential is applied to the left-hand grid of tube 2150 and a similar voltage is applied to the left-hand grid of tube 2250.

As a result, approximately —20 volts potential is applied to the U0 and T0 leads. The voltage applied to these leads is more positive than the voltage of terminal 1700A when substantially ground potential is applied to the conductor S00. If the line circuit 17 of line 11 is idle, then ground will not be applied to the conductor S00 so that the application of substantially —20 volts to U0 and T0 conductors will make no change in the output voltage applied to the conductor 1830.

The application of a potential of —20 volts to the conductor U0 makes the right-hand terminal of the diode V1.1 substantially the same voltage or more positive than the left-hand terminal which merely tends to make the impedance of this diode higher or maintain it at a high value so that alternating current is not applied to the primary winding of the coil C00 and thus not applied to the subscriber's line 11. If it is assumed for purposes of illustration that some other line, for example, the line to which the conductor S50 is applied, is busy at this time so that conductor S50 has ground connected to it, then the application of —20 volts to the conductor U0 will cause the right-hand terminal of the diode V1.51 (not shown) to be more positive than the left-hand terminal since the voltage applied to U0 is more positive than the terminal corresponding to terminal 1700A. As a result, the superaudible alternating-current tone or voltage which had been previously transmitted through the diode V1.52 to the primary winding of coils C50 is interrupted since the diode changes from a low impedance to a high impedance when the voltage applied to its right-hand terminal is more positive than the voltage applied to its left-hand terminal. However, it should be noted at this time that the voltage applied to the conductor T5 is still at approximately —45 to —50 volts negative so that the right-hand terminals of diodes V2.50 and V3.10 are still more negative than the left-hand terminals of these diodes. Consequently, the superaudible tone or alternating current, which in the exemplary embodiment described herein is 21 kilocycles, is still applied to the primary winding of the coil C50. Thus, the alternating-current transmission path between the line coils of the scanner and the U0 conductor is interrupted. However, with the exception of the coil C00, all of the other coils continue to receive alternating current over the respective tens leads, T1 through T9, inclusive. Thus, if the line to which the sleeve conductor S00 is connected is idle, the application of a more positive voltage of —20 volts to the respective units and tens control conductors still does not permit the application of tone to the primary winding of coil C00 and thus the tone is not transmitted to the line circuit 17.

Upon the stepping of the discharge from the first cathode of the stepping tube 2114, the voltage applied to the U0 lead is returned to approximately —45 to —50 volts and alternating current applied to the primary windings of corresponding coils through the various diodes such as V1.1, V1.11, etc. In this case, the discharge remain between the zero cathode and the anode of the stepping tube 2212. The application of a more positive voltage, that is, —20 volts, to U1 conductor will now interrupt the connection between the primary winding of the coil C01 and the conductor U1 because the diode V1.2 has more positive voltage applied to its right-hand terminal than is applied to its left-hand terminal. Similarly, diode V3.1 will have a correspondingly more positive voltage applied to its right-hand terminal than is applied to its left-hand terminal through the diode V2.2 with the result that the alternating-current path from T0 to the primary winding of coil C01 is also interrupted. Consequently, tone is no longer applied from either the U1 or the T0 lead to the primary winding of coil C01.

Consequently, tone is removed from the line circuit of the line connected thereto at this time during which it is being sampled or tested for the busy condition. However, when idle lines are scanned, the impedance of diode such as V4.1 and the other diodes V4.2 through 4.10 remains high while the impedance of diode V5 remains low. Thus, these diodes attenuate any residual superaudible tone so that substantially none is applied to conductor 1830 at these times.

Thus, tone is automatically applied by the diode switching network to all of the busy line circuits, but is not applied to the idle line circuit. In addition, when each of the lines to which tone is applied due to that line being busy is scanned, tone is automatically removed from the line circuit during the portion of the scanning cycle during which the line is being tested for a busy condition.

If we now assume the line 10 is busy so that ground will be applied to the conductor S07 from the line circuit 16, then upon the generation of the seventeenth cycle by oscillator 2111, that is, the seventeenth cycle after the switch 2516 is closed by the 15-cycle timer 2510 at the beginning at a scanning cycle, the discharge through the stepping tube 2114 is advanced to the No. 7 stepping or output cathode so that a —20 volt potential is applied to the lead U7. Under these conditions, the voltage applied to the right-hand terminal of diode V1.8 is higher or more positive than the voltage of terminal 1707A so the impedance of that diode is high. For a similar reason, the impedance of diode V3.1 is also high. As a result, the superaudible frequency supply from conductors U7 and T0 to coil C07 is interrupted as described above. In addition, with the impedance of diodes V1.8 and V3.1 high and with the terminal 1701A at a more positive voltage than the normal voltage of terminal 1831, the impedance of diodes V2.8 and V4.1 is reduced so current is transmitted from terminal 1707A through the diodes V2.8 and V4.1 to the output conductor 1830. The impedance of diode V5 becomes high due to the resulting voltage change. This voltage change raises the voltage of the grid of the left-hand section of tube 1832 to a more positive voltage. As a result, a more positive voltage is applied over conductor 1833 which extends to Fig. 24 and then through the low-pass filter comprising coil 2401 and condenser 2402 to resistor 2403. From resistor 2403 a circuit extends through resistor 2404 to the grid of the left-hand section of tube 2405. Tube 2405 has both of its sections connected to a double stability or flip-flop circuit in which the right-hand section is normally conducting current so that its right-hand anode is at a relatively low voltage. The flip-flop circuits of tube 2405 are adjusted to operate as a voltage responsive circuit in which the input must exceed a predetermined value before the conduction within the tube is changed and then must fall to a lower predetermined value before the conduction between the sections of this tube is shifted back to normal. The positive voltage applied from conductor 1833 in the manner described above is not immediately transmitted to the grid of the left-hand section of this tube because of diode 2406 which holds or clamps or maintains the grid of this section at substantially the same voltage as the upper terminal of this diode or at least at a voltage not appreciably more positive than the voltage applied to the upper terminal of the diode 2406 which is connected to the cathode of the left-hand section of tube 1810. Consequently, when a positive pulse is applied to this cathode in response to the seventeenth cycle from tube 2111 in the manner described above, a positive pulse from the cathode of tube 1810, in addition to being applied to the left-hand grid of tube 1910 and causing the positive pulse to be recorded in track 1 in the manner described above, is also transmitted through the network comprising condenser 1915 and resistors 1916 and 1917 and through the diode 2406 to the left-hand grid of tube 2405. The network comprising condenser 1915 and resistors 1916 and 1917 is employed to shape the pulse transmitted through it so that the first portion thereof rises to a sufficiently high value so as to exceed the magnitude required to actuate the circuits of tubes 2405 and 2451 through 2455 and then fall to a lower value which is sufficient to prevent the circuits of these tubes from returning to normal during the remainder of the pulse. The grid of this tube becoming more positive than said predetermined value causes current to flow in the left-hand section of this tube which in turn interrupts the current flowing through the right-hand section and permits the right-hand anode section to rise from a relatively low negative voltage near the voltage of the cathode to a more positive voltage near ground potential. As a result, a positive voltage pulse is applied through the diode 2407 to the grid of the left-hand section of tube 1913 which in turn causes a current to flow through the writing head 2022 of the second track on a magnetic tape 2013. Thus, a positive pulse is recorded in the same transverse line or pattern across the tape in both tracks 1 and 2 indicating an unclassified busy condition of the 10 line.

In a similar manner, each time a busy line is tested in the manner described above in response to each of the cycles of current from the oscillator 2111, two positive pulses or signals are substantially simultaneously recorded in one transverse line or pattern across the tape in tracks 1 and 2 of the magnetic tape 2012. Each time each idle line is tested or scanned in response to a cycle of current from the oscillator 2111, the single positive pulse is recorded in track 1 on the magnetic tape.

Under the assumed conditions as described above, when the subscriber's line 10 is tested, the 21-kilocycle current from the source 119 was removed. In the above description of the recording of various signals in the tape, it is assumed that when this line was tested in the manner described above, a more positive voltage or pulse only was obtained from conductor 1830 and that no 21-kilocycle current or any one of the other superaudible frequencies were present on conductor 1830.

Now assume that one of the subscribers such as subscriber 12 has called a subscriber 13 connected to the central office shown above line 100 of Fig. 1 and in Figs. 3, 4, 5 and 12. Under these circumstances, a transmission path has been established through the switching system from the tip conductor T and the R conductor of the subscriber's line 10 to the corresponding conductors of the subscriber's line 11. This path extends from the tip and ring conductor of the subscriber's line 10 through the line circuit 16 to one of the line finders such as 410, a first selector 411 and such additional selector circuits 511 as are provided, connector circuit 512 and then to the subscriber's line circuit 17 and the subscriber's line conductors 11. Under these conditions, the removal of the 21 kilocycles supplied to the primary winding of coil C07 does not remove the 21-kilocycle current from this coil. Under the assumed, line 11 is busy. Consequently, ground is applied to the conductor S00 by the subscriber line circuit 17. As a result, 21-kilocycle current is supplied to the primary of coil C00 over the U0 lead and diode V1.1. This current is transmitted over the T00 and R00 leads to the subscriber's line circuits simultaneously and then back through the connector circuit 512, through the selector circuits 511, the selector circuit 411, line finder 410 to the subscriber's line circuit 16 and then over conductors T07 and R07 to coil C07 and then through this coil to terminal 1707A and then through the diodes V2.8 and V4.1 to conductor 1830. Since line 10 is busy, as assumed above, ground is applied to conductor S07 with the result that diode V4.1 has a low impedance while diode V5 has a high impedance. Under these conditions, these diodes provide a relatively good transmission path for the superaudible frequencies to conductor 1830.

The alternating current received over conductor 1830 at this time is supplied to the grid of the left-hand section of tube 1832 and repeated by this section to its cathode. The alternating current is thus applied to conductor 1833. This current, however, is suppressed or prevented from flowing through the low-pass filter network comprising coil 2401 and condenser 2402.

In addition, this network presents high impedance to the alternating current so that it is applied through the coupling condenser 1834 to the coil of 1835 and then to the grid of the right-hand section of tube 1832. The right-hand section of tube 1832 amplifies the superaudible tone of frequency and applies the amplified signals or currents to the grid of the output amplifier tube 1836, which tube in turn applies these signals to the input terminals of each of the band-pass filter networks 2410, 2411, 2412, 2413 and 2414. These filter networks are tuned to permit the passage of only one of the various superaudible frequencies. For example, the filter network 2411 is designed to pass the 21-kilocycle current. The output of the band-pass filter 2411 is applied to a rectifier or diode 2417 which causes a direct-current voltage to be applied across condenser 2422. This voltage is in turn applied through the potentiometer or voltage divider 2432 to the resistor 2442. The diode 2417 is connected or poled in such a manner that a positive voltage is applied to the left-hand terminal of resistor 2442 in response to the application of 21 kilocycles applied to conductor 1830 and in turn to conductor 1833. Consequently, when the next positive pulse is received from the cathode of the left-hand section of tube 1810, the grid of the left-hand section of tube 2452 becomes sufficiently positive to initiate the flow of current through the left-hand section of tube 2452. As a result, the current flowing through the right-hand section is interrupted so that its anode becomes more positive, that is, its anode changes from a negative voltage of appreciable magnitude to a voltage near ground potential, which voltage may nevertheless be a few volts negative. As a result, a more positive voltage is applied through the diodes 2462 and 2472 to the grids of the left-hand sections of both tubes 1913 and 1914.

As pointed out above, in testing such a busy line a sufficiently high positive voltage is also applied to the left-hand grid of tube 2405 to make the left-hand section of this tube conduct and the right-hand section nonconducting. As a result, the voltage of the right-hand anode tends to rise in the manner described hereinbefore. However, when such a positive voltage is also substantially simultaneously applied to the grid of the left-hand section of any of the tubes 2451 to 2455, the voltage of the left-hand anode of tube 2405 is prevented from rising to a more positive potential near ground. Instead, the voltage of the anode of the left-hand section of tube 2405 is maintained at a negative voltage of appreciable magnitude by the operation of the right-hand section of tube 1810. When the anode of the right-hand section of tube 2452 rises to the voltage near ground potential, this voltage is applied through the diode 2482 to the right-hand grid of tube 1810. As a result, current flows through this section and maintains its anode at a relatively low voltage near the negative voltage of battery 1811 connected to the cathode of the right-hand section of tube 1810. The anode of the right-hand section of tube 1810 is connected to the right-hand anode of tube 2405. Thus, when a positive voltage is applied to the left-hand grids of any of the tubes 2451 through 2455, the anode of the left-hand section becomes more positive in the manner described above with the result that current flows through the right-hand section of tube 1810 and prevents the anode of the right-hand section of tube 2405 from rising to near ground potential even though the current flowing through this section was interrupted or reduced in the manner described herein due to a sufficiently high positive voltage applied to the left-hand grid of tube 2405.

Thus, under the assumed conditions wherein the subscriber 12 is interconnected with the subscriber 13 and wherein 21 kilocycles are received from the subscriber's line circuit 16 when this line is scanned and even though the 21 kilocycles from the U1 and T0 leads are removed from the coil C07, positive pulses are applied to the left-hand grids of tubes 1913 and 1914 which cause positive pulses to be recorded by the recording heads or coils 2022 and 2023. Thus, under these circumstances, positive pulses or signals are substantially simultaneously recorded in a transverse line or pattern across the tape in all three tracks when many of the lines scanned are interconnected with another local subscriber's line through the automatic switching equipment to which this traffic sampling and recording apparatus is connected.

If we assume that the subscriber at station 12 was communicating with the subscriber at station 14 instead of the subscriber at station 13, then the circuits would operate in a similar manner but record different signals in the tape. Under these circumstances, the calling subscriber dialed a suitable number to cause his line circuit to be connected to the reverting call selector 25 and by the operation of this selector mechanism, the subscriber at station 12 can call and communicate with the subscriber at station 14 in a known and understood manner. As shown in Fig. 5, the 18-kilocycle source 120 is interconnected with the tip and ring of the revertive call selectors through suitable decoupling impedance or networks so that when the subscriber line circuit 17 is scanned under these assumed conditions, 18-kilocycles potential is applied to the conductor 1830 from the reverting call selector. This potential is repeated to conductor 1833 and then transmitted through the 18-kilocycles band-pass filter 2410. The resulting positive voltage obtained from the diode 2416 is applied to the left-hand grid of tube 2451 with the result that in response to the corresponding pulse from the cathode of left-hand section of tube 1810, a flow of current through the left-hand section of this tube 2451 is initiated and the current flowing through the right-hand section interrupted. Consequently, a positive pulse is applied through the diode 2471 to the left-hand grid of tube 1914 and through the diode 2481 to the right-hand grid of tube 1810, which prevents the anode of the right-hand section of tube 2405 from rising to a potential near ground potential. Consequently, when the corresponding pulse is obtained from the cathode of the left-hand section of tube 1810, a positive pulse will be recorded in track 3. Thus, under these circumstances, the positive pulse is recorded in track 1 and another positive pulse or signal recorded in track 3. Track No. 2 is left in its initial or neutral condition.

Similarly, if the subscriber station 12 had been connected through the switching equipment to a distant central office such as office 24, then 30-kilocycles current would be found on conductor 1830 when the subscriber's line circuit 16 is scanned which in turn is applied to the band-pass filter network 2414 tuned to this frequency with the result that the current flowing through the right-hand section of tube 2455 is interrupted and a more positive voltage near ground potential is applied through the diodes 2465 and 2475 to the grids of the right-hand sections of the respective tubes 1913 and 1914. Consequently, negative pulses are recorded in tracks 2 and 3 on tape 2013 thus indicating the above traffic condition wherein the subscriber's line is interconnected with a trunk extending to the distant central office 24.

If the subscriber's line had been connected to a trunk extending to central office 23, then 27-kilocycles current will be transmitted from the trunk circuit through the telephone switching equipment and then to the secondary winding of coil C07 and then to conductor 1830 and conductor 1833 and ultimately to the band-pass filter 2413. As a result, positive voltage will be applied through the diode 2474 to the right-hand grid of tube 1914 with the result that a negative pulse would be written in track 3 in addition to the positive pulse in track 1 as described herein. In the above-described manner, it is thus possible to sample each of the subscribers' lines to which connections are extended from the scanner and determine whether or not the subscriber's line is busy and if it is busy, whether it is connected through the switching equipment to predetermined switching devices such as revertive selectors or whether this line is interconnected to a distant central office over a trunk and repeater circuit or interconnected with any other type of communication circuit. In each case, the various signals or pulses are substantially simultaneously recorded in the line or pattern across the tape so that the tape may be later employed to analyze the traffic conditions in the central office.

While only the conductors S00 and S07 are shown connected to the subscriber line circuits such other of these conductors are connected to other line circuits as may be desired. Usually, the conductors are divided into the tens groups and all of the conductors of a tens group connected to one type of line circuit, trunk circuit or other switching device being tested or observed. However, this manner of connection is for convenience only and is not required by the circuits since any one of the lines can be connected to any one of the scanning terminals. The same applies to the T and R leads from the coils associated with each of the sleeves.

As indicated herein, in addition to sampling and recording the busy or idle condition of any desired one or ones of the subscriber line circuits, trunk circuits or the like, it is frequently desirable to determine the busy or idle condition of any piece of switching equipment at the time of the scanning operation described above. In this case, only the sleeve conductor of the particular device being tested is connected to the scanning diode matrix. For example, the conductor S10 is connected to the sleeve of the conductor of the line finder 410 and the first selector 411. Normally, this sleeve conductor is open, i.e., not connected to battery or ground or any other potential source when the line is idle. However, the terminal 1300A is connected through the resistor to the negative battery so that the left-hand terminal of diode V1.11 will have a negative voltage applied to it when the selector 411 and line finder 410 are idle. Each time this line finder and first selector are scanned or tested and found to be idle, only a positive signal is recorded in the first track of tape 2013. If this line finder is busy when the conductor S10 is connected through to the conductor 1830 in the manner described above, then a positive signal or positive pulse is recorded in both tracks 1 and 2 upon the tape 2013. This type of signal is called an unclassified busy signal and is employed in case it is desired to record only the fact that the particular circuit or piece of equipment is busy or idle. As many different line finder first selector combinations may be so tested as may be desired. In addition, any other selector circuits or other types of selector circuits may be similarly connected to suitable ones of the terminals S00 to S99 of the line scanner and its busy or idle condition regularly recorded in the same manner during each scanning operation of the scanning equipment described herein. As shown in the drawing, the terminal S19 is similarly connected to the connector circuit 510. Thus, each time this connector circuit becomes busy, ground is applied to its incoming sleeve by the operation of the circuit as is well understood. Consequently, each time this circuit is scanned when it is busy, an unclassified busy signal is recorded in the tape 2013 indicating that this circuit is busy at the time the terminal S19 is scanned. Of course, when the circuit is idle then an idle indication is recorded, which indication comprises the positive signal in the track 1 only.

It is also sometimes desirable to additionally identify certain of the devices which are scanned or tested for its busy or idle condition. In this case instead of leaving the coil terminals such as C10 and C19 disconnected as shown in the drawings the corresponding terminals are connected through isolating or decoupling networks to one or more of the sources of superaudible frequency. Thus, for example, the line finder first selector circuit 420, 421 has its sleeve terminal connected to the conductor S80. Consequently, each time the terminal 80 is scanned the busy or idle condition of the line finder 420 and first selector 421 will be recorded. In this case, however, the secondary terminals of coil C80 are connected to both the 24-kilocycle source and also the 18-kilocycle source of superaudible frequency. Thus, each time this terminal is scanned and found to be busy both 24- and 18-kilocycle alternating currents will be present on the conductor 1830 with the result that all of the tubes 2405, 2451 and 2453 will all be actuated. As a result a positive signal or pulse is recorded in track 1, a negative signal or pulse in track 2, and a positive signal in track 3 thus indicating a different class or type of busy condition. Likewise, the terminal S89 is connected to the input sleeve terminal of connector 512. In addition the secondary terminals of coil C89 are connected to a source of 24-kilocycle current with the result that each time this terminal is tested and found to be busy a positive signal in track 1 will be recorded together with a negative signal in track 2. Track 3 will be left in its neutral condition. Thus a different class of busy indication will be recorded for the connector 512. Records of the connections of these terminals to the different devices also must be maintained so that the busy and idle conditions of various scanned terminals may be correlated with the different devices.

As shown in the drawing the sleeves of the reverting call selectors and repeaters 20 and 21 are not connected to scanning system so that the busy or idle condition of these devices will not be recorded. However, as described herein, the connections of certain subscribers' lines to these devices are recorded which connections make these devices busy. If it is desired however that the busy or idle condition of these devices may be determined during each of the scanning cycles, it is necessary to extend one of the scanning terminals S00 to S99 to the sleeve of the various revertive call selectors and repeater circuits to be so tested. The repeater circuit 31 may be similarly connected to a source of superaudible frequency when desired. As shown in the drawing however the busy and idle conditions of this repeater are determined during each scanning cycle. The repeater 31 is a two-way repeater or trunk circuit. This repeater may be seized from the selector such as selector 19 and a call transmitted through it to the distant office 30. The repeater 31 is also arranged so that this repeater may be seized from the distant office 30 and a call from this office transmitted through the repeater and through selector 32 and then through a connector and other circuits to the called subscriber.

Thus in the case of repeater 31 it is sometimes desirable to determine whether this repeater was made by a call originating within the central office shown above line 100 in Fig. 1 or whether it was made busy by a call from the distant office 30. Repeater circuits such as 31 are known and are arranged so that when seized by the equipment in office shown above line 100 in Fig. 1 the incoming or left-hand sleeve terminal is made busy but the other sleeve terminal extending to the selector 32 is not made busy. However, when this repeater is seized from the distant office 30 then both of the sleeve terminals are made busy and maintained busy. These two sleeve terminals are shown in Figs. 12, 13 and 6 to be extended to the scanning conductors S91 and S92. Thus when the scanning conductor S91 is busy but S92 is not the two successive signals recorded in the tape will be a positive signal in track 1, positive signal in track 2 and a neutral signal in track 3 followed by a positive signal only in track 1. If the repeater has been made busy by being seized from the distant office 30 then the two signals recorded in the tape will be positive signal in track 1 and positive signal in track 2 and a neutral signal in track 3 in response to scanning both terminals S91 and S92. In this manner it is possible to indicate the type of call which made the repeater 31 busy. In case it is desired to record these signals not as unclassified busy signals but as a special coded busy signal then one or more of the frequencies 18 kilocycles, 21 kilocycles, 24 kilocycles, 27 kilocycles or 30 kilocycles will be connected to the secondary coil terminals of either or both of the line coils C91 and C92 in which case the busy conditions of the circuit will be recorded by the particular type of signals desired in accordance with the connection to the different sources of superaudible frequency.

Of course one of these sets of terminals may be of one code or unclassified busy code while the other set may have a different code or a coded busy signal when it is so desired.

As described above each of a number of codes of recorded signals represents a different traffic condition. The codes can represent different traffic conditions when desired. In addition the same code or codes may represent two or more different traffic conditions on different lines, devices, or circuits and the scanning terminal or groups of terminals for which the code is recorded employed to distinguish and differentiate the different traffic conditions represented by said code or codes. While the scanning terminals are shown connected to different ones of different types of equipment they may be connected to other types of equipment including line switches, party line connectors, different types of repeater circuits, etc., employed in telephone switching systems so long as the circuit or switching device has its sleeve terminal which is grounded when busy and disconnected or connected through a negative battery when idle.

If the busy and idle conditions of any piece of equipment or transmission path are represented by different electrical conditions in the circuit or on any specific conductors leading to or extending from the circuit or device, the busy or idle condition of this device may still be scanned, determined and recorded in the manner described herein if a repeating relay is employed, which relay will respond to the different busy and idle conditions. The relay must either operate or release when the circuit or device is busy and apply ground to a conductor extending to the scanning terminal. When the circuit is idle the relay should either open the circuit of the conductor extending to the scanning terminal or apply negative battery to this conductor. In this manner the busy or idle condition of any or all of the circuits of a switching center may be periodically and automatically scanned, tested and have their busy, idle and other conditions recorded by the scanning and recording arrangement, described herein.

It is frequently desirable to be able to determine and record other traffic conditions such as for example the holding time of a circuit or piece of switching equipment. In accordance with the exemplary embodiment of this invention described herein in addition to recording the busy and idle condition of each of a plurality of lines and devices in the manner described herein circuits are provided for determining and recording the time elapsing between the time the subscriber picks up his telephone instrument and the time at which dial tone is supplied to him. While such a recording may be provided for any or all of the subscribers' lines the specific embodiment disclosed herein is arranged to record such information for any one of eight different subscriber's lines. The subscriber's line on which it is desired to make the observation may be changed from time to time by changing appropriate cross-connections between the recording equipment and the various subscribers' lines. The circuits and apparatus for so controlling the tape recording apparatus shown in Fig. 20 are shown in detail in Figs. 7, 8, 9, 10, 14, 15 and 16.

Each time power is applied to the system in response to closure of the 24-hour timer contacts 2518 in the manner described herein the left-hand section of tube 910 becomes conductive because the grid of the left-hand section of this tube is biased to a more positive voltage than the right-hand grid of this tube by resistor 928. It is assumed in the following description that the left-hand sections of tubes 1010, 1011 and 1622 start to conduct when power is applied. If the right-hand sections start to conduct first, the circuits operate as described hereinafter at the end of a recording to cause the left-hand sections to conduct. Otherwise, the circuits do not respond until one of the subscribers whose line is under observation places a call.

The input relays 700 through 707 have their windings connected in parallel with the upper winding of the line relays such as the upper winding of relay 450. Thus these relays will not operate. Assume for the purpose of illustration that the winding relay 707 is connected to the upper winding of relay 450. So long as the relay 450 is not operated relay 707 is not operated and is maintained with its contact opened as shown in the drawing. At this time a small current will flow through the winding of relay 707 through the relay 450 and maintain relay 707 in a position shown because relay 707 is a polarized relay. At this time the current flows in such a direction as to maintain the contacts of relay 707 open as shown in the drawing, but insufficient current will flow through the winding of relay 450 to cause relay 450 to operate. However, when the subscriber at either station 12 or 14 initiates a call current flows through line 10 and causes relay 450 to operate. As a result a voltage drop appears across the upper winding of this relay which voltage drop causes the current flowing through the winding of relay 707 to reverse and in turn this relay closes its contacts. The operation of relay 450 also initiates the operation of the line finder circuits and causes the line finder circuits to find the terminals of line 10 in the usual manner. In case line switches instead of line finders are employed then operation of relay 450 will cause the operation of the line switches which in turn will ultimately cause the connection of the line 10 to a first selector. In either event, no dial tone will be returned to the calling subscriber and cut-off relay 451 is not operated until the subscriber's line is connected to a first selector at which time dial tone is returned to the calling subscriber and the cut-off relay operated.

Normally when all of the relays 700 through 707 are maintained in the position shown in the drawing the grids of the tubes 710, 711, 712 and 713 are maintained at substantially ground potential by the grid resistors connected between the respective grids of these tubes and ground. Consequently, the cathodes of each of the sections of these tubes is likewise maintained at substantially ground potential or slightly more positive than ground potential and as a result the grid of the left-hand section of tube 911 causes current to flow through the left-hand section of this tube. At this time the grid of this section is biased so that its cathode potential as determined by the current flowing through the resistor 913 and the voltage of the battery 914 is a few volts more positive than the cathodes of tube 910. A cold cathode gas-discharge tube 915 is connected between the grid circuit of the left-hand section of tube 911 and the output of the diode matrix shown in the upper portion of Figs. 7 and 8.

The diodes of the switching matrix shown in Figs. 7 and 8 are connected in the direction or polarity so that they will have a high impedance when substantially ground potential is supplied to cathodes of tubes 710 through 713 inclusive, and a more negative potential is applied to the conductor 916 which potential is obtained from the voltage dividing resistors in the grid circuit of the left-hand section of tube 911.

At this time tube 912 has very little current flowing through its anode-cathode path due to the bias voltage developed across its cathode resistor. As a result the voltage applied to the grids of both sections of tube 708 of the flip-flip circuit 709 through the cross-coupling resistors of that circuit as well as the voltage applied to the grids of the corresponding tubes of the flip-flop circuits 810 and 811 is maintained at a sufficiently negative value with respect to the battery 714 connected to the cathodes of tubes 708 and the corresponding tubes of the flip-flop circuits 810 and 811 so that these tubes 708 and the other tubes of the flip-flop circuits 810 and 811 are essentially non-conducting and cut off. In addition when tubes 708 and the corresponding tubes of circuits 810 and 811 are cut off sufficiently negative voltages are applied to the grids of tubes 1410, 1510 and 1511 so as to prevent appreciable current flowing through these tubes. As a result the conductors 1420, 1421, 1520, 1521, 1522 and 1523 are maintained at a negative voltage near the voltage of battery 1410.

The circuits remain in the above-described condition so long as the subscribers' lines to be observed remain idle. When a subscriber at station 14 on line 10, for example, initiates a call the circuit for operating the line relay 450 is completed which in turn completes a circuit for the operation of relay 707 which circuit extends from battery 715 and voltage dividing resistors 716, winding of relay 707 to the left-hand terminal of the upper winding of relay 450. At this time a potential drop occurs across this winding due to the line current flowing over the subscriber's line which potential drop causes the current flowing through the winding of relay 707 to reverse and close the contacts of relay 707. As a result the voltage applied to the lower grid if tube 713 is changed from substantially ground potential to approximately —48 volts of battery 715. The negative voltages from battery 709 applied to the control conductors 717, 718, 817, 818, 810 and 820 at this time do not materially affect or interfere with the transmission of negative voltages from the cathodes of tubes 710 through 713 through the diode matrix shown in Figs. 7 and 8. Consequently, when the voltage of the lower grid of tube 713 changes from substantially ground potential to a more negative voltage the voltage of the cathode of this section changes by a corresponding amount in the negative direction. With the cathode of the lower section of tube 713 at a low voltage approximately —45 to —50 volts the polarity of the voltage across the diodes in the lower path of the matrix shown in Figs. 7 and 8 is reversed. That is, the voltage across diodes 827, 837 and 847 was reversed so that the impedance of these diodes changes from the high value to a low value and permits appreciable current to flow from the conductor 916 to the negative cathode of the lower section of tube 713. As a result this current produces a small voltage drop across resistor 747 as well as across the diodes 827, 837 and 847 so that the voltage of the conductor 916 falls to a more negative value than before which voltage may be of the order of —20 to —25 volts. The left-hand section of tube 911 normally has appreciable current flowing through it so that the cathode current produces an appreciable voltage drop across the cathode resistor 913. The application of the negative pulse or voltage from conductor 916 through the gaseous conduction diode 915 to the left-hand grid of this tube causes less anode-cathode current to flow through this section with the result that the voltage of the cathode of this section decreases and applies the negative pulse or voltage through diode 917 to the left-hand grid of tube 910.

Both sections of tube 910 are connected in a flip-flop circuit in which the left-hand section is normally conducting. The application of the negative voltage to the grid of this section therefore interrupts current flowing through this section and due to the action of the cross-connecting circuits causes a flow of current through the right-hand section to be initiated. At the same time condenser 918 has its charge changed due to the fact that the voltage of the right-hand anode falls to a relatively low value in response to the initiation of current flowing through this section of the tube.

The interruption of the discharge flowing through the left-hand section of tube 910 causes its anode voltage to rise to approximately ground potential or slightly above ground potential which voltage is applied through the diode 919 to the grid of tube 912. This voltage is also transmitted to the diode 1611 at this time but is ineffective to actuate the circuits of tube 1612 because the diode 1611 presents a high impedance to this voltage and because the voltage applied over conductors 1613 maintains the left-hand grid of tube 1612 near its previous value. The rise in voltage of the anode of the left-hand section of tube 910 is also transmitted through resistor 924 and condenser 923 to diode 1012. This rise in voltage is opposed by diode 1012. In addition the left-hand section of tube 1010 is already conducting as assumed above so the positive pulse applied to diode 1012 at this time is ineffective to actuate the circuits of tube 1010.

The application of positive voltage to the grids of tube 912 causes the voltage of the cathode of this tube to rise to near ground potential which applies operating anode voltage and operating grid bias voltage through the cross-coupling resistors to tube 708 and the corresponding tubes in the flip-flop circuits 810 and 811. Both sections of tube 708 as well as the corresponding tubes of the flip-flop circuits 810 and 811 are connected in a flip-flop or double stability circuit and one section or the other of these tubes will start to conduct and prevent conduction in other sections of these tubes. Since it is assumed that the cathode of the lower section of tube 713 is at a lower voltage than the cathodes of the other sections of input tubes 710, 711, 712 and 713 a more negative voltage is applied to the conductor 717 through diode 727 than is applied to conductor 718 through the diodes 730, 731, 732 and 733. A more negative voltage is applied to conductor 717 through diode 727 than is applied to the diodes 720, 721 and 722. However, these diodes are connected in such a manner that the more negative voltage applied to diode 727 is transmitted through this diode to conductor 717. As a result the left-hand section of tube 709 is prevented from conducting while the discharge is initiated through the right-hand section of this tube. In a similar manner conduction is prevented through the left-hand sections of the corresponding sections of the tubes of the flip-flop circuits 810 and 811 while the flow of current through the right-hand section of these tubes is initiated. Consequently, the anodes of the left-hand sections of these tubes rise to near ground potential while the right-hand anode of the tubes of the flip-flop circuits 709, 810 and 811 are maintained at a much lower voltage. Consequently, a more positive voltage is applied to the right-hand grids of tubes 1410, 1510 and 1511 than is applied to the left-hand grids of these tubes. The sections of these tubes operate as cathode followers and as a result apply a more positive voltage to conductors 1421, 1521 and 1523 than is applied to conductors 1420, 1520 and 1522.

Combined lockin and lockout means are provided comprising the diodes 724, 734, 824, 834, 829 and 839. Diode 724 is connected between the control conductor 1420 and the control conductor 717. Likewise the diode 734 is connected between the control conductor 1421 and the control conductor 1718. The diodes 824, 834, 829 and 839 are similarly connected between the control conductors of the diode switching matrices shown in Figs. 15 and 8. As described herein a more positive control potential near ground is applied to conductor 1421. This potential was in turn transmitted through diode 734 to the diodes 733, 732, 731 and 730 thus clamping the left-hand terminals of resistors 740, 742, 744 and 746 at this voltage near ground potential. Consequently, if a call should now be originated on one of the other lines under observation and the cathode of the corresponding section of one of the tubes 710 through 713 had its voltage reduced from approximately ground potential to the voltage of approximately −45 to −50 volts derived from battery 715, this additional voltage drop appears across the corresponding one of the resistors 740, 742, 744 and 746 and is therefore not relayed or applied to the conductor 916. In a similar manner upon the application of a more positive voltage near ground, potential to the conductors 1521 and 1523 is transmitted through the conductors 818 and 820 which similarly lock out the other cathodes of the tubes 710 through 713 with the exception of the cathode of the lower section of tube 713. Thus the potentials applied to these conductors by the operation of circuits described herein lockout or prevent the transmission of voltages from the cathodes of the tubes 710 through 713 connected to other lines so that initiation of a call on any of these lines does not interfere or affect the operation of the circuits in measuring the time between the initiating call and returning of dial tone to the subscriber. Likewise a relatively more negative voltage is maintained or applied to the conductors 1420, 1520 and 1522. These conductors have a diode connected between them and the path from the lower cathode of tube 713 to conductor 916. By applying this negative voltage to these control conductors the control diodes similar to 727 have a voltage applied across them to cause their impedance to be relatively high and thus these diodes do not materially interfere with the transmission of current through the lower path of the diode matrix shown in Figs. 7 and 8.

With the control potentials assumed above applied to the control conductors of both the diode switching networks, diodes 1444, 1554 and 1564 all have a more positive voltage near ground potential applied to their upper terminals so that they will permit a voltage or potential near ground potential to be transmitted through the diodes 1527, 1537 and 1547 to the grid of the left-hand section of tube 1612 when ground is applied to this terminal due to the operation of the line finder and line cut-off relay 451. The ground at this time is transmitted from the sleeve of the first selector and then through the line finder, the operated contacts of relay 450 to conductor 403 and the winding of relay 451. Relay 451 operates and connects ground from the sleeve of the line finder through its lower operated contacts to its winding and also to conductor 403. The application of ground through conductor 403 and the operation of relay 451 takes place when a path is established from the calling subscriber's line circuit to the first selector circuit. At this time dial tone is transmitted to the subscriber to indicate that its subscriber may start dialing the called party's number or station identification. It is this interval of time between the operation of relay 450 and the operation of relay 451 that it is desired to determine and record.

The rise in voltage of the cathode of tube 912 from a large negative voltage to a voltage near ground potential as described above is transmitted through diode 920 and resistor 1614 to the grids of both tubes 1616 and 1617, and also through resistors 1618, 1619 to the right-hand grid of tube 1615.

The application of a voltage near ground potential to the grids of tubes 1616 and 1617 causes these tubes to conduct and apply power over conductors 1620 to the slow speed motor 2012 which causes the tape 2013 to be set into motion at a slow speed.

Thereafter this motor continues to drive the tape at a slow speed employed in recording the elapsed time between the initiation of a call by a subscriber and the time dial tone is returned to the subscriber.

The sections of tube 1615 are connected in a multivibrator circuit in which the right-hand section was normally biased to cut-off so that the left-hand section is conducting and the right-hand section non-conducting. However, upon the application of a voltage near ground potential through the diode 920 and resistors 1618 and 1619 the bias voltage on the right-hand section is raised so that the circuits of this tube then can start to operate as a multivibrator circuit with the right-hand section starting to conduct. The time constants of the circuits of the tube 1615 are selected in an exemplary embodiment of this invention described herein so that they have an operating period of about a tenth of a second, that is, it requires about a tenth of a second from the time the right-hand section starts to conduct until this section again starts to conduct. The percentage time of conduction of each of the two sections may be varied and in one exemplary embodiment is approximately 50 percent of the time.

When the right-hand section of tube 1615 starts to conduct current, the current flowing through the left-hand section of this tube is interrupted so that its anode rises to a relatively high voltage and applies a more positive voltage near ground potential to the right-hand grid of tube 1612. As a result current flows through the anode cathode path of the right-hand section of tube 1612 and then over conductor T2A to the second recording coil 2022. This current flows through this coil in the direction to cause a positive spot or pulse to be recorded in track No. 2 in the tape 2013. At this time no pulse is recorded in the No. 1 track which is maintained in its neutral condition. Thus the code or recording of a positive pulse or spot in the No. 2 track while the No. 1 and No. 3 tracks are left in their normal condition indicates that an elapsed time interval is being recorded on the magnetic tape.

Thereafter the circuits of the multivibrator tube 1615 operate in the usual manner in which the left-hand side starts to conduct after an interval of time, 50 milliseconds in an exemplary embodiment of this invention and the current flowing through the right-hand side is thus interrupted and after another predetermined interval of time which is approximately 50 milliseconds in an exemplary embodiment of this invention the right-hand side again starts to conduct and the current flowing in the left-hand side is interrupted. Approximately 50 milliseconds later in an exemplary embodiment of the invention current again starts to flow through the left-hand section and interrupts the current flowing in the right-hand section. The above operation continues so long as the subscriber has his telephone instrument off of its support and dial tone is not applied to this line, that is, his line has not been found or connected to a first selector. Each time the current through the left-hand section of tube 1615 is interrupted the voltage of the anode of this section rises and applies a more positive voltage to the grid of the right-hand section of tube 1612. As a result current flows through the right-hand section of tube 1612 and through the winding of the recording coil 2022 in such a direction as to cause a positive signal to be recorded in the second track on the tape 2013. Thus each tenth of a second such a signal is recorded in the second track until the call is either abandoned or until dial tone is applied to the line. At this time positive pulses only are recorded in the No. 2 track, the No. 1 track and No. 3 track being left in their neutral or initial magnetic condition.

It is also assumed in the above description that the operation of the scanning equipment is not initiated just as it was assumed in the described operation of the scanning equipment that the operation of the elapsed time recording equipment now being described was not in operation. The non-interfering and interlocking features of these two portions of the system will be described hereinafter. During all of this time the flip-flops 709, 710 and 811 remain in the condition described above so as to maintain the connection from the cathode of the lower section of tube 713 and the grid of tube 911 through the various diodes of the diode matrix as described above. In addition, tubes 1410, 1510 and 1511 are conditioned as described above wherein the right-hand sections of these tubes under the assumed conditions are conducting and are applying a voltage near ground potential to the right-hand cathodes. Thus the path is maintained from conductor 403 through the diode matrix shown in Figs. 14 and 15 to conductor 1613 extending to the left-hand grid of tube 1612. During all of this time also the right-hand section of tube 910 is conducting and the left-hand section non-conducting with the result that the voltage of the anode of the left-hand section is at or near ground voltage and preferably a few volts more positive than ground voltage due to the battery 921 and resistor 922. As a result the upper terminal of the diode 1611 is at or near ground potential so that the grid of the left-hand section of tube 1612 may rise to substantially the same voltage should such a voltage be applied to the conductor 1613 through the diode matrix shown in Figs. 14 and 15 from conductor 403.

The usual time encountered between the initiation of a call by a subscriber and the time at which dial tone is returned to the subscriber indicating that the system is in condition to receive dial pulses usually is of the order of a tenth of a second to a half second. However, under unusual circumstances this time may be longer. During this entire interval of time except during the scanning intervals as described hereinafter the above-described operations of the circuit continue and cause positive signals or pulses to be recorded in track No. 2 every tenth of a second.

Upon the termination of the period either when the subscriber hangs up without receiving dial tone or else when dial tone is supplied to the subscriber's line the voltage drop across the upper winding of relay 450 is reduced to zero. When the subscriber hangs up he interrupts the line circuit which thus interrupts the circuit path for the operation of relay 450 and removes the voltage applied to the left-hand terminal of the upper winding of this relay. In case dial tone is supplied to the subscriber's line the cut-off relay 451 operates and transfers the line circuit extending to the subscriber's line from the winding of relay 450 and connects the subscriber's line to the line finder terminal, then to the first selector at which time dial tone is applied to the subscriber's line indicating that the central office equipment is then ready to receive dial pulses. In this case current flowing through the winding of relay 450 is also interrupted so that the voltage applied to the left terminal of the upper winding of this relay is interrupted and the voltage drop across the winding becomes zero. As a result the current flowing through the winding of relay 707 is again reversed and returned to its initial direction wherein the contacts are actuated to the position shown in the drawing. As a result the voltage applied to the grid of the lower section of tube 713 rises to substantially ground voltage causing the voltage applied to the cathode of this section of tube 713 to rise correspondingly and apply a more positive voltage around −125 volts to the left-hand grid of tube 911. The voltage difference between the grid of tube 911 and the substantial ground potential applied to conductor 916 at this time appears largely across the gaseous conduction of diode 915 and the other resistors in the grid or input circuit of tube 911. During the time relay 450 had operated but relay 451 is not operated the grid of this tube was at a lower voltage as described above. Consequently upon the returning of this grid to its initial condition the voltage across the cathode resistor 913 of this tube rises correspondingly and such voltage change is applied to the left-hand terminal of diode 917 and permits the voltage of the left-hand terminal of condenser 918 to rise due to the current flowing through resistor 928. After a time interval determined by the constants of resistor 928 and condenser 918 and the constants of the other elements of the circuits of tube 910 a discharge is again initiated through the right-hand section of this tube and the discharge flowing through the left-hand section interrupted. The delay interval described above of condenser 918 and resistor 928 is provided to insure that circuits associated with tube 1612 have ample time to operate, as described herein, in responding to the operation of the circuits which operate incident to the application of dial tone to the subscriber's line. If relay 450 releases due to the subscriber hanging up before dial tone is supplied to him then the circuits operate as described above and relay 707 releases and causes a more positive voltage near ground potential to be applied to the lower grid of tube 707 which in turn causes a more positive or less negative voltage to be applied to the left-hand grid of tube 911 which in turn causes a corresponding voltage change on the cathode of this tube.

If however, relay 450 releases because dial tone is supplied to the subscriber's line then relay 451 first operates due to the application of ground to the subscriber's line circuit sleeve conductor by the first selector which ground is transmitted back through the line finder and the line finder bank to the winding of relay 451. Relay 451 in operating applies ground to the conductor 403 concurrently with disconnecting the upper winding of relay 450. As a result the voltage applied to the conductor 403 changes from approximately −50 volts to ground potential. This voltage is transmitted through the above-described diodes of the diode matrix shown in Figs. 14 and 15 to conductor 1613 and then to the grid of the left-hand section of tube 1612. At this time the left-hand section of tube 910 is not conducting so a voltage near ground potential is applied to the upper terminal of diode 1611 with the result that the left-hand grid of this tube is permitted to rise to approximately the voltage of the upper terminal of diode 1611 which in an exemplary embodiment of this invention may be a few volts positive with respect to ground potential. Consequently the application of approximately ground potential to conductor 1613 causes the grid of this section to rise which in turn causes current to flow through the left-hand section of tube 1612. As a result the anode of the left-hand section of this tube applies a more negative voltage to the left-hand grid of tube 1622 through the cross coupling network.

Both sections of tube 1622 are connected in a double stability or flip-flop circuit in which the left-hand section is normally conducting. As a result of the application of the more negative pulse or voltage to the left-hand grid of this tube, the conduction through the left-hand section is interrupted which in turn initiates the flow of a discharge current through the right-hand section of this tube. Thus when the circuits of tube 1622 are unoperated or in their normal condition with the left-hand section conducting indicates that the dial tone has not been supplied to the subscriber's line. On the other hand when the right-hand section of this tube is conducting and the left-hand section non-conducting it indicates that dial tone has been applied to the subscriber's line and that the subscriber may start to dial the numbers or symbols of a called station's designation.

Thus substantially simultaneously with the application of a more positive voltage to the grid of the left-hand section of tube 911, a more positive voltage is applied to the left-hand grid of tube 1612. In order to permit sufficient time for circuits 1612 and 1622 to function as described above the application of a more positive voltage from the cathode of tube 911 to the left-hand grid of tube 910 is delayed as described by condenser 918 and resistor 928 and the related circuits and apparatus. Thus condenser 918 and related circuits control the time it takes the grid of the left-hand section of tube 910 to reach a value required to initiate the discharge through the left-hand section of this tube and interrupt the discharge through the right-hand section thereof. During this delay time the circuits of the left-hand section of tube 1612 and the circuits of tube 1622 function in the manner described above to register the fact that dial tone has been supplied to the subscriber's line.

At the end of the delay interval of condenser 918 the circuits of tubes 910 are restored with the left-hand section conducting and the right-hand section non-conducting. As a result the voltage applied to the anode of the left-hand section falls and removes the positive voltage through diode 919 applied to the grid of tube 912. It also removes the positive voltage from the upper terminal of diode 1611 so that if the relay 451 is not previously operated subsequent operation will not be effective to interrupt the current flowing through the left-hand section of tube 1612 and thus will not be effective to transfer the discharge from the left-hand to the right-hand section of tube 1622.

As pointed out above when the left-hand section of tube 910 starts to conduct the voltage of its anode falls from a voltage near ground potential to a more negative voltage with the result that a negative pulse is transmitted through the resistor 924 and a small differentiating condenser 923 and through the diode 1012 to the left-hand grid of tube 1010. As a result the discharge normally flowing through the section of this tube is interrupted and a discharge initiated through the right-hand section of tube 1010. Consequently the voltage of the anode of the left-hand section of tube 1010 rises to a more positive voltage near ground potential and applies a corresponding voltage through the diode 925 to the grid of tube 912. The application of a more positive voltage to the diode 925 to the grid of tube 912 is substantially concurrent with the removal of such a voltage from the anode of the left-hand section of tube 910 to the diode of 919. In order to prevent any rapid change in the voltage applied to the grid of tube 912 at this time condenser 926 is connected to the grid circuit which tends to maintain the grid of this tube at a voltage near ground potential, during the transfer of a more positive voltage from the left-hand section of tube 910 to the left-hand section of tube 1010. As a result current containues to flow through tube 912 which in turn maintains its cathode at a voltage near ground potential which in turn maintains flip-flop circuits 709, 810 and 811 in the condition in which they were previously actuated. In the description herein of an exemplary embodiment of this invention it has been assumed that the right-hand sections of the tubes in these flip-flop circuits are conducting. As a result the diode matrix in Figs. 7 and 8 as well as the diode matrix shown in Figs. 14 and 15 are maintained in the condition to which they are actuated as described above, wherein the voltages of the lower cathode of Fig. 13 are transmitted to the conductor 916 and also where a circuit path is maintained from conductor 403 to conductor 1613. Thus should one or more of the subscribers whose lines are under observation initiate calls the traffic sampling and recording equipment in accordance with this invention is prevented from responding to such calls until the data relative to the previous call has been fully recorded in the manner described herein. Thereafter the sampling and recording equipment will respond to another such call from a subscriber requesting dial tone.

In the foregoing description it was not indicated or assumed at what time during the cycle of operation of tube 1615 the release of relay 707 occurred. If this release occurs any time after the beginning of the writing of a positive pulse in track No. 2 in the manner described herein then the circuits remain in the previously actuated condition until the circuits of tube 1615 advance and start to record the beginning of the next succeeding positive pulse in track No. 2. In other words it is necessary for the left-hand section of tube 1010 to be non-conducting at the beginning of a writing pulse for the circuits to further advance.

The interruption of the discharge through the left-hand section of tube 1010 causes the voltage of the left-hand section of this tube to rise and apply a more positive voltage to the right-hand section of tube 911. As a result current flows through the right-hand section of tube 911 and the cathode resistor 913 so that the potential of the cathodes of this tube remain at their more positive value and thus prevent the circuits of this tube from responding to initiation of another call on the same subscriber's line under observation or test. The transfer of a discharge within tube 1010 to the right-hand section in the manner described above causes the voltage of the anode of this section to fall from a voltage near ground voltage to a lower voltage, which voltage is applied through the delay network comprising condenser 1013 and resistors 1014 and 1015 to the lower terminal of diode 1016 and biasing resistor 1022. This voltage tends to condition the diode 1016 for the subsequent transmission of a negative pulse through it. So long as the voltage of the lower terminal of this diode is maintained substantially above ground potential due to the non-conduction of the right-hand section of tube 1010 and the connection to positive battery through resistor 1022 pulses received from conductor 1017 are not transmitted through the diode 1016 in sufficient magnitude to actuate the circuits of the flip-flop tube 1011. However, when the discharges of tube 1010 are transferred as described above then a less positive voltage is applied to the lower terminal of the diode 1016 which is nearly the same as on the upper terminal which permits the next negative pulse from tube 1615 to be transmitted through the diode 1016.

If the right-hand section of tube 1615 is conducting when the discharges within tube 1010 are transferred, a more positive voltage or pulse is applied over conductor 1017 to the lower terminal of diode 1016 upon the termination of the discharge through the left-hand section of tube 1615. This more positive voltage or pulse is attenuated by diode 1016 and in addition the left-hand section of tube 1011 is already conducting as is the right-hand section of tube 1010 so this positive pulse produces no effect upon the circuits of these tubes 1010 and 1011.

At the beginning of the next writing period when a discharge is initiated through the right-hand section of tube 1615 and the discharge interrupted through the left-hand section of this tube a negative voltage is applied over conductor 1017 from the anode of the right-hand section of this tube and resistor 1623. The application of a positive voltage to the left-hand anode of tube 1615, and a more negative voltage to the right-hand anode of tube 1615 are substantially simultaneous so that at this time a negative voltage is transmitted over diode 1016 to the left-hand grid of tube 1011 and to the right-hand grid of tube 1010. As a result the discharge within tube 1010 is transferred from the right-hand section to the left-hand section thus restoring the circuits of this tube to their normal or initial condition while discharge within tube 1011 is transferred from its left-hand section to its right-hand section.

Restoration of the discharges within tube 1010 to their normal condition causes the voltage of the anode of the right-hand section to rise and apply a more positive voltage to resistor 1014. Condenser 1013 however delays the application of this more positive voltage to the lower terminal of diode 1016 until ample time has been allowed for the discharges within tubes 1010 and 1011 to become fully transferred.

Restoration of the discharges within tube 1010 causes the anode voltage of the left-hand section to fall and remove the more positive voltage from the right-hand grid of tube 911. However, the interruption of the discharge through the left-hand section of tube 1011 causes the anode voltage of this tube section to rise which voltage is transmitted to the right-hand grid of tube 911 maintaining current flowing through the right-hand section of this tube which voltage has sufficient magnitude to maintain the cathodes of tube 911 at their more positive excursion so that another signal indicating the beginning of a timing operation cannot be initiated at this time. In addition condenser 927 is connected to the right-hand grid of tube 911 to maintain this section conducting during the transfer of discharges between the sections of tubes 1010 and 1011. The initiation of a discharge through the right-hand section of tube 1011 causes the voltage of the anode of this section to fall and remove the more positive voltage applied to the grids of tube 942 through diode 925. As a result the current flowing through this tube is reduced so the voltage of its cathode is reduced to a low value which in turn interrupts conduction through tube 708 and the corresponding tubes of circuits 810 and 811 which in turn permits the control potentials applied to the diode matrices to be restored to their low negative value. In addition the more positive voltage is removed from the grids of tubes 1616 and 1617 so these tubes cease to conduct and thus remove power from slow speed motor 2021 which then stops. Also the operating bias on the right-hand grid of tube 1615 is reduced so the operation of this tube is interrupted at the end of the conduction through its right-hand section.

The interruption of a discharge through the left-hand section of tube 1011 causes the voltage of the anode of the left-hand section of this tube to rise or become more positive and thus approach ground potential. In so approaching ground potential it applies a corresponding voltage over conductor 1018 through resistor 1626, condenser 1625 and diode 1624 to the right-hand grid of tube 1622. The condenser 1625 together with resistor 1626 tends to differentiate the positive voltage and apply a pulse of short duration through the diode 1624 to the right-hand grid of tube 1622. Diode 1624 attenuates positive pulses so that no effect is produced on the circuits of tube 1622.

The positive voltage from the anode of the left-hand section of tube 1011 is also applied to both grids of tube 1621. These grids are also connected to the anodes of the two sections of tube 1622. Thus the left-hand grid of tube 1621 is coupled to the right-hand anode of tube 1622 while the right-hand grid of tube 1621 is coupled to the left-hand anode of tube 1622. Thus if the calling party hangs up before dial tone is applied to its line the left-hand section of tube 1622 remains conducting and the right-hand section non-conducting. Consequently, a more positive voltage is applied to the left-hand grid of tube 1621 than is applied to the right-hand section. Then when the left-hand anode of tube 1011 becomes more positive and approaches ground potential the flow of current through the left-hand section of tube 1621 will be initiated which current flows through the recording coil 2023 in such a direction as to record a negative pulse in track No. 3. If, instead dial tone is applied to the subscriber's line then the conduction is reversed in the sections of tube 1622 so that the left-hand section is non-conducting and the right-hand section conducting. Under these circumstances the right-hand grid of tube 1622 will be more positive than the left-hand section so that when the more positive voltage from the anode of the left-hand section of tube 1011 is applied to the grids of tube 1621 the right-hand section will now conduct current which current flows through the recording coil 2023 in such a direction as to record a positive pulse in track No. 3.

During the timing operation between the time a subscriber removes the instrument from its supporting member and the time dial tone is applied to the subscriber's line positive pulses are recorded in track No. 2 every tenth of a second. At the termination of the interval if it is terminated by the subscriber hanging up before dial tone is applied to its line, termination is recorded by substantially simultaneously recording a positive pulse in track No. 2 and a negative pulse in track No. 3. If instead, dial tone is applied to the subscriber's line then the end of the interval is indicated by the substantially simultaneous recording of positive pulses in tracks No. 2 and No. 3 as described herein.

At the end of the recording of the positive pulse in track No. 2 and substantially simultaneous recording of a positive or negative pulse in track No. 3 as described herein the multivibrator tube 1615 changes its conduction so that conduction is initiated through the left-hand section of this tube and interrupted through the right-hand section. As a result the voltage or potential applied to conductor 1628 becomes more negative which voltage is transmitted through resistor 1021, condenser 1020 and diode 1019 to the right-hand grid of tube 1011 thus interrupting the discharge flowing through the right-hand section of this tube which in turn causes a discharge to be initiated to the left-hand section. As a result the voltage of the left-hand anode falls or becomes more negative and removes the previously applied positive voltage from the grid tube 1621. These tube sections are thus restored to their normal cut-off condition. The change in voltage of conductor 1018 is applied to the resistor 1626 and condenser 1625 and the diode 1624. As a result a negative pulse of short duration is applied to the righ-hand grid of tube 1622. If the subscriber has received dial tone the right-hand section of tube 1622 is conducting so this negative pulse will restore the circuits of this tube to its normal or initial condition. If the subscriber hung up before dial tone was applied to the line the right-hand section of tube 1622 will be non-conducting so that application of a negative pulse to its grid at this time is ineffective to actuate any of the circuits of tube 1622.

When the voltage of the anode of the left-hand section of tube 1011 falls or becomes more negative the more positive voltage previously applied to the right-hand grid of tube 911 is removed which in turn interrupts the current flowing through the right-hand section of this tube. As a result the control of this tube is restored to the left-hand grid so that the circuits of this tube may respond to a call from another one of the subscribers' lines under observation so that a call can again lower or make more negative the voltage of the cathode of this tube and thus initiate the operation of the sampling and timing circuits described herein.

If the circuits of the multivibrator 1615 are in their off-normal condition, that is, the condition with the right-hand section conducting at the time the 15-second cycle timer in the program circuit closes its contacts 2516 the relatively low voltage of the anode of the right-hand section of the multivibrator tube 1615 is applied to conductor 1629 which extends to the lower terminal of diode 2326 and prevents the actuation of the circuits of tube 2311 since the grid of the left-hand section of this tube will be maintained at a relatively large negative voltage so long as tube 1615 has a discharge flowing through its right-hand section. At the end of the interval when the discharge flows through the right-hand section of tube 1615 the discharge flowing through this section is interrupted and the discharge is initiated through the left-hand section with the result that positive pulse will again be transmitted to the left-hand grid of tube 2311 which thereupon may be set into operation and cause a scanning cycle to be performed in the manner described above. Likewise the operation of the circuits of tubes 2311 and 2316 in applying more positive voltage to the grid of tubes 2334 and 2345 cause the anode of tube 2345 to have its voltage reduced to a large negative voltage which voltage is applied over conductor 2327 to the circuit of the grid of the right-hand section of tube 1615. As a result this section is held non-conducting until the completion of the scanning operation after which time circuits of tube 1615 will be set into operation and record additional time pulses as well as termination of the timing interval in the manner described herein.

Thus the sampling and recording under control of the scanning circuits is interspersed between the recording intervals of the elapsed time recorder and the operation of the elapsed time recorder interspersed between periods of operation of the scanning apparatus. Interlocking circuits and apparatus are provided to prevent interference between the two different portions of the automatic traffic recorder in accordance with this invention.

It is to be understood that the above-described arrangements are illustrative of the application of the principles of this invention. Numerous other arrangements may be devised by those skilled in the art without departing from the spirit and scope of the invention.

What is claimed is:

1. In combination in an automatic telephone switching system including a plurality of subscriber stations and a plurality of subscriber line circuits interconnected therewith and also including means for interconnecting said line circuits, an automatic traffic recorder comprising means for successively testing each of a plurality of subscriber line circuits for interconnections with other of said subscriber line circuits, means for representing predetermined groups of said interconnections by predetermined codes of current conditions, a movable storage medium, and means for storing indicia in said medium representing said interconnection under control of said coded currents.

2. In combination in a telephone switching system including a plurality of subscriber stations and a plurality of subscriber line circuits interconnected therewith and also including a plurality of communication circuits connected therewith and also including means for establishing communication paths between said line circuits and between said line circuits and said communication paths, an automatic traffic recorder comprising means for periodically and successively testing each of a plurality of said line circuits for interconnection with other of said line circuits or with said transmission circuits, means for representing said different interconnections by predetermined different codes of current conditions, a storage medium, and means for storing indicia in said medium representing said interconnections of each of said plurality of lines under control of said codes of current conditions.

3. In an automatic telephone exchange system including a plurality of subscriber stations and a plurality of subscriber line circuits interconnected therewith and also including a plurality of communication circuits also interconnected with said switching sytem and also including means for selectively interconnecting said line circuits and for selectively interconnecting line circuits with said communication circuits, an automatic traffic recorder comprising in combination a diode matrix scanner comprising a plurality of diodes, means for applying control currents together with a superaudible frequency to said diode matrix, means responsive to a busy condition of each of a plurality of said line circuits for applying said superaudible frequency to said line circuit from said matrix, and means for periodically testing each of said line circuits through said matrix circuit and for concurrently removing the superaudible frequency supplied to said line circuit from said matrix.

4. In an automatic telephone exchange system including a plurality of subscriber stations and a plurality of subscriber line circuits interconnected therewith and also including a plurality of communication circuits also interconnected with said switching system and also including means for selectively interconnecting said line circuits and for selectively interconnecting line circuits with said communication circuits, an automatic traffic recorder comprising in combination a diode matrix scanner comprising a plurality of diodes, means for applying control currents together with superaudible frequencies to said diode matrix, means responsive to a busy condition of each of a plurality of said line circuits for applying said superaudible frequency to said line circuit from said matrix, means for periodically testing each of said line circuits through said matrix circuit and for concurrently removing the superaudible frequency supplied to said line circuit from said matrix, means for representing the busy or idle condition of each of said line circuits by predetermined codes of current conditions, a magnetizable medium, and means for magnetizing portions of said medium under control of said code of current conditions.

5. In combination in an automatic telephone switching system including a plurality of subscriber stations and a plurality of subscriber line circuits interconnecting therewith and also including means for interconnecting said line circuits, an automatic traffic recorder comprising in combination a diode matrix scanner including a plurality of control conductors therefor, means for interconnecting said scanner with a predetermined plurality of said line circuits, means for applying control potentials and also alternating current potentials to said control conductors, said diode matrix circuit also including means responsive to a busy condition of one of said line circuits for applying said alternating current derived from said control conductors to said line circuit, an output conductor for said diode matrix circuit, means for applying control potentials to said control conductors for establishing a path for the transmission of electrical signals of said line circuits to said output conductor periodically and in succession, and means controlled by the currents received on said output conductor for recording indicia representing said currents received on said output conductor.

6. In combination a telephone switching system including a plurality of switching devices and means for seizing said devices in one manner for originating calls or for seizing said devices in another manner for terminating calls in combination with and means for periodically and successively testing the busy and idle condition of each of a plurality of said devices including the busy condition as determined by the type of call for which said devices are seized, means for automtaically representing the busy and idle condition including a busy condition representing the manner in which said devices are seized by predetermined codes of electrical current conditions, means for recording indicia in a pattern across said tape under control of said coded currents representing the busy or idle condition of said devices, means for recording additional indicia in said tape in a different pattern across said tape at a different position along said tape representing the busy condition of said devices as determined by the type of call on which said device is seized.

7. In combination in a telephone switching system including a plurality of subscriber stations and a plurality of groups of trunk circuits and means for interconnecting said subscriber station circuits individually and selectively of with individual ones of said trunk circuits, means for periodically and successively testing said subscriber's line circuits, means for identifying the groups of said trunk circuits to which said subscriber's line is interconnected at the time of said testing, means for automatically representing the identity of the group of trunk circuits to which subscriber's lines are connected by means of code groups of current conditions, a magnetic tape, and means controlled by said code groups of current conditions for automatically recording indicia in said tape individual to each of said subscriber's line circuits and identifyng the group of trunks to which said subscriber's lines are interconnected.

8. In combination a telephone switching system including a plurality of subscriber's stations and a plurality of subscriber's line circuits interconnected therewith and a plurality of switching devices connectable with said subscriber's lines, an automatic traffic recorder comprising means for periodically and successively testing the busy or idle condition of each of a plurality of said subscriber's line circuits, a magnetic tape, means for recording indicia on said tape under control of said testing means representing the busy or idle condition of each of a plurality of subscriber's line circuits, other recording means for determining the time required for said switching devices to function comprising other recording means, means controlled by said other recording means for recording indicia on said tape representing the time required for said switching device to function and means for recording said additional recordings in said tape between the periods of recording of said periodic testing means.

9. In combination in an automatic telephone switching system including a plurality of subscriber's line circuits and interconnecting switching devices, means for supplying dial tone to calling ones of said subscriber's line circuits, an automatic traffic recorder comprising means for recording the time lapsing between the initiation of a call and the supplying of dial tone to one of said subscriber's line circuits including means responsive to the initiation of a call for periodically recording timing indicia, and means operative concurrently with the supply of dial tone to said subscriber's line circuit for recording indicia representing the supply of dial tone to said circuit.

10. In combination in an automatic telephone switching system including a plurality of subscriber's line circuits interconnecting switching devices, means for supplying dial tone to calling ones of said subscriber's line circuits, an automatic traffic recorder comprising means for recording the time lapsing between the initiation of a call and the supplying of dial tone to one of said subscriber's lines including means responsive to the initiation of a call for periodically recording timing indicia, and means responsive to abandonment of said call for recording indicia in said taper representing the abandonment of said call.

11. An automatic telephone traffic recorder comprising in combination a magnetic tape, coding means, means controlled by said coding means for recording coded indicia on said tape, signal responsive means for controlling said coding means to record on said tape timing signals in response to initiation of a call, other means responsive to an abandoned call for causing said coding means to record a different code on said tape, still other signal responsive means operating concurrently with the supply of dial tone to a subscriber for recording still different codes on said tape.

12. In combination a telephone switching system including a plurality of subscriber's lines, an automatic traffic recorder comprising in combination a scanning matrix including a plurality of diodes, an output circuit for said matrix, means for connecting said matrix to each of a plurality of subscribers' lines to be scanned, a plurality of control conductors for said matrix, means for supplying alternating current to said control conductors, means for also supplying control potentials to said conductors for selectively establishing electrical transmission paths from each of said subscriber's line circuits connected to said matrix to said output circuit of said matrix, and means responsive to the busy condition of each of said lines connected to said matrix for establishing a path for the transmission of alternating currents from said control conducted to said busy lines.

13. In a telephone switching system including a plurality of subscribers' lines, an automatic traffic recorder comprising in combination a scanning matrix including a plurality of diodes, an output circuit for said matrix, means for connecting said matrix to each of a plurality of subscriber's lines to be scanned, a plurality of control conductors for said matrix, means for supplying alternating current to said control conductor, means for also supplying control potentials to said conductors for selectively establishing transmission paths from each of said subscriber's line circuits connected to said matrix to said output circuit of said matrix, an attenuating means connecting to said output circuit for suppressing the transmission of alternating currents to said output circuit, means responsive to the busy condition of each of said lines connected to said matrix for establishing a path for the transmission of alternating currents from said control conductor to said busy lines, and means responsive to the establishing of a path through said matrix from a busy line to said output circuit for interrupting the transmission for alternating currents between said control conductors in said line.

14. In a telephone switching system including a plurality of subscriber's lines, an automatic traffic recorder comprising in combination a scanning matrix including a plurality of diodes, an output circuit for said matrix, means for connecting said matrix to each of a plurality of subscriber's lines to be scanned, a plurality of control conductors for said matrix, means for supplying control potentials to said conductors for selectively establishing electrical transmission paths from each of said subscriber's line circuits connected to said matrix to said output circuit of said matrix, an attenuating means connected to said output circuit for suppressing the transmission of alternating currents to said output circuit, means responsive to the busy condition of each of said lines connected to said matrix for establishing a path for the transmission of alternating currents from said control conductor to said busy lines, and means responsive to the establishing of a path between a busy line and said output circuit for reducing the attenuation of said attenuator and permitting the transmission of alternating currents from said busy line circuit to said output circuit.

15. In a telephone switching system including a plurality of subscriber's lines, an automatic traffic recorder comprising in combination a scanning matrix including a plurality of diodes, an output circuit for said matrix, means for connecting said matrix to each of a plurality of subscriber's lines to be scanned, a plurality of control conductors for said matrix, means for supplying alternating current to said control conductors, means for also supplying control potentials to said conductors for selectively establishing transmission paths from each of said subscriber's line circuits connected to said matrix to said output circuit of said matrix, an attenuating means connecting to said output circuit for suppressing the transmission of alternating currents to said output circuit, means responsive to the busy condition each of said lines connected to said matrix for establishing a path for the transmission of alternating currents from said control conductor to said busy lines, and means responsive to establishing a path through said diode matrix from a busy line to said output circuit for changing the output voltage of said output circuit to indicate a busy condition.

16. In a telephone switching system including a plurality of subscriber's line circuits, means for selectively interconnecting certain of said subscriber's line circuits, an automatic traffic recorder including means responsive to the initiation of a call over one of said line circuits for periodically recording a predetermined signal, other means for periodically scanning a plurality of said line circuits, test means for testing each of the scanned line circuits for a busy or idle condition, means for recording the busy or idle condition of each of the scanned line circuits under control of said test means, and means for initiating the operation of said scanning means between the recording of said predetermined signals.

17. In a telephone switching system including a plurality of subscriber's line circuits and switching equipment, a traffic recorder for recording time between the initiation of a call and the interconnection of predetermined switching devices with said line comprising a first diode switching matrix having an input terminal connected to each of a plurality of said lines and an output terminal, a plurality of control conductors connected to said first matrix, means responsive to the initiation of a call for changing the potential of said output conductor over a path through said matrix, means for applying predetermined control potentials to said control conductors from said path through said matrix, a second diode switching matrix comprising a similar plurality of input terminals in which the corresponding terminals are connected to the same line circuit as the corresponding terminals of said first switching matrix, and means controlled by said control potentials derived from said first switching matrix for controlling the establishment of a similar path through said second switching matrix.

18. In a telephone switching system including a plurality of subscriber's line circuits and switching equipment, a traffic recorder for recording time required between the initiation of a call and the interconnection of predetermined switching devices with said line comprising a first diode switching matrix having an input terminal connected to each of a plurality of said lines and an output terminal, a plurality of control conductors connected to said first matrix, means responsive to the initiation of a call for changing the potential of said output conductor over a path through said matrix, means for applying predetermined control potentials to said control conductors from said path through said matrix, a second diode switching matrix comprising a similar plurality of input terminals in which the corresponding terminals are connected to the same line circuit as the corresponding terminal of said first switching matrix, means controlled by said control potentials derived from said first switching matrix for controlling the establishment of a similar path through said second switching matrix, and means responsive to said control potentials for maintaining said two paths through said matrices.

19. In a telephone switching system including a plurality of subscriber's line circuits and switching equipment, a traffic recorder for recording the time required between the initiation of a call and the interconnection of predetermined switching devices with said line comprising a first diode switching matrix having an input terminal connected to each of a plurality of said lines and an output terminal, a plurality of control conductors connected to said first matrix, means responsive to the initiation of a call for changing the potential of said output conductor over a path through said matrix, means for applying predetermined control potentials to said control conductors from said path through said matrix, a second diode switching matrix comprising a similar plurality of input terminals in which the corresponding terminal is connected to the same line circuit as the corresponding terminal of said first switching matrix, means controlled by said control potentials derived from said first switching matrix for controlling the establishment of a similar path through said second switching matrix, and means responsive to said control potentials for preventing said first matrix from responding to any other input potentials applied thereto.

20. In combination a first diode switching matrix comprising a plurality of unilateral conducting diodes, a plurality of input terminals for receiving one or the other of two different electrical conditions, a plurality of control conductors interconnected with said unilateral conducting diodes, an output circuit including means responsive to the reception of one of said electrical conditions on one of said input terminals for establishing a path through said network from said input terminal to said output circuit, means for deriving control potentials on said control conductors from said established path, a second diode switching matrix including a second plurality of unilateral conducting diodes and a second plurality of input terminals, a second plurality of control conductors interconnected with the diodes of said second diode switching matrix and a second output circuit, means for applying the control potentials derived from said first control conductors to said second control conductors for establishing a path through said second diode switching matrix from one of said second plurality of input terminals to said second output circuit.

21. In combination a first diode switching matrix comprising a plurality of unilateral conducting diodes, a plurality of input terminals for receiving one or the other of two different electrical conditions, a plurality of control conductors interconnected with said unilateral conducting diodes, an output circuit including means responsive to the reception of one of said electrical conditions on one of said input terminals for establishing a path through said network from said input terminal to said output circuit, means for deriving control potentials on said control conductors from said established path, a second diode switching matrix including a second plurality of unilateral conducting diodes and a second plurality of input terminals, a second plurality of control conductors interconnected with the unilateral conducting diodes of said second diode switching matrix and a second output circuit, means for applying the control potentials derived from said first control conductors to said second control conductors for establishing a path through said second diode switching matrix from one of said second plurality of input terminals to said second output circuit, and means for applying locking potentials to said first set of control conductors obtained from said second set of control conductors for preventing transmission through said first diode switching matrix currents derived from said one potential received on any other one of said first plurality of input terminals.

22. In combination a diode switching matrix including a plurality of unilateral conducting diodes, a plurality of input terminals for receiving one or the other of two different electrical conditions, a single output circuit, a plurality of control conductors interconnected with said unilateral conducting diodes, said diode matrix including means for establishing an electrical conducting path from any of said input terminals to said output circuit in response to the reception on one of said input terminals of one of said voltage conditions, means for deriving voltages on a plurality of said control conductors from said established path, means responsive to said voltages on said control conductors for applying locking voltages to a plurality of said control conductors for preventing the transmission through said matrix of said one electrical condition received on any of the other of said input terminals.

23. In combination a diode switching matrix comprising a plurality of unilateral conducting diodes, a plurality of input terminals for receiving either one or the other of two different electrical conditions, an output circuit, a plurality of control conductors interconnected with said unilateral conducting diode, means for applying alternating current to said control conductors, means responsive to the reception of one of said electrical conditions received by said input terminals for establishing paths through said network from said control conductors to said input terminal for transmitting alternating currents from said control conductor to said input terminal.

24. In combination a diode switching matrix comprising a plurality of unilateral conducting diodes, a plurality of input terminals for receiving either one or the other of two different electrical conditions, an output circuit, a plurality of control conductors interconnected with said unilateral conducting diodes, means for applying alternating current to said control conductors, means responsive to the reception of one of said electrical conditions on said input terminals for establishing paths through said network from said control conductors to said input terminals for transmitting alternating currents from said control conductors to said input terminals, means for applying control potentials to said control conductors for selectively establishing paths from said input terminals to said output circuit, means jointly responsive to potentials applied to said control conductors for establishing a path from one of said input terminals to said output circuit and to said one electrical condition received by said input terminal for preventing the flow of said alternating current from said control conductors to said input terminal.

25. In combination in an automatic telephone switching system a central switching station, a plurality of subscriber's lines connected thereto, a plurality of groups of other transmission circuits also connected therewith, said central switching station including means for interconnecting said subscriber's lines and for interconnecting said subscriber's lines and said other transmission circuits, an automatic traffic recorder comprising means for successively testing each of a plurality of said subscriber's lines for interconnections with other subscriber's lines and interconnection with said other transmission circuits, means for representing predetermined groups of said interconnections by predetermined multielement codes of current conditions, a movable storage medium, means for recording each element of said codes and in different track on said storage medium, and means for recording all the elements of each of said codes in a predetermined pattern across said tape.

26. In combination, a diode switching matrix including a plurality of unilateral conducting diodes, a plurality of input terminals for receiving one or the other of two different electrical conditions, a single output circuit, a plurality of control conductors interconnected with said unilateral conducting diodes, means for normally biasing said diodes to provide electrical transmission paths for one of said electrical conditions received on any one of said input terminals from said one input terminal to said output circuit, means responsive to receiving one of said electrical conditions by one of said input terminals for supplying control potentials to said control conductors for maintaining the path from said input terminal to said output circuit.

27. In combination, a diode switching matrix including a plurality of unilateral conducting diodes, a plurality of input terminals for receiving one or the other of two different electrical conditions, a single output circuit, a plurality of control conductors interconnected with said unilateral conducting diodes, means for normally biasing said diodes to provide electrical transmission paths for one of said electrical conditions received on any one of said input terminals from said one input terminal to said output circuit, means responsive to receiving one of said electrical conditions by one of said input terminals for supplying control potentials to said control conductors for maintaining the path from said line input terminal to said output circuit, means responsive to said electrical condition received by said one input terminal for supplying control potentials to said control conductors for interrupting and preventing the establishment of any electrical transmission path from the other of said other input terminals to said output circuit.

28. In combination, a diode switching matrix comprising a plurality of unilateral conducting diodes, a plurality of input terminals for receiving one or the other of two different electrical conditions, an output circuit, a plurality of control conductors interconnected with said unilateral conducting diodes for selectively establishing an electrical transmission path from said input terminals to said output circuit, means for supplying control potentials to control said control conductors, means for also applying alternating-current voltage to said control conductors, alternating-current suppression means connected to said output circuit, means responsive to said one of said electrical conditions received by said input terminal when a path is established from said input terminal to said output circuit under control of potentials supplied to said control conductors for disabling said alternating-current suppression means and permitting the transmission of alternating current from said input terminal to said output circuit over said path established in response to potentials applied to said control conductors.

References Cited in the file of this patent

UNITED STATES PATENTS

| | | |
|---|---|---|
| 1,676,742 | Ostline | July 10, 1928 |
| 2,272,311 | Sigo | Feb. 10, 1942 |
| 2,393,403 | Sigo | Jan. 22, 1946 |
| 2,473,444 | Rajchman | June 14, 1949 |
| 2,590,950 | Eckert et al. | Apr. 1, 1952 |
| 2,655,625 | Burton | Oct. 13, 1953 |
| 2,686,224 | Hartley et al. | Aug. 10, 1954 |
| 2,686,836 | Deakin | Aug. 17, 1954 |
| 2,688,662 | Den Hertog et al. | Sept. 7, 1954 |
| 2,706,811 | Steele | Apr. 19, 1955 |
| 2,708,691 | Molnar | May 17, 1955 |
| 2,780,674 | Six et al. | Feb. 5, 1957 |
| 2,820,099 | Gorgas et al. | Jan. 14, 1958 |